(12) United States Patent
Elliott et al.

(10) Patent No.: US 9,557,909 B2
(45) Date of Patent: Jan. 31, 2017

(54) SEMANTIC ZOOM LINGUISTIC HELPERS

(75) Inventors: Brendan D. Elliott, Redmond, WA (US); Marc Wautier, Seattle, WA (US); Michael S. Kaplan, Redmond, WA (US); Kwong K. Leung, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 453 days.

(21) Appl. No.: 13/228,931

(22) Filed: Sep. 9, 2011

(65) Prior Publication Data

US 2013/0067399 A1    Mar. 14, 2013

(51) Int. Cl.
*G06F 3/048* (2013.01)
*G06F 3/0488* (2013.01)
*G06F 3/0482* (2013.01)

(52) U.S. Cl.
CPC ......... *G06F 3/04883* (2013.01); *G06F 3/0482* (2013.01); *G06F 2203/04806* (2013.01)

(58) Field of Classification Search
CPC ............... G06F 3/0482; G06F 3/04883; G06F 2203/04806; G06F 3/0481; G06F 17/30115
USPC ................................. 715/800, 830
See application file for complete search history.

(56) References Cited

U.S. PATENT DOCUMENTS

| | | | |
|---|---|---|---|
| 4,823,283 A | 4/1989 | Diehm et al. | |
| 5,045,997 A | 9/1991 | Watanabe | |
| 5,046,001 A | 9/1991 | Barker et al. | |
| 5,189,732 A | 2/1993 | Kondo | |
| 5,258,748 A | 11/1993 | Jones | |
| 5,297,032 A | 3/1994 | Trojan et al. | |
| 5,321,750 A | 6/1994 | Nadan | |
| 5,339,392 A | 8/1994 | Risberg et al. | |
| 5,432,932 A | 7/1995 | Chen et al. | |
| 5,463,725 A | 10/1995 | Henckel et al. | |
| 5,485,197 A | 1/1996 | Hoarty | |
| 5,495,566 A | 2/1996 | Kwatinetz | |
| 5,506,951 A | 4/1996 | Ishikawa | |
| 5,510,808 A | 4/1996 | Cina, Jr. et al. | |
| 5,515,495 A | 5/1996 | Ikemoto | |

(Continued)

FOREIGN PATENT DOCUMENTS

| | | |
|---|---|---|
| CN | 1326564 | 12/2001 |
| CN | 1591305 | 3/2005 |

(Continued)

OTHER PUBLICATIONS

Normalizing Text by Oracle, Nov. 11, 2006, http://docs.oracle.com/javase/tutorial/i18n/text/normalizerapi.html.*

(Continued)

*Primary Examiner* — Dino Kujundzic
(74) *Attorney, Agent, or Firm* — Bryan Webster; Dan Choi; Micky Minhas

(57) ABSTRACT

Semantic zoom techniques are described. In one or more implementations, techniques are described that may be utilized by a user to navigate to content of interest. These techniques may also include a variety of different features, such as to support semantic swaps and zooming "in" and "out." These techniques may also include a variety of different input features, such as to support gestures, cursor-control device, and keyboard inputs. A variety of other features are also supported as further described in the detailed description and figures.

20 Claims, 18 Drawing Sheets

(56) References Cited

U.S. PATENT DOCUMENTS

| | | | |
|---|---|---|---|
| 5,574,836 A | 11/1996 | Broemmelsiek |
| 5,598,523 A | 1/1997 | Fujita |
| 5,611,060 A | 3/1997 | Belfiore et al. |
| 5,623,613 A | 4/1997 | Rowe et al. |
| 5,640,176 A | 6/1997 | Mundt et al. |
| 5,650,827 A | 7/1997 | Tsumori et al. |
| 5,657,049 A | 8/1997 | Ludolph et al. |
| 5,659,693 A | 8/1997 | Hansen |
| 5,675,329 A | 10/1997 | Barker |
| 5,680,562 A | 10/1997 | Conrad et al. |
| 5,687,331 A | 11/1997 | Volk et al. |
| 5,712,995 A | 1/1998 | Cohn |
| 5,740,389 A | 4/1998 | Li et al. |
| 5,771,042 A | 6/1998 | Santos-Gomez |
| 5,793,415 A | 8/1998 | Gregory et al. |
| 5,819,284 A | 10/1998 | Farber et al. |
| 5,844,547 A | 12/1998 | Minakuchi et al. |
| 5,847,706 A | 12/1998 | Kingsley |
| 5,860,073 A | 1/1999 | Ferrel et al. |
| 5,905,492 A | 5/1999 | Straub et al. |
| 5,914,720 A | 6/1999 | Maples et al. |
| 5,940,076 A | 8/1999 | Sommers et al. |
| 5,959,621 A | 9/1999 | Nawaz et al. |
| 5,963,204 A | 10/1999 | Ikeda et al. |
| 6,008,809 A | 12/1999 | Brooks |
| 6,008,816 A | 12/1999 | Eisler |
| 6,009,519 A | 12/1999 | Jones et al. |
| 6,011,542 A | 1/2000 | Durrani et al. |
| 6,028,600 A | 2/2000 | Rosin et al. |
| 6,057,839 A | 5/2000 | Advani et al. |
| 6,064,383 A | 5/2000 | Skelly |
| 6,104,418 A | 8/2000 | Tanaka et al. |
| 6,108,003 A | 8/2000 | Hall, Jr. et al. |
| 6,111,585 A | 8/2000 | Choi |
| 6,115,040 A | 9/2000 | Bladow et al. |
| 6,163,317 A * | 12/2000 | de Judicibus ......... G06F 3/0481 715/853 |
| 6,163,749 A | 12/2000 | McDonough et al. |
| 6,166,736 A | 12/2000 | Hugh |
| 6,188,405 B1 | 2/2001 | Czerwinski et al. |
| 6,211,921 B1 | 4/2001 | Cherian et al. |
| 6,212,564 B1 | 4/2001 | Harter et al. |
| 6,216,141 B1 | 4/2001 | Straub et al. |
| 6,266,098 B1 | 7/2001 | Cove et al. |
| 6,278,448 B1 | 8/2001 | Brown et al. |
| 6,281,940 B1 | 8/2001 | Sciammarella |
| 6,311,058 B1 | 10/2001 | Wecker et al. |
| 6,313,854 B1 | 11/2001 | Gibson |
| 6,369,837 B1 | 4/2002 | Schirmer |
| 6,385,630 B1 | 5/2002 | Ejerhed |
| 6,389,386 B1 * | 5/2002 | Hetherington ...... G06F 17/2863 704/8 |
| 6,396,963 B2 | 5/2002 | Shaffer |
| 6,411,307 B1 | 6/2002 | Rosin et al. |
| 6,414,698 B1 | 7/2002 | Lovell et al. |
| 6,424,338 B1 | 7/2002 | Anderson |
| 6,426,753 B1 | 7/2002 | Migdal |
| 6,433,789 B1 | 8/2002 | Rosman |
| 6,448,987 B1 | 9/2002 | Easty et al. |
| 6,449,638 B1 | 9/2002 | Wecker et al. |
| 6,456,334 B1 | 9/2002 | Duhault |
| 6,489,977 B2 | 12/2002 | Sone |
| 6,493,002 B1 | 12/2002 | Christensen |
| 6,505,243 B1 | 1/2003 | Lortz |
| 6,507,643 B1 | 1/2003 | Groner |
| 6,510,144 B1 | 1/2003 | Dommety et al. |
| 6,510,466 B1 | 1/2003 | Cox et al. |
| 6,510,553 B1 | 1/2003 | Hazra |
| 6,538,635 B1 | 3/2003 | Ringot |
| 6,570,597 B1 | 5/2003 | Seki et al. |
| 6,577,323 B1 | 6/2003 | Jamieson et al. |
| 6,577,350 B1 | 6/2003 | Proehl et al. |
| 6,591,244 B2 | 7/2003 | Jim et al. |
| 6,597,374 B1 | 7/2003 | Baker et al. |
| 6,628,309 B1 | 9/2003 | Dodson et al. |
| 6,636,246 B1 | 10/2003 | Gallo et al. |
| 6,662,023 B1 | 12/2003 | Helle |
| 6,675,387 B1 | 1/2004 | Boucher et al. |
| 6,690,387 B2 | 2/2004 | Zimmerman et al. |
| 6,697,825 B1 | 2/2004 | Underwood et al. |
| 6,707,449 B2 | 3/2004 | Hinckley et al. |
| 6,710,771 B1 | 3/2004 | Yamaguchi et al. |
| 6,721,958 B1 | 4/2004 | Dureau |
| 6,724,403 B1 | 4/2004 | Santoro et al. |
| 6,738,084 B1 | 5/2004 | Kelley et al. |
| 6,784,925 B1 | 8/2004 | Tomat |
| 6,798,421 B2 | 9/2004 | Baldwin |
| 6,801,203 B1 | 10/2004 | Hussain |
| 6,807,558 B1 | 10/2004 | Hassett et al. |
| 6,832,355 B1 | 12/2004 | Duperrouzel et al. |
| 6,857,104 B1 | 2/2005 | Cahn |
| 6,865,297 B2 | 3/2005 | Loui |
| 6,873,329 B2 | 3/2005 | Cohen et al. |
| 6,876,312 B2 | 4/2005 | Yu |
| 6,885,974 B2 | 4/2005 | Holle |
| 6,904,597 B2 | 6/2005 | Jin |
| 6,920,445 B2 | 7/2005 | Bae |
| 6,938,101 B2 | 8/2005 | Hayes et al. |
| 6,961,731 B2 | 11/2005 | Holbrook |
| 6,971,067 B1 | 11/2005 | Karson et al. |
| 6,972,776 B2 | 12/2005 | Davis et al. |
| 6,975,306 B2 | 12/2005 | Hinckley |
| 6,976,210 B1 | 12/2005 | Silva et al. |
| 6,978,303 B1 | 12/2005 | McCreesh et al. |
| 6,983,310 B2 | 1/2006 | Rouse |
| 6,987,991 B2 | 1/2006 | Nelson |
| 7,013,041 B2 | 3/2006 | Miyamoto |
| 7,017,119 B1 | 3/2006 | Johnston et al. |
| 7,019,757 B2 | 3/2006 | Brown et al. |
| 7,028,264 B2 | 4/2006 | Santoro et al. |
| 7,032,187 B2 | 4/2006 | Keely, Jr. et al. |
| 7,036,090 B1 | 4/2006 | Nguyen |
| 7,036,091 B1 | 4/2006 | Nguyen |
| 7,042,460 B2 | 5/2006 | Hussain et al. |
| 7,051,291 B2 | 5/2006 | Sciammarella et al. |
| 7,058,955 B2 | 6/2006 | Porkka |
| 7,065,385 B2 | 6/2006 | Jarrad et al. |
| 7,065,386 B1 | 6/2006 | Smethers |
| 7,075,535 B2 | 7/2006 | Aguera y Arcas |
| 7,089,507 B2 | 8/2006 | Lection et al. |
| 7,091,998 B2 | 8/2006 | Miller-Smith |
| 7,093,201 B2 | 8/2006 | Duarte |
| 7,106,349 B2 | 9/2006 | Baar et al. |
| 7,111,044 B2 | 9/2006 | Lee |
| 7,133,707 B1 | 11/2006 | Rak |
| 7,133,859 B1 | 11/2006 | Wong |
| 7,139,800 B2 | 11/2006 | Bellotti et al. |
| 7,146,573 B2 | 12/2006 | Brown et al. |
| 7,155,729 B1 | 12/2006 | Andrew et al. |
| 7,158,123 B2 | 1/2007 | Myers et al. |
| 7,158,135 B2 | 1/2007 | Santodomingo et al. |
| 7,178,111 B2 | 2/2007 | Glein et al. |
| 7,180,527 B2 | 2/2007 | Sakai et al. |
| 7,194,506 B1 * | 3/2007 | White et al. .................. 709/203 |
| 7,210,099 B2 | 4/2007 | Rohrabaugh et al. |
| 7,216,588 B2 | 5/2007 | Suess |
| 7,249,326 B2 | 7/2007 | Stoakley et al. |
| 7,262,775 B2 | 8/2007 | Calkins et al. |
| 7,263,668 B1 | 8/2007 | Lentz |
| 7,277,924 B1 | 10/2007 | Wichmann et al. |
| 7,280,097 B2 | 10/2007 | Chen |
| 7,283,620 B2 | 10/2007 | Adamczyk |
| 7,289,806 B2 | 10/2007 | Morris et al. |
| 7,293,244 B2 * | 11/2007 | Randall ................. G06F 3/0485 715/784 |
| 7,296,184 B2 | 11/2007 | Derks et al. |
| 7,296,242 B2 | 11/2007 | Agata et al. |
| 7,310,100 B2 | 12/2007 | Hussain |
| 7,333,092 B2 | 2/2008 | Zadesky et al. |
| 7,333,120 B2 | 2/2008 | Venolia |
| 7,336,263 B2 | 2/2008 | Valikangas |
| 7,369,647 B2 | 5/2008 | Gao et al. |
| 7,376,907 B2 | 5/2008 | Santoro et al. |
| 7,386,807 B2 | 6/2008 | Cummins et al. |

(56) References Cited

U.S. PATENT DOCUMENTS

| | | |
|---|---|---|
| 7,388,578 B2 | 6/2008 | Tao |
| 7,403,191 B2 | 7/2008 | Sinclair |
| 7,408,538 B2 | 8/2008 | Hinckley et al. |
| 7,409,646 B2 | 8/2008 | Vedbrat et al. |
| 7,412,663 B2 | 8/2008 | Lindsay et al. |
| 7,433,920 B2 | 10/2008 | Blagsvedt et al. |
| 7,447,520 B2 | 11/2008 | Scott |
| 7,461,151 B2 | 12/2008 | Colson et al. |
| 7,469,380 B2 | 12/2008 | Wessling et al. |
| 7,469,381 B2 | 12/2008 | Ording |
| 7,478,326 B2 | 1/2009 | Holecek et al. |
| 7,479,949 B2 | 1/2009 | Jobs |
| 7,480,870 B2 | 1/2009 | Anzures |
| 7,483,418 B2 | 1/2009 | Maurer |
| 7,487,467 B1 | 2/2009 | Kawahara et al. |
| 7,496,830 B2 | 2/2009 | Rubin |
| 7,500,175 B2 | 3/2009 | Colle et al. |
| 7,512,966 B2 | 3/2009 | Lyons, Jr. et al. |
| 7,577,918 B2 | 8/2009 | Lindsay |
| 7,581,034 B2 | 8/2009 | Polivy et al. |
| 7,593,995 B1 | 9/2009 | He et al. |
| 7,595,810 B2 | 9/2009 | Louch |
| 7,599,790 B2 | 10/2009 | Rasmussen et al. |
| 7,600,189 B2 | 10/2009 | Fujisawa |
| 7,600,234 B2 | 10/2009 | Dobrowski et al. |
| 7,606,714 B2 | 10/2009 | Williams et al. |
| 7,607,106 B2 | 10/2009 | Ernst et al. |
| 7,610,563 B2 | 10/2009 | Nelson et al. |
| 7,619,615 B1 | 11/2009 | Donoghue |
| 7,640,518 B2 | 12/2009 | Forlines et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,664,067 B2 | 2/2010 | Pointer |
| 7,669,140 B2 | 2/2010 | Matthews et al. |
| 7,671,756 B2 | 3/2010 | Herz et al. |
| 7,694,221 B2 | 4/2010 | Fortes |
| 7,702,683 B1 | 4/2010 | Kirshenbaum |
| 7,755,674 B2 | 7/2010 | Kaminaga |
| 7,792,925 B1 | 9/2010 | Werner et al. |
| 7,834,861 B2 | 11/2010 | Lee |
| 7,844,915 B2 | 11/2010 | Platzer et al. |
| 7,877,707 B2 | 1/2011 | Westerman et al. |
| 7,880,728 B2 | 2/2011 | De Los Reyes et al. |
| 7,889,180 B2 | 2/2011 | Byun et al. |
| 7,895,309 B2 | 2/2011 | Belali et al. |
| 7,903,115 B2 | 3/2011 | Platzer et al. |
| 7,924,271 B2 | 4/2011 | Christie et al. |
| 7,933,632 B2 | 4/2011 | Flynt et al. |
| 7,962,281 B2 | 6/2011 | Rasmussen et al. |
| 7,983,718 B1 | 7/2011 | Roka |
| 7,987,431 B2 | 7/2011 | Santoro et al. |
| 8,006,276 B2 | 8/2011 | Nakagawa et al. |
| 8,028,239 B1 | 9/2011 | Al-Hilali et al. |
| 8,065,629 B1 | 11/2011 | Ragan |
| 8,086,275 B2 | 12/2011 | Wykes |
| 8,108,781 B2 | 1/2012 | Laansoo et al. |
| 8,131,808 B2 | 3/2012 | Aoki et al. |
| 8,150,924 B2 | 4/2012 | Buchheit |
| 8,171,431 B2 | 5/2012 | Grossman et al. |
| 8,175,653 B2 | 5/2012 | Smuga et al. |
| 8,176,438 B2 | 5/2012 | Zaman et al. |
| 8,209,623 B2 | 6/2012 | Barletta et al. |
| 8,225,193 B1 | 7/2012 | Kleinschnitz et al. |
| 8,238,876 B2 | 8/2012 | Teng |
| 8,245,152 B2 | 8/2012 | Brunner et al. |
| 8,250,494 B2 | 8/2012 | Butcher |
| 8,255,473 B2 | 8/2012 | Eren et al. |
| 8,255,812 B1 | 8/2012 | Parparita et al. |
| 8,269,736 B2 | 9/2012 | Wilairat |
| 8,279,241 B2 | 10/2012 | Fong |
| 8,307,279 B1 | 11/2012 | Fioravanti et al. |
| 8,384,726 B1 | 2/2013 | Grabowski et al. |
| 8,429,565 B2 | 4/2013 | Agarawala et al. |
| 8,448,083 B1 | 5/2013 | Migos et al. |
| 8,473,870 B2 | 6/2013 | Hinckley et al. |
| 8,493,510 B2 | 7/2013 | Bryan et al. |
| 8,525,808 B1 | 9/2013 | Buening |
| 8,539,384 B2 | 9/2013 | Hinckley et al. |
| 8,548,431 B2 | 10/2013 | Teng et al. |
| 8,560,959 B2 | 10/2013 | Zaman et al. |
| 8,589,815 B2 | 11/2013 | Fong et al. |
| 8,612,874 B2 | 12/2013 | Zaman et al. |
| 8,627,227 B2 | 1/2014 | Matthews et al. |
| 8,665,272 B2 | 3/2014 | Fitzmaurice et al. |
| 8,669,950 B2 | 3/2014 | Forstall et al. |
| 8,687,023 B2 | 4/2014 | Markiewicz et al. |
| 8,689,123 B2 | 4/2014 | Zaman et al. |
| 8,706,515 B2 | 4/2014 | Cobbs et al. |
| 8,830,270 B2 | 9/2014 | Zaman et al. |
| 8,893,033 B2 | 11/2014 | Donahue et al. |
| 8,922,575 B2 | 12/2014 | Garside et al. |
| 8,933,952 B2 | 1/2015 | Zaman et al. |
| 8,935,631 B2 | 1/2015 | Leonard et al. |
| 8,990,733 B2 | 3/2015 | Deutsch et al. |
| 9,015,606 B2 | 4/2015 | Zaman et al. |
| 9,052,820 B2 | 6/2015 | Jarrett et al. |
| 9,104,307 B2 | 8/2015 | Jarrett et al. |
| 9,104,440 B2 | 8/2015 | Jarrett et al. |
| 9,141,262 B2 | 9/2015 | Nan et al. |
| 9,146,670 B2 | 9/2015 | Zaman et al. |
| 9,158,445 B2 | 10/2015 | Wong et al. |
| 9,213,468 B2 | 12/2015 | Zaman et al. |
| 9,229,918 B2 | 1/2016 | Zaman et al. |
| 9,244,802 B2 | 1/2016 | Yalovsky et al. |
| 9,383,917 B2 | 7/2016 | Mouton et al. |
| 9,418,464 B2 | 8/2016 | Fong et al. |
| 9,423,951 B2 | 8/2016 | Deutsch et al. |
| 2001/0022621 A1 | 9/2001 | Squibbs |
| 2002/0000963 A1 | 1/2002 | Yoshida et al. |
| 2002/0018051 A1 | 2/2002 | Singh |
| 2002/0026524 A1* | 2/2002 | Dharap ............... 709/236 |
| 2002/0035607 A1 | 3/2002 | Checkoway |
| 2002/0054117 A1 | 5/2002 | van Dantzich et al. |
| 2002/0060701 A1 | 5/2002 | Naughton et al. |
| 2002/0070961 A1 | 6/2002 | Xu et al. |
| 2002/0077156 A1 | 6/2002 | Smethers |
| 2002/0083025 A1 | 6/2002 | Robarts et al. |
| 2002/0091755 A1 | 7/2002 | Narin |
| 2002/0097264 A1 | 7/2002 | Dutta et al. |
| 2002/0105531 A1 | 8/2002 | Niemi |
| 2002/0115476 A1 | 8/2002 | Padawer et al. |
| 2002/0128036 A1 | 9/2002 | Yach et al. |
| 2002/0129061 A1 | 9/2002 | Swart et al. |
| 2002/0138248 A1 | 9/2002 | Corston-Oliver et al. |
| 2002/0142762 A1 | 10/2002 | Chmaytelli et al. |
| 2002/0145631 A1 | 10/2002 | Arbab et al. |
| 2002/0149622 A1 | 10/2002 | Uesaki et al. |
| 2002/0152305 A1 | 10/2002 | Jackson et al. |
| 2002/0154176 A1 | 10/2002 | Barksdale et al. |
| 2002/0161634 A1 | 10/2002 | Kaars |
| 2002/0165923 A1 | 11/2002 | Prince |
| 2002/0186251 A1 | 12/2002 | Himmel et al. |
| 2002/0194385 A1 | 12/2002 | Linder et al. |
| 2003/0003899 A1 | 1/2003 | Tashiro et al. |
| 2003/0008686 A1 | 1/2003 | Park et al. |
| 2003/0011643 A1 | 1/2003 | Nishihata |
| 2003/0020671 A1 | 1/2003 | Santoro et al. |
| 2003/0040300 A1 | 2/2003 | Bodic |
| 2003/0046396 A1 | 3/2003 | Richter et al. |
| 2003/0052900 A1 | 3/2003 | Card et al. |
| 2003/0073414 A1 | 4/2003 | Capps |
| 2003/0096604 A1 | 5/2003 | Vollandt |
| 2003/0105827 A1 | 6/2003 | Tan et al. |
| 2003/0135582 A1 | 7/2003 | Allen et al. |
| 2003/0187996 A1 | 10/2003 | Cardina et al. |
| 2003/0222907 A1 | 12/2003 | Heikes et al. |
| 2003/0225846 A1 | 12/2003 | Heikes et al. |
| 2003/0231327 A1 | 12/2003 | Ashey et al. |
| 2004/0066414 A1 | 4/2004 | Czerwinski et al. |
| 2004/0068543 A1 | 4/2004 | Seifert |
| 2004/0078299 A1 | 4/2004 | Down-Logan |
| 2004/0111673 A1 | 6/2004 | Bowman et al. |
| 2004/0128359 A1 | 7/2004 | Horvitz et al. |

(56) References Cited

U.S. PATENT DOCUMENTS

| | | |
|---|---|---|
| 2004/0155908 A1 | 8/2004 | Wagner |
| 2004/0185883 A1 | 9/2004 | Rukman |
| 2004/0189707 A1* | 9/2004 | Moore .............. G06F 17/30115 715/777 |
| 2004/0212586 A1 | 10/2004 | Denny |
| 2004/0217954 A1 | 11/2004 | O'Gorman et al. |
| 2004/0217980 A1 | 11/2004 | Radburn et al. |
| 2004/0237048 A1 | 11/2004 | Tojo et al. |
| 2004/0250217 A1 | 12/2004 | Tojo et al. |
| 2004/0266491 A1 | 12/2004 | Howard et al. |
| 2005/0005241 A1 | 1/2005 | Hunleth et al. |
| 2005/0028208 A1 | 2/2005 | Ellis |
| 2005/0044058 A1 | 2/2005 | Matthews et al. |
| 2005/0050462 A1 | 3/2005 | Whittle et al. |
| 2005/0054384 A1 | 3/2005 | Pasquale et al. |
| 2005/0058353 A1 | 3/2005 | Matsubara |
| 2005/0060647 A1 | 3/2005 | Doan et al. |
| 2005/0060663 A1 | 3/2005 | Arkeketa et al. |
| 2005/0060665 A1 | 3/2005 | Rekimoto |
| 2005/0079896 A1 | 4/2005 | Kokko et al. |
| 2005/0081155 A1 | 4/2005 | Martin et al. |
| 2005/0085215 A1 | 4/2005 | Kokko |
| 2005/0085272 A1 | 4/2005 | Anderson et al. |
| 2005/0108655 A1 | 5/2005 | Andrea et al. |
| 2005/0114788 A1 | 5/2005 | Fabritius |
| 2005/0120306 A1 | 6/2005 | Klassen et al. |
| 2005/0125736 A1 | 6/2005 | Ferri et al. |
| 2005/0143138 A1 | 6/2005 | Lee et al. |
| 2005/0149879 A1 | 7/2005 | Jobs et al. |
| 2005/0156947 A1 | 7/2005 | Sakai et al. |
| 2005/0182798 A1 | 8/2005 | Todd et al. |
| 2005/0183021 A1 | 8/2005 | Allen et al. |
| 2005/0184999 A1 | 8/2005 | Daioku |
| 2005/0188406 A1 | 8/2005 | Gielow et al. |
| 2005/0198159 A1 | 9/2005 | Kirsch |
| 2005/0198584 A1 | 9/2005 | Matthews et al. |
| 2005/0200762 A1 | 9/2005 | Barletta et al. |
| 2005/0207734 A1 | 9/2005 | Howell et al. |
| 2005/0216300 A1 | 9/2005 | Appelman et al. |
| 2005/0223057 A1 | 10/2005 | Buchheit et al. |
| 2005/0223069 A1 | 10/2005 | Cooperman et al. |
| 2005/0232166 A1 | 10/2005 | Nierhaus |
| 2005/0250547 A1 | 11/2005 | Salman et al. |
| 2005/0268237 A1 | 12/2005 | Crane et al. |
| 2005/0273614 A1 | 12/2005 | Ahuja |
| 2005/0280719 A1 | 12/2005 | Kim |
| 2006/0004685 A1 | 1/2006 | Pyhalammi et al. |
| 2006/0010394 A1 | 1/2006 | Chaudhri et al. |
| 2006/0015736 A1 | 1/2006 | Callas et al. |
| 2006/0015812 A1 | 1/2006 | Cunningham |
| 2006/0026013 A1 | 2/2006 | Kraft |
| 2006/0026521 A1 | 2/2006 | Hotelling et al. |
| 2006/0036425 A1 | 2/2006 | Le Cocq et al. |
| 2006/0048073 A1 | 3/2006 | Jarrett et al. |
| 2006/0048101 A1 | 3/2006 | Krassovsky et al. |
| 2006/0059430 A1 | 3/2006 | Bells |
| 2006/0061597 A1 | 3/2006 | Hui |
| 2006/0070005 A1 | 3/2006 | Gilbert et al. |
| 2006/0074735 A1 | 4/2006 | Shukla et al. |
| 2006/0074771 A1 | 4/2006 | Kim |
| 2006/0075360 A1 | 4/2006 | Bixler |
| 2006/0103623 A1 | 5/2006 | Davis |
| 2006/0107231 A1 | 5/2006 | Matthews et al. |
| 2006/0112354 A1 | 5/2006 | Park et al. |
| 2006/0129543 A1 | 6/2006 | Bates et al. |
| 2006/0135220 A1 | 6/2006 | Kim et al. |
| 2006/0136773 A1 | 6/2006 | Kespohl et al. |
| 2006/0152803 A1 | 7/2006 | Provitola |
| 2006/0156228 A1 | 7/2006 | Gallo et al. |
| 2006/0161863 A1 | 7/2006 | Gallo |
| 2006/0172724 A1 | 8/2006 | Linkert et al. |
| 2006/0173911 A1 | 8/2006 | Levin et al. |
| 2006/0176403 A1 | 8/2006 | Gritton et al. |
| 2006/0184901 A1 | 8/2006 | Dietz |
| 2006/0190833 A1 | 8/2006 | SanGiovanni et al. |
| 2006/0199598 A1 | 9/2006 | Lee et al. |
| 2006/0212806 A1 | 9/2006 | Griffin et al. |
| 2006/0218234 A1 | 9/2006 | Deng et al. |
| 2006/0218501 A1 | 9/2006 | Wilson et al. |
| 2006/0224993 A1 | 10/2006 | Wong et al. |
| 2006/0227153 A1 | 10/2006 | Anwar et al. |
| 2006/0236264 A1 | 10/2006 | Cain et al. |
| 2006/0246955 A1 | 11/2006 | Nirhamo |
| 2006/0253685 A1 | 11/2006 | Wong et al. |
| 2006/0253801 A1 | 11/2006 | Okaro et al. |
| 2006/0259870 A1 | 11/2006 | Hewitt et al. |
| 2006/0259873 A1 | 11/2006 | Mister |
| 2006/0262134 A1 | 11/2006 | Hamiter et al. |
| 2006/0268100 A1 | 11/2006 | Karukka et al. |
| 2006/0271520 A1 | 11/2006 | Ragan |
| 2006/0281448 A1 | 12/2006 | Plestid et al. |
| 2006/0288280 A1 | 12/2006 | Makela |
| 2006/0293088 A1 | 12/2006 | Kokubo |
| 2006/0294063 A1 | 12/2006 | Ali et al. |
| 2006/0294396 A1 | 12/2006 | Witman |
| 2007/0005716 A1 | 1/2007 | LeVasseur et al. |
| 2007/0006094 A1 | 1/2007 | Canfield et al. |
| 2007/0011610 A1 | 1/2007 | Sethi et al. |
| 2007/0015532 A1 | 1/2007 | Deelman |
| 2007/0024646 A1 | 2/2007 | Saarinen |
| 2007/0028267 A1 | 2/2007 | Ostojic et al. |
| 2007/0035513 A1 | 2/2007 | Sherrard et al. |
| 2007/0038567 A1 | 2/2007 | Allaire et al. |
| 2007/0044039 A1 | 2/2007 | Amadio et al. |
| 2007/0050724 A1 | 3/2007 | Lee et al. |
| 2007/0054679 A1 | 3/2007 | Cho et al. |
| 2007/0055770 A1 | 3/2007 | Karmakar et al. |
| 2007/0061488 A1 | 3/2007 | Alagappan et al. |
| 2007/0061714 A1 | 3/2007 | Stuple et al. |
| 2007/0063995 A1 | 3/2007 | Bailey et al. |
| 2007/0067272 A1 | 3/2007 | Flynt |
| 2007/0067737 A1 | 3/2007 | Zielinski et al. |
| 2007/0073718 A1 | 3/2007 | Ramer |
| 2007/0076013 A1 | 4/2007 | Campbell |
| 2007/0080954 A1 | 4/2007 | Griffin |
| 2007/0082707 A1 | 4/2007 | Flynt et al. |
| 2007/0082708 A1 | 4/2007 | Griffin |
| 2007/0083746 A1 | 4/2007 | Fallon et al. |
| 2007/0083821 A1 | 4/2007 | Garbow et al. |
| 2007/0094045 A1 | 4/2007 | Cobbs et al. |
| 2007/0106635 A1 | 5/2007 | Frieden et al. |
| 2007/0120835 A1 | 5/2007 | Sato |
| 2007/0127638 A1 | 6/2007 | Doulton |
| 2007/0143705 A1 | 6/2007 | Peters |
| 2007/0152961 A1 | 7/2007 | Dunton et al. |
| 2007/0157089 A1 | 7/2007 | Van Os et al. |
| 2007/0157105 A1 | 7/2007 | Owens et al. |
| 2007/0171192 A1 | 7/2007 | Seo et al. |
| 2007/0180381 A1 | 8/2007 | Rice et al. |
| 2007/0182595 A1 | 8/2007 | Ghasabian |
| 2007/0182999 A1 | 8/2007 | Anthony et al. |
| 2007/0185847 A1 | 8/2007 | Budzik et al. |
| 2007/0192707 A1 | 8/2007 | Maeda et al. |
| 2007/0192726 A1 | 8/2007 | Kim et al. |
| 2007/0192730 A1 | 8/2007 | Simila et al. |
| 2007/0192733 A1 | 8/2007 | Horiuchi |
| 2007/0192739 A1* | 8/2007 | Hunleth et al. ............... 715/823 |
| 2007/0197196 A1 | 8/2007 | Shenfield et al. |
| 2007/0198420 A1 | 8/2007 | Goldstein |
| 2007/0208840 A1 | 9/2007 | Mcconville et al. |
| 2007/0211034 A1 | 9/2007 | Griffin et al. |
| 2007/0214429 A1 | 9/2007 | Lyudovyk et al. |
| 2007/0216651 A1 | 9/2007 | Patel |
| 2007/0216661 A1 | 9/2007 | Chen et al. |
| 2007/0222769 A1 | 9/2007 | Otsuka et al. |
| 2007/0225022 A1 | 9/2007 | Satake |
| 2007/0233654 A1 | 10/2007 | Karlson |
| 2007/0236468 A1 | 10/2007 | Tuli |
| 2007/0238488 A1 | 10/2007 | Scott |
| 2007/0247435 A1 | 10/2007 | Benko et al. |
| 2007/0250583 A1 | 10/2007 | Hardy et al. |
| 2007/0250787 A1 | 10/2007 | Kawahara et al. |
| 2007/0253758 A1 | 11/2007 | Suess |
| 2007/0256029 A1 | 11/2007 | Maxwell |

(56) References Cited

U.S. PATENT DOCUMENTS

| | | |
|---|---|---|
| 2007/0257891 A1 | 11/2007 | Esenther et al. |
| 2007/0257933 A1 | 11/2007 | Klassen |
| 2007/0260674 A1 | 11/2007 | Shenfield |
| 2007/0262964 A1 | 11/2007 | Zotov et al. |
| 2007/0263843 A1 | 11/2007 | Foxenland |
| 2007/0273663 A1 | 11/2007 | Park et al. |
| 2007/0273668 A1 | 11/2007 | Park et al. |
| 2007/0280457 A1 | 12/2007 | Aberethy |
| 2007/0281747 A1 | 12/2007 | Pletikosa |
| 2008/0005668 A1 | 1/2008 | Mavinkurve |
| 2008/0028294 A1 | 1/2008 | Sell et al. |
| 2008/0032681 A1 | 2/2008 | West |
| 2008/0034318 A1 | 2/2008 | Louch et al. |
| 2008/0036743 A1 | 2/2008 | Westerman |
| 2008/0040692 A1 | 2/2008 | Sunday et al. |
| 2008/0048986 A1 | 2/2008 | Khoo |
| 2008/0052370 A1 | 2/2008 | Snyder |
| 2008/0057910 A1 | 3/2008 | Thoresson et al. |
| 2008/0057926 A1 | 3/2008 | Forstall et al. |
| 2008/0065607 A1 * | 3/2008 | Weber ............................. 707/3 |
| 2008/0072173 A1 | 3/2008 | Brunner et al. |
| 2008/0076472 A1 | 3/2008 | Hyatt |
| 2008/0082911 A1 | 4/2008 | Sorotokin et al. |
| 2008/0082934 A1 | 4/2008 | Kocienda et al. |
| 2008/0085700 A1 | 4/2008 | Arora |
| 2008/0092054 A1 | 4/2008 | Bhumkar et al. |
| 2008/0094368 A1 | 4/2008 | Ording et al. |
| 2008/0095100 A1 | 4/2008 | Cleveland et al. |
| 2008/0098093 A1 | 4/2008 | Simon et al. |
| 2008/0102863 A1 | 5/2008 | Hardy |
| 2008/0104544 A1 | 5/2008 | Collins et al. |
| 2008/0107057 A1 | 5/2008 | Kannan et al. |
| 2008/0113656 A1 | 5/2008 | Lee et al. |
| 2008/0114535 A1 | 5/2008 | Nesbitt |
| 2008/0122796 A1 | 5/2008 | Jobs |
| 2008/0132252 A1 | 6/2008 | Altman et al. |
| 2008/0138030 A1 | 6/2008 | Bryan et al. |
| 2008/0141153 A1 | 6/2008 | Samson et al. |
| 2008/0153551 A1 | 6/2008 | Baek et al. |
| 2008/0155425 A1 | 6/2008 | Murthy et al. |
| 2008/0158189 A1 | 7/2008 | Kim |
| 2008/0162651 A1 | 7/2008 | Madnani |
| 2008/0163104 A1 | 7/2008 | Haug |
| 2008/0165132 A1 | 7/2008 | Weiss |
| 2008/0165136 A1 | 7/2008 | Christie et al. |
| 2008/0165141 A1 | 7/2008 | Christie |
| 2008/0165163 A1 | 7/2008 | Bathiche |
| 2008/0165210 A1 | 7/2008 | Platzer et al. |
| 2008/0167058 A1 | 7/2008 | Lee et al. |
| 2008/0168349 A1 | 7/2008 | Lamiraux et al. |
| 2008/0168379 A1 | 7/2008 | Forstall et al. |
| 2008/0168382 A1 | 7/2008 | Louch et al. |
| 2008/0168402 A1 | 7/2008 | Blumenberg |
| 2008/0168403 A1 | 7/2008 | Westerman et al. |
| 2008/0172609 A1 | 7/2008 | Rytivaara |
| 2008/0174570 A1 | 7/2008 | Jobs et al. |
| 2008/0180399 A1 | 7/2008 | Cheng |
| 2008/0182628 A1 | 7/2008 | Lee et al. |
| 2008/0184112 A1 | 7/2008 | Chiang et al. |
| 2008/0189653 A1 | 8/2008 | Taylor et al. |
| 2008/0189658 A1 | 8/2008 | Jeong et al. |
| 2008/0192056 A1 | 8/2008 | Robertson et al. |
| 2008/0198141 A1 | 8/2008 | Lee et al. |
| 2008/0200142 A1 | 8/2008 | Adbel-Kader et al. |
| 2008/0208973 A1 | 8/2008 | Hayashi |
| 2008/0215475 A1 | 9/2008 | Ramer et al. |
| 2008/0222273 A1 | 9/2008 | Lakshmanan |
| 2008/0222545 A1 | 9/2008 | Lemay et al. |
| 2008/0222547 A1 | 9/2008 | Wong et al. |
| 2008/0222560 A1 | 9/2008 | Harrison |
| 2008/0222569 A1 | 9/2008 | Champion |
| 2008/0225014 A1 | 9/2008 | Kim |
| 2008/0242362 A1 | 10/2008 | Duarte |
| 2008/0259042 A1 | 10/2008 | Thorn |
| 2008/0261513 A1 | 10/2008 | Shin et al. |
| 2008/0261660 A1 | 10/2008 | Huh et al. |
| 2008/0263457 A1 | 10/2008 | Kim et al. |
| 2008/0270558 A1 | 10/2008 | Ma |
| 2008/0284798 A1 | 11/2008 | Weybrew et al. |
| 2008/0297475 A1 | 12/2008 | Woolf et al. |
| 2008/0299999 A1 | 12/2008 | Lockhart et al. |
| 2008/0301046 A1 | 12/2008 | Martinez |
| 2008/0301575 A1 | 12/2008 | Fermon |
| 2008/0307351 A1 | 12/2008 | Louch et al. |
| 2008/0309626 A1 | 12/2008 | Westerman et al. |
| 2008/0313540 A1 | 12/2008 | Dirks et al. |
| 2008/0316177 A1 | 12/2008 | Tseng |
| 2008/0317240 A1 | 12/2008 | Chang et al. |
| 2008/0320413 A1 | 12/2008 | Oshiro |
| 2009/0007009 A1 | 1/2009 | Luneau et al. |
| 2009/0007017 A1 | 1/2009 | Anzures et al. |
| 2009/0012952 A1 | 1/2009 | Fredriksson |
| 2009/0029736 A1 | 1/2009 | Kim et al. |
| 2009/0031243 A1 | 1/2009 | Kano et al. |
| 2009/0031247 A1 | 1/2009 | Walter et al. |
| 2009/0037469 A1 | 2/2009 | Kirsch |
| 2009/0037846 A1 | 2/2009 | Spalink et al. |
| 2009/0051671 A1 | 2/2009 | Konstas |
| 2009/0055749 A1 | 2/2009 | Chatterjee et al. |
| 2009/0058821 A1 | 3/2009 | Chaudhri |
| 2009/0061837 A1 | 3/2009 | Chaudhri et al. |
| 2009/0061948 A1 | 3/2009 | Lee et al. |
| 2009/0064055 A1 | 3/2009 | Chaudhri |
| 2009/0070673 A1 | 3/2009 | Barkan et al. |
| 2009/0077649 A1 | 3/2009 | Lockhart |
| 2009/0079740 A1 | 3/2009 | Fitzmaurice et al. |
| 2009/0083656 A1 | 3/2009 | Dukhon |
| 2009/0085851 A1 | 4/2009 | Lim |
| 2009/0085878 A1 | 4/2009 | Heubel |
| 2009/0089215 A1 | 4/2009 | Newton |
| 2009/0089459 A1 | 4/2009 | Jeyaseelan et al. |
| 2009/0089704 A1 | 4/2009 | Makela |
| 2009/0094562 A1 | 4/2009 | Jeong et al. |
| 2009/0103515 A1 | 4/2009 | Pointer |
| 2009/0106696 A1 | 4/2009 | Duarte |
| 2009/0109243 A1 | 4/2009 | Kraft |
| 2009/0117942 A1 | 5/2009 | Boningue et al. |
| 2009/0125844 A1 | 5/2009 | Weir et al. |
| 2009/0132942 A1 | 5/2009 | Santoro et al. |
| 2009/0140061 A1 | 6/2009 | Schultz et al. |
| 2009/0140986 A1 | 6/2009 | Karkkainen et al. |
| 2009/0144642 A1 | 6/2009 | Crystal |
| 2009/0144652 A1 | 6/2009 | Wiley |
| 2009/0144653 A1 | 6/2009 | Ubillos |
| 2009/0144753 A1 | 6/2009 | Morris |
| 2009/0146962 A1 | 6/2009 | Ahonen et al. |
| 2009/0150618 A1 | 6/2009 | Allen, Jr. et al. |
| 2009/0153492 A1 | 6/2009 | Popp |
| 2009/0160809 A1 | 6/2009 | Yang et al. |
| 2009/0163182 A1 | 6/2009 | Gatti et al. |
| 2009/0164888 A1 | 6/2009 | Phan |
| 2009/0164928 A1 | 6/2009 | Brown et al. |
| 2009/0164936 A1 | 6/2009 | Kawaguchi |
| 2009/0171920 A1 | 7/2009 | Wade et al. |
| 2009/0178007 A1 | 7/2009 | Matas et al. |
| 2009/0182788 A1 | 7/2009 | Chung et al. |
| 2009/0184939 A1 | 7/2009 | Wohlstadter et al. |
| 2009/0189868 A1 | 7/2009 | Joo et al. |
| 2009/0192942 A1 | 7/2009 | Cottrille et al. |
| 2009/0193358 A1 | 7/2009 | Mernyk et al. |
| 2009/0199122 A1 | 8/2009 | Deutsch et al. |
| 2009/0199128 A1 | 8/2009 | Matthews et al. |
| 2009/0199130 A1 | 8/2009 | Tsern et al. |
| 2009/0205041 A1 | 8/2009 | Michalske |
| 2009/0215504 A1 | 8/2009 | Lando |
| 2009/0225038 A1 | 9/2009 | Bolsinga et al. |
| 2009/0228825 A1 | 9/2009 | Van Os et al. |
| 2009/0228841 A1 | 9/2009 | Hildreth |
| 2009/0235200 A1 | 9/2009 | Deutsch et al. |
| 2009/0235203 A1 | 9/2009 | Iizuka |
| 2009/0248421 A1 * | 10/2009 | Michaelis et al. ............ 704/276 |
| 2009/0249257 A1 | 10/2009 | Bove et al. |
| 2009/0265662 A1 | 10/2009 | Bamford |
| 2009/0271778 A1 | 10/2009 | Mandyam et al. |

(56) References Cited

U.S. PATENT DOCUMENTS

| | | |
|---|---|---|
| 2009/0284482 A1 | 11/2009 | Chin |
| 2009/0284657 A1 | 11/2009 | Roberts et al. |
| 2009/0288044 A1 | 11/2009 | Matthews et al. |
| 2009/0292989 A1 | 11/2009 | Matthews et al. |
| 2009/0293007 A1 | 11/2009 | Duarte et al. |
| 2009/0293013 A1 | 11/2009 | O'Shaugnessy et al. |
| 2009/0298547 A1 | 12/2009 | Kim et al. |
| 2009/0303231 A1 | 12/2009 | Robinet et al. |
| 2009/0305732 A1 | 12/2009 | Marcellino et al. |
| 2009/0307105 A1 | 12/2009 | Lemay et al. |
| 2009/0307589 A1 | 12/2009 | Inose et al. |
| 2009/0307623 A1 | 12/2009 | Agarawala et al. |
| 2009/0313584 A1 | 12/2009 | Kerr et al. |
| 2009/0315839 A1 | 12/2009 | Wilson et al. |
| 2009/0315847 A1 | 12/2009 | Fujii |
| 2009/0322760 A1 | 12/2009 | Kwiatkowski |
| 2009/0327969 A1* | 12/2009 | Estrada .................. 715/848 |
| 2010/0008490 A1 | 1/2010 | Gharachorloo et al. |
| 2010/0010934 A1 | 1/2010 | Barry et al. |
| 2010/0013782 A1 | 1/2010 | Liu et al. |
| 2010/0020025 A1 | 1/2010 | Lemort et al. |
| 2010/0020091 A1 | 1/2010 | Rasmussen et al. |
| 2010/0030578 A1 | 2/2010 | Siddique et al. |
| 2010/0031186 A1 | 2/2010 | Tseng |
| 2010/0042911 A1 | 2/2010 | Wormald et al. |
| 2010/0050076 A1 | 2/2010 | Roth |
| 2010/0057566 A1 | 3/2010 | Itzhak |
| 2010/0058248 A1 | 3/2010 | Park |
| 2010/0062811 A1 | 3/2010 | Park et al. |
| 2010/0066698 A1 | 3/2010 | Seo |
| 2010/0070931 A1 | 3/2010 | Nichols |
| 2010/0073160 A1 | 3/2010 | Gilmour et al. |
| 2010/0073380 A1 | 3/2010 | Kaplan et al. |
| 2010/0075628 A1 | 3/2010 | Ye |
| 2010/0077058 A1 | 3/2010 | Messer |
| 2010/0077310 A1 | 3/2010 | Karachale et al. |
| 2010/0077330 A1 | 3/2010 | Kaplan et al. |
| 2010/0079392 A1 | 4/2010 | Chiang et al. |
| 2010/0079413 A1 | 4/2010 | Kawashima et al. |
| 2010/0081475 A1 | 4/2010 | Chiang et al. |
| 2010/0086022 A1 | 4/2010 | Hunleth et al. |
| 2010/0087169 A1 | 4/2010 | Lin |
| 2010/0087173 A1 | 4/2010 | Lin |
| 2010/0088635 A1 | 4/2010 | Louch |
| 2010/0088641 A1 | 4/2010 | Choi |
| 2010/0100839 A1 | 4/2010 | Tseng et al. |
| 2010/0102998 A1* | 4/2010 | Fux .................. 341/28 |
| 2010/0103118 A1 | 4/2010 | Townsend et al. |
| 2010/0103124 A1 | 4/2010 | Kruzeniski |
| 2010/0103370 A1 | 4/2010 | Kruzeniski |
| 2010/0105424 A1 | 4/2010 | Smuga |
| 2010/0105438 A1 | 4/2010 | Wykes |
| 2010/0105439 A1 | 4/2010 | Friedman |
| 2010/0105440 A1 | 4/2010 | Kruzeniski |
| 2010/0105441 A1 | 4/2010 | Voss |
| 2010/0106915 A1 | 4/2010 | Krishnaprasad et al. |
| 2010/0107067 A1 | 4/2010 | Vaisanen |
| 2010/0107068 A1 | 4/2010 | Butcher |
| 2010/0107100 A1 | 4/2010 | Schneekloth |
| 2010/0121705 A1 | 5/2010 | Ramer et al. |
| 2010/0122110 A1 | 5/2010 | Ordogh |
| 2010/0123737 A1 | 5/2010 | Williamson et al. |
| 2010/0138767 A1 | 6/2010 | Wang et al. |
| 2010/0145675 A1 | 6/2010 | Lloyd et al. |
| 2010/0146384 A1 | 6/2010 | Peev et al. |
| 2010/0146437 A1 | 6/2010 | Woodcock et al. |
| 2010/0159966 A1 | 6/2010 | Friedman |
| 2010/0159994 A1 | 6/2010 | Stallings et al. |
| 2010/0159995 A1 | 6/2010 | Stallings et al. |
| 2010/0162180 A1 | 6/2010 | Dunnam et al. |
| 2010/0167699 A1 | 7/2010 | Sigmund et al. |
| 2010/0169766 A1 | 7/2010 | Duarte et al. |
| 2010/0169772 A1 | 7/2010 | Stallings et al. |
| 2010/0169819 A1 | 7/2010 | Bestle et al. |
| 2010/0175018 A1 | 7/2010 | Petschnigg et al. |
| 2010/0175029 A1 | 7/2010 | Williams |
| 2010/0180233 A1 | 7/2010 | Kruzeniski |
| 2010/0185932 A1 | 7/2010 | Coffman et al. |
| 2010/0216491 A1 | 8/2010 | Winkler et al. |
| 2010/0223569 A1 | 9/2010 | Vuong et al. |
| 2010/0223627 A1 | 9/2010 | Sharma et al. |
| 2010/0248688 A1 | 9/2010 | Teng |
| 2010/0248689 A1 | 9/2010 | Teng |
| 2010/0248741 A1 | 9/2010 | Setlur et al. |
| 2010/0248787 A1 | 9/2010 | Smuga |
| 2010/0248788 A1 | 9/2010 | Yook et al. |
| 2010/0251153 A1 | 9/2010 | SanGiovanni et al. |
| 2010/0251167 A1 | 9/2010 | Deluca et al. |
| 2010/0265196 A1 | 10/2010 | Lee et al. |
| 2010/0281402 A1 | 11/2010 | Staikos et al. |
| 2010/0281409 A1 | 11/2010 | Rainisto et al. |
| 2010/0281481 A1 | 11/2010 | Rainisto et al. |
| 2010/0283743 A1 | 11/2010 | Coddington et al. |
| 2010/0289806 A1 | 11/2010 | Lao et al. |
| 2010/0293056 A1 | 11/2010 | Flynt et al. |
| 2010/0293501 A1 | 11/2010 | Russ et al. |
| 2010/0295789 A1 | 11/2010 | Shin et al. |
| 2010/0295795 A1 | 11/2010 | Wilairat |
| 2010/0298034 A1 | 11/2010 | Shin et al. |
| 2010/0302172 A1 | 12/2010 | Wilairat |
| 2010/0302176 A1 | 12/2010 | Nikula et al. |
| 2010/0302278 A1 | 12/2010 | Shaffer et al. |
| 2010/0311470 A1 | 12/2010 | Seo et al. |
| 2010/0313165 A1 | 12/2010 | Louch et al. |
| 2010/0321403 A1 | 12/2010 | Inadome |
| 2010/0328431 A1 | 12/2010 | Kim et al. |
| 2010/0329642 A1 | 12/2010 | Kam et al. |
| 2010/0333008 A1 | 12/2010 | Taylor |
| 2011/0004839 A1 | 1/2011 | Cha et al. |
| 2011/0004845 A1 | 1/2011 | Ciabarra |
| 2011/0018806 A1 | 1/2011 | Yano |
| 2011/0029598 A1 | 2/2011 | Arnold et al. |
| 2011/0029904 A1 | 2/2011 | Smith et al. |
| 2011/0029927 A1 | 2/2011 | Lietzke et al. |
| 2011/0029934 A1 | 2/2011 | Locker et al. |
| 2011/0032365 A1 | 2/2011 | Yett |
| 2011/0035702 A1 | 2/2011 | Williams et al. |
| 2011/0043527 A1 | 2/2011 | Ording et al. |
| 2011/0055773 A1 | 3/2011 | Agarawala et al. |
| 2011/0055775 A1 | 3/2011 | Saito et al. |
| 2011/0074699 A1 | 3/2011 | Marr et al. |
| 2011/0074710 A1 | 3/2011 | Weeldreyer et al. |
| 2011/0074719 A1 | 3/2011 | Yeh et al. |
| 2011/0078624 A1 | 3/2011 | Missig et al. |
| 2011/0087988 A1 | 4/2011 | Ray et al. |
| 2011/0093778 A1 | 4/2011 | Kim et al. |
| 2011/0093815 A1 | 4/2011 | Gobeil |
| 2011/0093816 A1 | 4/2011 | Chang et al. |
| 2011/0093821 A1 | 4/2011 | Wigdor et al. |
| 2011/0107272 A1 | 5/2011 | Aguilar |
| 2011/0113337 A1 | 5/2011 | Liu et al. |
| 2011/0113486 A1 | 5/2011 | Hunt et al. |
| 2011/0119586 A1 | 5/2011 | Blinnikka et al. |
| 2011/0124376 A1 | 5/2011 | Kim et al. |
| 2011/0126156 A1 | 5/2011 | Krishnaraj et al. |
| 2011/0138313 A1 | 6/2011 | Decker et al. |
| 2011/0154235 A1 | 6/2011 | Min et al. |
| 2011/0157027 A1 | 6/2011 | Rissa |
| 2011/0161845 A1 | 6/2011 | Stallings et al. |
| 2011/0163968 A1 | 7/2011 | Hogan |
| 2011/0167403 A1 | 7/2011 | French et al. |
| 2011/0173556 A1 | 7/2011 | Czerwinski et al. |
| 2011/0173568 A1 | 7/2011 | Royal, Jr. et al. |
| 2011/0173569 A1 | 7/2011 | Howes et al. |
| 2011/0175930 A1 | 7/2011 | Hwang et al. |
| 2011/0181617 A1 | 7/2011 | Tsuda et al. |
| 2011/0202837 A1 | 8/2011 | Fong |
| 2011/0202866 A1 | 8/2011 | Huang et al. |
| 2011/0209039 A1 | 8/2011 | Hinckley et al. |
| 2011/0209089 A1 | 8/2011 | Hinckley et al. |
| 2011/0209100 A1 | 8/2011 | Hinckley et al. |
| 2011/0209101 A1 | 8/2011 | Hinckley et al. |
| 2011/0209102 A1 | 8/2011 | Hinckley et al. |
| 2011/0209103 A1 | 8/2011 | Hinckley et al. |

(56) References Cited

U.S. PATENT DOCUMENTS

| | | |
|---|---|---|
| 2011/0209104 A1 | 8/2011 | Hinckley et al. |
| 2011/0225547 A1 | 9/2011 | Fong et al. |
| 2011/0231796 A1 | 9/2011 | Vigil |
| 2011/0252346 A1 | 10/2011 | Chaudhri |
| 2011/0252380 A1 | 10/2011 | Chaudhri |
| 2011/0258563 A1 | 10/2011 | Lincke |
| 2011/0276864 A1 | 11/2011 | Oules |
| 2011/0283188 A1 | 11/2011 | Farrenkopf et al. |
| 2011/0316884 A1 | 12/2011 | Giambalvo et al. |
| 2012/0005584 A1 | 1/2012 | Seago et al. |
| 2012/0009903 A1 | 1/2012 | Schultz et al. |
| 2012/0017162 A1 | 1/2012 | Khokhlov |
| 2012/0028687 A1 | 2/2012 | Wykes |
| 2012/0050185 A1 | 3/2012 | Davydov et al. |
| 2012/0050332 A1 | 3/2012 | Nikara et al. |
| 2012/0062604 A1 | 3/2012 | Lobo |
| 2012/0081310 A1 | 4/2012 | chrock et al. |
| 2012/0089950 A1 | 4/2012 | Tseng |
| 2012/0102433 A1 | 4/2012 | Falkenburg |
| 2012/0124469 A1* | 5/2012 | Nakajima ........... G06F 3/04817 715/702 |
| 2012/0151397 A1 | 6/2012 | Oberstein et al. |
| 2012/0159395 A1 | 6/2012 | Deutsch et al. |
| 2012/0159402 A1 | 6/2012 | Nurmi et al. |
| 2012/0162266 A1 | 6/2012 | Douglas et al. |
| 2012/0167008 A1 | 6/2012 | Zaman |
| 2012/0167011 A1 | 6/2012 | Zaman |
| 2012/0169593 A1 | 7/2012 | Mak et al. |
| 2012/0174005 A1 | 7/2012 | Deutsch |
| 2012/0174029 A1 | 7/2012 | Bastide et al. |
| 2012/0176401 A1 | 7/2012 | Hayward et al. |
| 2012/0179992 A1 | 7/2012 | Smuga |
| 2012/0210265 A1 | 8/2012 | Delia et al. |
| 2012/0212495 A1 | 8/2012 | Butcher |
| 2012/0216139 A1 | 8/2012 | Ording et al. |
| 2012/0226971 A1 | 9/2012 | Tocchini et al. |
| 2012/0233571 A1 | 9/2012 | Wever et al. |
| 2012/0236035 A1 | 9/2012 | Kimura |
| 2012/0244841 A1 | 9/2012 | Teng |
| 2012/0254780 A1 | 10/2012 | Mouton |
| 2012/0265644 A1 | 10/2012 | Roa et al. |
| 2012/0290962 A1 | 11/2012 | Zielinski et al. |
| 2012/0299968 A1 | 11/2012 | Wong et al. |
| 2012/0304068 A1 | 11/2012 | Zaman et al. |
| 2012/0304092 A1 | 11/2012 | Jarrett et al. |
| 2012/0304108 A1 | 11/2012 | Jarrett et al. |
| 2012/0304113 A1 | 11/2012 | Patten et al. |
| 2012/0304114 A1 | 11/2012 | Wong et al. |
| 2012/0304116 A1 | 11/2012 | Donahue et al. |
| 2012/0304117 A1 | 11/2012 | Donahue et al. |
| 2012/0304118 A1 | 11/2012 | Donahue et al. |
| 2012/0311436 A1 | 12/2012 | Steele et al. |
| 2012/0311485 A1 | 12/2012 | Caliendo, Jr. et al. |
| 2012/0323992 A1 | 12/2012 | Brobst et al. |
| 2013/0031508 A1 | 1/2013 | Kodosky et al. |
| 2013/0033525 A1 | 2/2013 | Markiewicz |
| 2013/0042203 A1 | 2/2013 | Wong et al. |
| 2013/0042206 A1 | 2/2013 | Zaman et al. |
| 2013/0044141 A1 | 2/2013 | Markiewicz |
| 2013/0047079 A1 | 2/2013 | Kroeger et al. |
| 2013/0047105 A1 | 2/2013 | Jarrett |
| 2013/0047117 A1 | 2/2013 | Deutsch |
| 2013/0057587 A1 | 3/2013 | Leonard et al. |
| 2013/0057588 A1 | 3/2013 | Leonard |
| 2013/0063442 A1 | 3/2013 | Zaman |
| 2013/0063443 A1 | 3/2013 | Garside |
| 2013/0063465 A1 | 3/2013 | Zaman |
| 2013/0063490 A1 | 3/2013 | Zaman |
| 2013/0067381 A1 | 3/2013 | Yalovsky |
| 2013/0067390 A1 | 3/2013 | Kwiatkowski |
| 2013/0067391 A1 | 3/2013 | Pittappilly |
| 2013/0067398 A1 | 3/2013 | Pittappilly |
| 2013/0067412 A1 | 3/2013 | Leonard |
| 2013/0067420 A1 | 3/2013 | Pittappilly |
| 2013/0093757 A1 | 4/2013 | Cornell |
| 2013/0169649 A1 | 7/2013 | Bates |
| 2013/0176316 A1 | 7/2013 | Bates |
| 2013/0219332 A1 | 8/2013 | Woley |
| 2014/0033099 A1 | 1/2014 | Treitman et al. |
| 2014/0082552 A1 | 3/2014 | Zaman |
| 2014/0098108 A1 | 4/2014 | Fong et al. |
| 2014/0109008 A1 | 4/2014 | Zaman |
| 2015/0046829 A1 | 2/2015 | Donahue et al. |
| 2015/0058763 A1 | 2/2015 | Leonard et al. |
| 2015/0186376 A1 | 7/2015 | Garside et al. |
| 2015/0193403 A1 | 7/2015 | Zaman et al. |
| 2015/0317062 A1 | 11/2015 | Jarrett et al. |
| 2015/0378554 A1 | 12/2015 | Jan et al. |
| 2015/0378594 A1 | 12/2015 | Zaman et al. |
| 2016/0041710 A1 | 2/2016 | Zaman et al. |
| 2016/0041711 A1 | 2/2016 | Zaman et al. |
| 2016/0041730 A1 | 2/2016 | Zaman et al. |
| 2016/0070357 A1 | 3/2016 | Huang et al. |
| 2016/0110090 A1 | 4/2016 | Patten et al. |

FOREIGN PATENT DOCUMENTS

| | | |
|---|---|---|
| CN | 1734440 | 2/2006 |
| CN | 1845054 | 10/2006 |
| CN | 1902575 | 1/2007 |
| CN | 1904823 | 1/2007 |
| CN | 1930568 | 3/2007 |
| CN | 101036104 | 9/2007 |
| CN | 101114303 | 1/2008 |
| CN | 101233477 | 7/2008 |
| CN | 101233504 | 7/2008 |
| CN | 101578577 | 11/2009 |
| CN | 101809531 | 8/2010 |
| CN | 101981522 | 2/2011 |
| CN | 102004603 | 4/2011 |
| CN | 102033710 | 4/2011 |
| CN | 102144213 | 8/2011 |
| CN | 102197702 | 9/2011 |
| CN | 102460370 | 5/2012 |
| EP | 0583060 | 2/1994 |
| EP | 1353505 | 10/2003 |
| EP | 1752868 | 2/2007 |
| EP | 1939718 | 7/2008 |
| EP | 2172836 | 4/2009 |
| EP | 2262193 | 12/2010 |
| EP | 2659347 | 11/2013 |
| GB | 2350991 | 12/2000 |
| JP | H0744351 | 2/1995 |
| JP | 2000293280 | 10/2000 |
| JP | 2003513350 | 4/2003 |
| JP | 2004227393 | 8/2004 |
| JP | 2004357257 | 12/2004 |
| JP | 2005527888 | 9/2005 |
| JP | 2006268849 | 10/2006 |
| JP | 2006293989 | 10/2006 |
| JP | 2006323672 | 11/2006 |
| JP | 2007058740 | 3/2007 |
| JP | 2007516496 | 6/2007 |
| JP | 2007195186 | 8/2007 |
| JP | 2008508600 | 3/2008 |
| JP | 2008527540 | 7/2008 |
| JP | 2008234042 | 10/2008 |
| JP | 2008276584 | 11/2008 |
| JP | 2009265929 | 11/2009 |
| JP | 2009266192 | 11/2009 |
| JP | 2010039761 | 2/2010 |
| JP | 2010073099 | 4/2010 |
| JP | 2011048835 | 3/2011 |
| JP | 2011070525 | 4/2011 |
| JP | 2011516936 | 5/2011 |
| JP | 2011128029 | 6/2011 |
| JP | 2011170523 | 9/2011 |
| JP | 2012527684 | 11/2012 |
| JP | 2012256147 | 12/2012 |
| KR | 200303655 | 2/2003 |
| KR | 20060019198 | 3/2006 |
| KR | 1020070036114 | 4/2007 |
| KR | 20070093084 | 9/2007 |
| KR | 1020070098337 | 10/2007 |

(56) References Cited

FOREIGN PATENT DOCUMENTS

| KR | 20070120368 | 12/2007 | | |
|---|---|---|---|---|
| KR | 1020080025951 | 3/2008 | | |
| KR | 1020080041809 | 5/2008 | | |
| KR | 1020080076390 | 8/2008 | | |
| KR | 100854333 | 9/2008 | | |
| KR | 1020080084156 | 9/2008 | | |
| KR | 1020080113913 | 12/2008 | | |
| KR | 1020090041635 | 4/2009 | | |
| KR | 20100010072 | 2/2010 | | |
| KR | 20100048375 | 5/2010 | | |
| KR | 20100056369 | 5/2010 | | |
| KR | 1020100056369 | 5/2010 | | |
| RU | 2409833 | 4/2009 | | |
| RU | 2363033 | 7/2009 | | |
| RU | 2412463 | 1/2010 | | |
| TW | 201023026 | 6/2010 | | |
| TW | 201037592 | 10/2010 | | |
| TW | I333157 | 11/2010 | | |
| WO | WO-9926127 | 5/1999 | | |
| WO | WO0129976 A1 * | 4/2001 | ............... | H04B 1/00 |
| WO | WO-03075547 | 9/2003 | | |
| WO | WO-2005026931 | 3/2005 | | |
| WO | WO-2005027506 | 3/2005 | | |
| WO | WO-2006019639 | 2/2006 | | |
| WO | WO-2006074267 | 7/2006 | | |
| WO | WO-2007065019 | 6/2007 | | |
| WO | WO-2007121557 | 11/2007 | | |
| WO | WO-2007134623 | 11/2007 | | |
| WO | WO-2008030608 | 3/2008 | | |
| WO | WO-2008031871 | 3/2008 | | |
| WO | WO-2008035831 | 3/2008 | | |
| WO | WO-2009000043 | 12/2008 | | |
| WO | WO-2009012398 | 1/2009 | | |
| WO | WO-2009049331 | 4/2009 | | |
| WO | WO-2009158310 | 12/2009 | | |
| WO | WO-2010024969 | 3/2010 | | |
| WO | WO-2010036660 | 4/2010 | | |
| WO | WO-2010041826 | 4/2010 | | |
| WO | WO-2010048229 | 4/2010 | | |
| WO | WO-2010048448 | 4/2010 | | |
| WO | WO-2010048519 | 4/2010 | | |
| WO | WO-2010110613 | 9/2010 | | |
| WO | WO-2010117643 | 10/2010 | | |
| WO | WO-2010119356 | 10/2010 | | |
| WO | WO-2010125451 | 11/2010 | | |
| WO | WO-2010134718 | 11/2010 | | |
| WO | WO-2010135155 | 11/2010 | | |
| WO | WO-2011041885 | 4/2011 | | |
| WO | WO-2012088485 | 6/2012 | | |
| WO | WO-2012166188 | 12/2012 | | |

OTHER PUBLICATIONS

"Final Office Action", U.S. Appl. No. 11/305,789, (Apr. 1, 2009), 10 pages.
"Final Office Action", U.S. Appl. No. 11/502,264, (Feb. 4, 2010), 15 pages.
"Final Office Action", U.S. Appl. No. 11/502,264, (Apr. 3, 2009),9 pages.
"Non-Final Office Action", U.S. Appl. No. 11/305,789, (Sep. 21, 2009),5 pages.
"Non-Final Office Action", U.S. Appl. No. 11/502,264, (Sep. 30, 2009), 15 pages.
"Notice of Allowance", U.S. Appl. No. 11/305,789, (Nov. 23, 2009),8 pages.
"Adobe Acrobat 8 Standard User Guide", Adobe Systems Incorporated,(2007),pp. 34 & 36.
"Advisory Action", U.S. Appl. No. 12/414,382, (Jan. 20, 2012),3 pages.
"Advisory Action", U.S. Appl. No. 12/433,605, (Apr. 5, 2012),3 pages.
"Alltel Adds Dedicated Search Key to Phones", Retrieved from: <http://www.phonescoop.com/news/item.php?n=2159> on Nov. 26, 2008., (Apr. 12, 2007),2 Pages.

"Android 2.3 User's Guide", AUG-2.3-103, Android mobile technology platform 2.3,(Dec. 13, 2010),380 pages.
"Apple iPhone—8GB AT&T", Retrieved from: <http://nytimes.com.com/smartphones/apple-iphone-8gb-at/4515-6452_7-32309245.html> on Nov. 20, 2008, (Jun. 29, 2007),11 pages.
"Application User Model IDs", Retrieved from: <http://msdn.microsoft.com/en-us/library/dd378459(VS.85).aspx> on Sep. 28, 2010, (2010),6 pages.
"Ask Web Hosting", Retrieved from: <http://www.askwebhosting.com/story/18501/HTC_FUZE_From_ATandampT_Fuses_Fun_₁ and_Function_With_the_One-Touch_Power_of_TouchFLO_3D.html> on May 5, 2009., (Nov. 11, 2008),3 pages.
"Basics of Your Device: Get Familiar with the Home Screen", Nokia USA—How to, retrieved from <http://www.nokia.ca/get-support-and-software/product-support/c6-01/how-to#> on May 11, 2011,3 pages.
"Blackberyy office tools: Qwerty Convert", Retrieved from: <http://blackberrysoftwarelist.net/blackberry/download-software/blackberry-office/qwerty_convert.aspx> on Nov. 20, 2008, (Nov. 20, 2008),1 page.
"Calc4M", Retrieved from: <http://www.hellebo.com/Calc4M.html> on Dec. 11, 2008, (Sep. 10, 2008),4 Pages.
"Class ScrollView", Retrieved from: <http://www.blackberry.com/developers/docs/6.0.0api/net/rim/device/api/ui/ScrollView.html> on Sep. 28, 2010, 13 pages.
"Content-Centric E-Mail Message Analysis in Litigation Document Reviews", Retrieved from: <http://www.busmanagement.com/article/Issue-14/Data-Managment/Content-Centric-E-Mail-Message-Analysis-in-Litigation-Document-Reviews/> on May 6, 2009, (2009),5 Pages.
"Dial a number", Retrieved from: <http://www.phonespell.org/ialhelp.html> on Nov. 20, 2008), (Nov. 20, 2008),1 page.
"DuoSense™ Multi-Touch Gestures", Retrieved from: <http://www.n-trig.com/Data/Uploads/Misc/DuoSenseMTG_final.pdf>, (Jul. 2008),4 pages.
"Elecont Quick Desktop 1.0.43", Retrieved from: <http://handheld.softpedia.com/get/System-Utilities/Launcher-Applications/Elecont-Quick-Desktop-72131.shtml> on May 5, 2009., (Mar. 13, 2009),2 pages.
"Email Notification for Microsoft Outlook and Outlook Express", Retrieved from: <http://www.contextmagic.com/express-notification/> on Sep. 29, 2010, (Jul. 21, 2004),3 pages.
"Enhanced IBM Power Systems Software and PowerVM Restructuring", *IBM United States Announcement* 208-082, dated Apr. 8, 2008, available at <http://www.ibm.com/common/ssi/rep_ca/2/897/ENUS208- 082/ENUS208082.PDF>,(Apr. 8, 2008),pp. 1-19.
"Exclusive: Windows Moblie 7 to Focus on Touch and Motion Gestures", Retrieved from: <http://anti-linux.blogspot.com/2008/08/exclusive-windows-mobile-7-to-focus-on.html> on May 6, 2009, (Aug. 1, 2008),14 pages.
"Extended European Report", European Patent Application No. 09818253.8, (Apr. 10, 2012),7 pages.
"eXtreme Energy Conservation: Advanced Power-Saving Software for Wireless Devices", *White Paper, Freescale Semiconductor, Inc.*, Document No. XTMENRGYCNSVWP, Rev #0, available at <http://www.freescale.com/files/32bit/doc/white_paper/XTMENRGYCNSVWP.pdf>,(Feb. 2006),15 pages.
"Final Office Action", U.S. Appl. No. 12/244,545, (Dec. 7, 2011),16 pages.
"Final Office Action", U.S. Appl. No. 12/244,545, (Sep. 7, 2012),23 pages.
"Final Office Action", U.S. Appl. No. 12/413,977, (Nov. 17, 2011),16 pages.
"Final Office Action", U.S. Appl. No. 12/414,382, (Dec. 23, 2011),7 pages.
"Final Office Action", U.S. Appl. No. 12/414,476, (Dec. 1, 2011),20 pages.
"Final Office Action", U.S. Appl. No. 12/433,605, (Feb. 3, 2012),11 pages.
"Final Office Action", U.S. Appl. No. 12/433,667, (Sep. 13, 2011),17 pages.
"Final Office Action", U.S. Appl. No. 12/469,458, (Nov. 17, 2011),15 pages.

(56) References Cited

OTHER PUBLICATIONS

"Final Office Action", U.S. Appl. No. 12/469,480, (Feb. 9, 2012),17 pages.
"Final Office Action", U.S. Appl. No. 12/484,799, (Apr. 30, 2012),13 pages.
"Final Office Action", U.S. Appl. No. 12/560,081, (Mar. 14, 2012),16 pages.
"Freeware.mobi", Retrieved from: <http://www.palmfreeware.mobi/download-palette.html> on Nov. 6, 2008, (Oct. 9, 2001),2 pages.
"GnomeCanyas", Retrieved from: <http://library.gnome.org/devel/libgnomecanvas/unstable/GnomeCanvas.html>on Sep. 28, 2010, 11 pages.
"How Do I Cancel a "Drag" Motion on an Android Seekbar?", retrieved from <http://stackoverflow.com/guestions/2917969/how-do-i-cancel-a-drag-motion-on-an-android-seekbar> on Jun. 20, 2011,(May 28, 2010),1 page.
"How do I use Categories with my Weblog?", Retrieved from: <http://tpsupport.mtcs.sixapart.com/tp/us-tp1/how_do_i_use_categories_with_my_weblog.html>on Sep. 28, 2010, (Sep. 16, 2009),3 pages.
"How do you dial 1-800-FLOWERS", Retrieved from: <http://blogs.msdn.com/windowsmobile/archive/2007/02/06/how-do-you-dial-1-800-flowers.aspx> on Nov. 20, 2008, (Feb. 6, 2007),24 pages.
"HTC Shows HTC Snap with Snappy Email Feature", Retrieved from: <http://www.wirelessandmobilenews.com/smartphones/ on May 5, 2009>, (May 4, 2009),10 Pages.
"IntelliScreen-New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/> on Nov. 12, 2008, (May 13, 2008),11 pages.
"International Search Report and Written Opinion", International Application No. PCT/US2011/055521, (May 15, 2012),9 pages.
"International Search Report and Written Opinion", International Application No. PCT/US2011/055522, (May 15, 2012),9 pages.
"International Search Report and Written Opinion", International Application No. PCT/US2011/055514, (May 22, 2012),8 pages.
"International Search Report", Application No. PCT/US2010/028553, Application Filing Date: Mar. 24, 2010,(Nov. 9, 2010),9 pages.
"Internet Explorer Window Restrictions", Retrieved from: http://technet.microsoft.com/en-us/library/cc759517(WS.10).aspx on Jun. 28, 2011, Microsoft TechNet,5 pages.
"Introduction to Windows Touch", Retrieved from: <http://download.microsoft.com/download/a/d/f/adf1347d-08dc-41a4-9084-623b1194d4b2/Win7_touch.docx>, (Dec. 18, 2008),pp. 1-7.
"iPad User Guide", retrieved from <http://cyndidannerkuhn.info/CDK/iPads_Resources_files/iPad_User_Guide.pdf> on Jun. 17, 2011,154 pages.
"iPod touch User Guide for iPhone OS 3.0 Software", Apple Inc.,(2009),153 pages.
"Keyboard (5)", Retrieved from: <http://landru.uwaterloo.ca/cgi-bin/man.cgi?section=5&topic=keyboard> on Dec. 11, 2008., (Aug. 11, 1997),8 Pages.
"Keyboard Shortcuts", Retrieved from: <http://www.pctoday.com/editorial/article.asp?article=articles%2F2005%2Ft0311%2F26t11%2F26t11.asp> on Aug. 3, 2009., (Nov. 2005),5 pages.
"Kiosk Browser Chrome Customization Firefox 2.x", Retrieved from: <http://stlouis-shopper.com/cgi-bin/mozdev-wiki/,pl?ChromeCustomization> on Oct. 22, 2008 Making a new chrome for kiosk browser, Kiosk Project Kiosk Browser Chrome Customization Firefox-2.x,(Aug. 16, 2007),2 pages.
"Live Photo Gallery—Getting Started—from Camera To Panorama", Retrieved from <http://webdotwiz.spaces.live.com/blog/cns!2782760752B93233!1729.entry> on May 5, 2009., (Sep. 2008)., 7 Pages.
"Magic Mouse", Retrieved from: <http://www.apple.com/magicmouse/> on May 10, 2011,3 pages.
"MIDTB Tip Sheet: Book Courier", Retrieved from: <http://www.midtb.org/tipsbookcourier.htm> on Dec. 11, 2008., (Sep. 26, 2005),6 Pages.
"Mobile/UI/Designs/TouchScreen", Retrieved from: <https://wiki.mozilla.org/Mobile/UI/Designs/TouchScreen> On May 6, 2009., (Feb. 3, 2009),15 Pages.
"moGo beta v.0.4", Retrieved from: <http://forum.xda-developers.com/showthread.php?t=375196> on Sep. 27, 2010, (Mar. 7, 2008),10 pages.
"Multi-touch", Retrieved from <http://en.wikipedia.org/wiki/Multi-touch#Microsoft_Surface> on Apr. 24, 2009, (Apr. 17, 2009),8 pages.
"New Features in WhatsUp Gold v12.0", retrieved from <http://www.netbright.co.th/?name=product&file=readproduct&id=12> on Jun. 10, 2011,4 pages.
"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., (Jan. 27, 2006),2 Pages.
"Non-Final Office Action", U.S. Appl. No. 11/215,052, (Jun. 23, 2011),17 pages.
"Non-Final Office Action", U.S. Appl. No. 11/502,264, (Sep. 14, 2012),14 pages.
"Non-Final Office Action", U.S. Appl. No. 12/244,545, (Mar. 27, 2012),18 pages.
"Non-Final Office Action", U.S. Appl. No. 12/244,545, (Aug. 17, 2011),15 pages.
"Non-Final Office Action", U.S. Appl. No. 12/413,977, (Jul. 19, 2011),17 pages.
"Non-Final Office Action", U.S. Appl. No. 12/413,977, (Jul. 20, 2012),18 pages.
"Non-Final Office Action", U.S. Appl. No. 12/414,382, (Jul. 26, 2011),9 pages.
"Non-Final Office Action", U.S. Appl. No. 12/414,434, (Jan. 17, 2012),7 pages.
"Non-Final Office Action", U.S. Appl. No. 12/414,434, (May 31, 2012),7 pages.
"Non-Final Office Action", U.S. Appl. No. 12/414,434, (Aug. 2, 2011),6 pages.
"Non-Final Office Action", U.S. Appl. No. 12/414,455, (Aug. 29, 2011),8 pages.
"Non-Final Office Action", U.S. Appl. No. 12/414,458, (Jul. 6, 2011),8 pages.
"Non-Final Office Action", U.S. Appl. No. 12/414,476, (Nov. 9, 2012),22 pages.
"Non-Final Office Action", U.S. Appl. No. 12/414,476, (Aug. 3, 2011),21 pages.
"Non-Final Office Action", U.S. Appl. No. 12/433,605, (Jun. 24, 2011),10 pages.
"Non-Final Office Action", U.S. Appl. No. 12/433,667, (Jun. 7, 2011),15 pages.
"Non-Final Office Action", U.S. Appl. No. 12/433,667, (Feb. 3, 2012),16 pages.
"Non-Final Office Action", U.S. Appl. No. 12/469,419, (Nov. 9, 2011),15 pages.
"Non-Final Office Action", U.S. Appl. No. 12/469,419, (May 23, 2012),13 pages.
"Non-Final Office Action", U.S. Appl. No. 12/469,458, (Jul. 1, 2011),15 pages.
"Non-Final Office Action", U.S. Appl. No. 12/469,458, (Sep. 21, 2012),14 pages.
"Non-Final Office Action", U.S. Appl. No. 12/469,480, (Oct. 17, 2012),16 pages.
"Non-Final Office Action", U.S. Appl. No. 12/469,480, (Sep. 22, 2011),14 pages.
"Non-Final Office Action", U.S. Appl. No. 12/470,558, (Nov. 22, 2011),9 pages.
"Non-Final Office Action", U.S. Appl. No. 12/480,969, (Aug. 7, 2012),15 pages.
"Non-Final Office Action", U.S. Appl. No. 12/484,799, (Aug. 11, 2011),12 pages.

(56) References Cited

OTHER PUBLICATIONS

"Non-Final Office Action", U.S. Appl. No. 12/484,799, (Aug. 7, 2012),13 pages.
"Non-Final Office Action", U.S. Appl. No. 12/484,845, (Dec. 7, 2011),16 pages.
"Non-Final Office Action", U.S. Appl. No. 12/560,081, (Dec. 7, 2011),16 pages.
"Non-Final Office Action", U.S. Appl. No. 12/983,106, (Nov. 9, 2012),17 pages.
"Non-Final Office Action", U.S. Appl. No. 13/492,495, (Sep. 17, 2012),8 pages.
"Notice of Allowance", U.S. Appl. No. 11/215,052, (Mar. 14, 2012),5 pages.
"Notice of Allowance", U.S. Appl. No. 12/414,382, (Apr. 4, 2012),4 pages.
"Notice of Allowance", U.S. Appl. No. 12/414,434, (Aug. 17, 2012),4 pages.
"Notice of Allowance", U.S. Appl. No. 12/414,455, (Jan. 4, 2012),4 pages.
"Notice of Allowance", U.S. Appl. No. 12/414,458, (Oct. 31, 2011),2 pages.
"Notice of Allowance", U.S. Appl. No. 12/414,458, (Nov. 29, 2011),2 pages.
"Notice of Allowance", U.S. Appl. No. 12/414,458, (Aug. 10, 2011),6 pages.
"Notice of Allowance", U.S. Appl. No. 12/470,558, (Apr. 2, 2012),7 pages.
"Notice of Allowance", U.S. Appl. No. 12/470,558, (Aug. 23, 2012),2 pages.
"Notice of Allowance", U.S. Appl. No. 12/484,799, (Oct. 22, 2012),10 pages.
"Notice of Allowance", U.S. Appl. No. 12/484,845, (Mar. 16, 2012),5 pages.
"Notifications", retrieved from <http://msdn.microsoft.com/en-us/library/aa511497.aspx> on May 10, 2011,16 pages.
"OmneMon™ System Resource Metrics", retrieved from <http://www.omnesys.com/documents/OmneMonSRM_Brochure.pdf> on Jun. 10, 2011,3 pages.
"ONYX Graphics Announces New ONYX Prepedge Job Preparation Software", retrieved from <http://www.largeformatreview.com/rip-software/433-onyx-graphics-announces-new-onyx-> on May 10, 2011,2 pages.
"Oracle8i Application Developers Guide—Advanced Queuing Release 2 (8.1.6)", Retrieved from: http://www.cs.otago.ac.nz/oradocs/appdev.817/a76938/adq01in5.htm on May 6, 2009., (Dec. 1999),8 pages.
"Oracle8i Application Developers Guide—Advanced Queuing", Retrieved from: http://www.cs.umbc.edu/help/oracle8/server.815/a68005/03_adq1i.htm on May 6, 2009., (Feb. 1999),29 Pages.
"Oracle8i Concepts Release 8.1.5", Retrieved from: http://www.cs.umbc.edu/help/oracle8/server.815/a67781/c16queue.htm on May 6, 2009., (Feb. 1999),10 Pages.
"Palette Extender 1.0.2", Retrieved from: <http://palette-extender.en.softonic.com/symbian> on Nov. 6, 2008, (Jan. 21, 2003),2 pages.
"Parallax Scrolling", Retrieved from: <http://en.wikipedia.org/wiki/Parallax_scrolling> on May 5, 2009., (May 4, 2009),3 pages.
"PCT Search Report and Written Opinion", Application No. PCT/US2009/061382, (May 26, 2010),10 pages.
"PCT Search Report and Written Opinion", Application No. PCT/US2009/061735, (Jun. 7, 2010),11 pages.
"PCT Search Report and Written Opinion", Application No. PCT/US2010/028699, (Oct. 4, 2010),10 pages.
"PCT Search Report and Written Opinion", Application No. PCT/US2010/028555, (Oct. 12, 2010),10 pages.
"PCT Search Report and Written Opinion", Application No. PCT/US2010/034772, (Dec. 29, 2010),12 pages.
"PCT Search Report and Written Opinion", Application No. PCT/US2011/055511, (Apr. 24, 2012),9 pages.
"PCT Search Report and Written Opinion", Application No. PCT/US2011/055520, (May 9, 2012),8 pages.
"PCT Search Report and Written Opinion", Application No. PCT/US2011/055523, (May 10, 2012),9 pages.
"PCT Search Report and Written Opinion", Application No. PCT/US2011/055513, (Mar. 27, 2012),8 pages.
"PCT Search Report and Written Opinion", Application No. PCT/US2011/055512, (May 24, 2012),8 pages.
"PCT Search Report and Written Opinion", Application No. PCT/US2011/055524, (Jun. 1, 2012),8 pages.
"PCT Search Report and Written Opinion", Application No. PCT/US2011/065702, (Aug. 29, 2012),8 pages.
"PCT Search Report and Written Opinion", Application No. PCT/US2011/055712, (Sep. 21, 2012),9 pages.
"PCT Search Report and Written Opinion", Application No. PCT/US2011/055736, (Sep. 17, 2012),8 pages.
"PCT Search Report and Written Opinion", Application No. PCT/US2011/055496, (Sep. 12, 2012),9 pages.
"PCT Search Report and Written Opinion", Application No. PCT/US2011/067073, (Sep. 17, 2012),8 pages.
"PCT Search Report and Written Opinion", Application No. PCT/US2011/055746, (Sep. 27, 2012),9 pages.
"PCT Search Report and Written Opinion", Application No. PCT/US2011/055725, (Sep. 27, 2012),10 pages.
"PCT Search Report and Written Opinion", Application No. PCT/US2011/055478, (Sep. 27, 2012),9 pages.
"PCT Search Report and Written Opinion", Application No. PCT/US2011/055493, (9/26/212),9 pages.
"PCT Search Report and Written Opinion", PCT Application No. PCT/US2010/038730, (Jan. 19, 2011),8 pages.
"PCT Search Report", Application Serial No. PCT/US2009/061864, (May 14, 2010),10 pages.
"Push Notifications Overview for Windows Phone", Retrieved from: <http://msdn.microsoft.com/en-us/library/ff402558%28VS.92%29.aspx> on Sep. 30, 2010, (Sep. 3, 2010),1 page.
"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., (Jul. 15, 2005),5 Pages.
"SecureMe-Anti-Theft Security Application for S60 3rd", Retrieved from: http://www.killermobile.com/newsite/mobile-software/s60-applications/secureme-%11-anti%11theft-security-application-for-s60-3rd.htm> on Jun. 28, 2011, (Dec. 15, 2008),3 pages.
"Snap", *Windows 7 Features*, retrieved from <http://windows.microsoft.com/en-US/windows7/products/features/snap> on Sep. 23, 2011,2 pages.
"Symbian Applications", Retrieved from: <http://symbianfullversion.blogspot.com/2008_12_01_archive.html> on May 5, 2009., (Jan. 2009),51 pages.
"The Map Screen", retrieved from <http://www.symbianos.org/whereamiusersguide> on Jun. 17, 2011,3 pages.
"Top 3 Task Switchers for Andriod", *TechCredo*, retrieved from <http://www.techcredo.com/android/top-3-task-switchers-for-android>on May 11, 2011,(Mar. 9, 2011),5 pages.
"Top Andriod App: Swipepad", *Best Android Apps Review*, retrieved from <http://www.bestandroidappsreview.com/2011/01/top-android-app-swipepad-launcher.html> on May 11, 2011,4 pages.
"Touch Shell Free", Retrieved from: <http://www.pocketpcfreeware.mobi/download-touch-shell-free.html> on May 5, 2009., (Feb. 23, 2009),2 Pages.
"User Guide", retrieved from <http://wireframesketcher.com/help/help.html> on Jun. 17, 2011,19 pages.
"Windows 8 Is Gorgeous, But Is It More Than Just a Shell? (Video)", retrieved from <http://techcrunch.com/2011/06/02/windows-8-gorgeous-shell-video/> on Jun. 20, 2011,(Jun. 2, 2011),6 pages.
"Windows Phone 7 (Push Notification)", retrieved from <http://unknownerror.net/2011-06/windows-phone-7-push-notification-36520> on Jul. 6, 2011,4 pages.
"Windows Phone 7 Live Tiles", Retrieved from: <http://www.knowyourmobile.com/microsoft/windowsphone7/startscreen/640737/windows_phone_7_live_tiles.html> on May 11, 2011,(Oct. 20, 2010),3 pages.

(56) References Cited

OTHER PUBLICATIONS

"Winterface Review", Retrieved from: <http://www.mytodayscreen.com/winterface-review/> on Nov. 12, 2008, (Jul. 9, 2008),42 pages.

"Womma", Retrieved from: <http://www.womma.org/blog/links/wom-trends/> on May 5, 2009., (2007),70 Pages.

"Working with Multiple Windows", *MSOFFICE tutorial*!, retrieved from <http://www.msoffice-tutorial.com/working-with-multiple-windows.php> on Sep. 23, 2011,3 pages.

"YUI 3: ScrollView [beta]", Retrieved from: <http://developer.yahoo.com /yui/3/scrollview/> on Sep. 28, 2010, 5 pages.

Bates, John "A Framework to Support Large-Scale", *University of Cambridge Computer Laboratory*, Available at <http://citeseerx.ist.psu.edu/viewdoc/download?doi=10.1.1.48.1690&rep=rep1&type=pdf>,(1996),8 pages.

Beiber, Gerald et al., "Screen Coverage: A Pen-Interaction Problem for PDA's and Touch Screen Computers", In Proceedings of ICWMC 2007,(Mar. 2007),6 pages.

Bowes, James et al., "Transparency for Item Highlighting", *Faculty of Computing Science, Dalhousie University*, Available at <http://torch.cs.dal.ca/~dearman/pubs/GI2003-bowes,dearman,perkins-paper.pdf>,(2003),2 pages.

Carrera, Enrique V., et al., "Conserving Disk Energy in Network Servers", available at <http://citeseerx.ist.psu.edu/viewdoc/download?doi=10.1.1.6.8301&rep=rep1&type=ps>,(Nov. 2002),15 pages.

Cawley, Christian "How to Customise Your Windows Phone 7", Retrieved from: <http://www.brighthub.com/mobile/windows-mobile-platform/articles/95213.aspx> on May 10, 2011,(Nov. 12, 2010),3 pages.

Cawley, Christian "Windows Phone 7 Customization Tips and Tricks", retrieved from <http://www.brighthub.com/mobile/windows-mobile-platform/articles/95213.aspx> on Jun. 20, 2011,(May 16, 2011),2 pages.

Cohen, Michael F., et al., "Wang Tiles for Image and Texture Generation", *In Proceedigns of SIGGRAPH 2003*, Available <http://research.microsoft.com/en-us/um/people/cohen/WangFinal.pdf>,(2003),8 pages.

Damien, "7 Ways to Supercharge Multitasking in Android", retrieved from <http://maketecheasiercom/7-ways-to-supercharge-multitasking-in-android/2011/01/22/> on May 11, 2011,(Jan. 22, 2011),5 pages.

Davis, Ashley "A WPF Custom Control for Zooming and Panning", Retrieved from: <http://www.codeproject.com/KB/WPF/zoomandpancontrol.aspx> on Sep. 28, 2010, (Jun. 29, 2010),21 pages.

Delimarsky, Den "Sending Tile Push Notifications on Windows Phone 7", retrieved from <http://mobile.dzone.com/articles/sending-tile-push> on May 10, 2011,(Aug. 25, 2010),2 pages.

Denoue, Laurent et al., "WebNC: Efficent Sharing of Web applications", *In Proceedings of WWW 2009*, Available at <http://www.fxpal.com/publications/FXPAL-PR-09-495.pdf>,(2009),2 pages.

Dolcourt, Jessica "Webware", Retrieved from: <http://news.cnet.com/webmare/?categoryld=2010> May 5, 2009., (May 5, 2009),13 Pages.

Fischer, Bill "Cool Discussion of Push Notifications—Toast and Tile—on Windows Phone", Retrieved from: <http://www.windowsphoneexpert.com/Connection/forums/p/4153/18399.aspx> on Sep. 29, 2010, (May 3, 2010),3 pages.

Gade, Lisa "Samsung Alias u740", Retrieved from: <http://www.mobiletechreview.com/phones/Samsung-U740.htm> on Nov. 20, 2008, (Mar. 14, 2007),6 pages.

Gao, Rui "A General Logging Service for Symbian based Mobile Phones", Retrieved from: <http://www.nada.kth.se/utbildning/grukth/exjobb/rapportlistor/2007/rapporter07/gao_rui_07132.pdf.> on Jul. 17, 2008, (Feb. 2007),pp. 1-42.

Ha, Rick et al., "SIMKEYS: An Efficient Keypad Configuration for Mobile Communications", Retrieved from: <http://ieeexplore.ieee.org/stamp/stamp.jsp?arnumber=01362557.> on Dec. 17, 2008,(Nov. 2004),7 Pages.

Harrison, Richard "Symbian OS C++ for Mobile Phones vol. 3", Retrieved from: <http://www.amazon.co.uk/Symbian-OS-Mobile-Phones-Press/dp/productdescription/0470066415> on Oct. 23, 2008, Symbian Press,(Jun. 16, 2003),4 pages.

Hickey, Andrew R., "Google Android has Landed; T-Mobile, HTC Unveil G1", Retrieved from: <http://www.crn.com/retail/210603348> on Nov. 26, 2008., (Sep. 23, 2008),4 pages.

Kcholi, Avi "Windows CE .NET Interprocess Communication", Retrieved from: http://msdn.microsoft.com/en-us/library/ms836784.aspx on Jul. 17, 2008., (Jan. 2004),15 Pages.

La, Nick "Parallax Gallery", Available at <http://webdesignerwall.comtutorials/parallax-gallery/comment-page-1>,(Apr. 25, 2008),16 pages.

Long, Todd "Gmail Manager 0.6", Retrieved from: <https://addons.mozilla.org/en-US/firefox/addon/1320/> on Sep. 29, 2010, (Jan. 27, 2010),4 pages.

Mann, Richard et al., "Spectrum Analysis of Motion Parallax in a 3D Cluttered Scene and Application to Egomotion", *Journal of the Optical Society of America A, vol. 22, No. 9*, Available at <http://www.cs.uwaterloo.ca/~mannr/snow/josa-mann-langer.pdf>, (Sep. 2005),pp. 1717-1731.

Mantia, Louie "Multitasking: What Does It Mean?", retrieved from <http://mantia.me/blog/multitasking/> on Sep. 23, 2011,3 pages.

Mao, Jeng "Comments of Verizon Wireless Messaging Services, LLC", Retrieved from: http://www.ntia.doc.gov/osmhome/warnings/comments/verizon.htm on May 6, 2009., (Aug. 18, 2000),5 Pages.

Marie, Angelina "MacBook Trackpad Four Fingers Swipe Left/Right to Switch Applications", *MacBook Junkie*, retrieved from <http://www.macbookjunkie.com/macbook-trackpad-four-fingers-swipe-left-right-to-switch-applications/> on May 11, 2011,(Nov. 13, 2010),4 pages.

Mei, Tao et al., "Probabilistic Multimodality Fusion for Event Based Home Photo Clustering", Retrieved from: <http://ieeexplore.ieee.org//stamp/stamp.jsp?tp=&arnumber=04036960.>, (Dec. 26, 2006),pp. 1757-1760.

Nordgren, Peder "Development of a Touch Screen Interface for Scania Interactor", *Masters Thesis in Computing Science, UMEA University*, Available at <http://www.cs.umu.se/education/examina/Rapporter/PederNordgren.pdf>,(Apr. 10, 2007),pp. 1-59.

Oliver, Sam "Potential iPhone Usability and Interface Improvements", Retrieved from: <http://www.appleinsider.com/articles/08/09/18/potential_iphone_usability_and_interface_improvements.html> on Nov. 12, 2008, AppleInsider,(Sep. 18, 2008),4 pages.

Oryl, Michael "Review: Asus P527 Smartphone for North America", Retrieved from: <http://www.mobileburn.com/review.jsp?Id=4257> on Dec. 17, 2008., (Mar. 5, 2008),1 Page.

Padilla, Alfredo "Palm Treo 750 Cell Phone Review—Hardware", Retrieved from: <http://www.wirelessinfo.com/content/palm-Treo-750-Cell-Phone-Review/Hardware.htm> on Dec. 11, 2008., (Mar. 17, 2007),4 Pages.

Paul, Ryan "Hands-on: KDE 4.5 Launches with Tiling, New Notifications", Retrieved from: <http://arstechnica.com/open-source/reviews/2010/08/hands-on-kde-45-launches- with-tiling-new-notifications.ars> on Sep. 29, 2010, (Aug. 2010),3 pages.

Raghaven, Gopal et al., "Model Based Estimation and Verification of Mobile Device Performance", Available at http://alumni.cs.ucsb.edu/~raimisl/emsoft04_12.pdf.,(Sep. 27-29, 2004),10 Pages.

Ray, Bill "Microsoft Re-Tiles Mobile Platform for Windows 7 Era", retrieved from <http://www.theregister.co.uk/2010/02/15/windows_phone_7_series/> on May 11, 2011,(Feb. 15, 2010),2 pages.

Reed, Brad "Microsoft Demos Windows Mobile 6.1 at CTIA", Retrieved from: <http://www.networkworld.com/news/2008/040208-ctia-microsoft-windows-mobile.html> on Jul. 18, 2008, (Apr. 2, 2008),1 page.

Remond, Mickael "Mobile Marketing Solutions", Retrieved from: <http://www.mobilemarketingmagazine.co.uk/mobile_social_networking/> on May 5, 2009., (Apr. 28, 2009),16 Pages.

Rice, Stephen V., et al., "A System for Searching Sound Palettes", *Proceedings of the Eleventh Biennial Symposium on Arts and Technology.*, Available at <http://www.comparisonics.com/FindSoundsPalettePaper.pdf>,(Feb. 2008),6 pages.

(56) References Cited

OTHER PUBLICATIONS

Ritchie, Rene "iOS 4 features: iPod touch Wi-Fi stays connected when asleep—iPhone too?", Retrieved from: <http://www.goip.com/2010/06/ios-4-features-ipod-touch-wi-fi-stays-connected-when-asleep-%E2%80%94-iphone-too/> on Sep. 30, 2010, (Jun. 14, 2010),2 pages.
Ritscher, Walt "Using Surface APIs in your WPF—Part 1", Retrieved from: <http://blog.wpfwonderland.com/2009/06/30/using-surface-apis-in-your-wpf-application/> on Sep. 28, 2010, (Jun. 30, 2009),7 pages.
Roberts, Neil "Touching and Gesturing on the iPhone", Available at <http://www.sitepen.com/blog/2008/07/10/touching-and-gesturing-on-the-iphone/comments-pare-1>,(Jul. 10, 2008),16 pages.
Sandoval, Guillermo L., "A development platform and execution environment for mobile applications", *Universidad Autónoma de Baja California, School of Chemical Sciences and Engineering*, Available at <http://citeseerx.ist.psu.edu/viewdoc/download-?doi=10.1.1.86.7989&rep=rep1&type=pdf> ,(2004),18 pages.
Singh, Kundan et al., "Cinema: Columbia InterNet Extensible Multimedia Architecture", Available at <http://www1.cs.columbia.edu/~library/TR-repository/reports/reports-2002/cucs-011-02.pdf>,(Sep. 3, 2002),83 Pages.
Smith, Greg et al., "GroupBar: The TaskBar Evolved", *Proceedings of OZCHI 2003*, Available at <http://research.microsoft.com/pubs/64316/ozchi2003-groupbar.pdf>,(Nov. 2003),pp. 1-10.
Steinicke, Frank et al., "Multi—Touching 3D Data: Towards Direct Interaction in Steroscopic Display Enviroments coupled with Mobile Devices", *Advanced Visual Interfaces (AVI) Workshop on Designing Multi-Touch Interaction Techniques for Coupled Public*, Available at <http://viscg.uni-muenster.de/publications/2008/SHSK08/ppd-workshop.-pdf.>,(Jun. 15, 2008),4 Pages.
Suror, "PocketShield-New Screenlock App for the HTC Diamond and Pro", Retrieved from: <http://wmpoweruser.com/?tag=htc-touch-diamond> on Jun. 28, 2011, (Oct. 23, 2008),2 pages.
Terpstra, Brett "Beta Beat: Grape, a New Way to Manage Your Desktop Clutter", Retrieved from: *Beta Beat: Grape, a New Way to Manage Your Desktop Clutter* on Jun. 28, 2011, (Apr. 14, 2009),4 pages.
Vallerio, Keith S., et al., "Energy-Efficient Graphical User Interface Design", Retrieved from: <http://www.cc.gatech.edu/classes/AY2007/cs7470_fall/zhong-energy-efficient-user-interface.pdf>, (Jun. 10, 2004),pp. 1-13.
Vermeulen, Jan "BlackBerry PlayBook Hands-on", retrieved from <http://mybroadband.co.za/news/gadgets/20104-BlackBerry-PlayBook-hands-.html> on May 11, 2011,(May 8, 2011),4 pages.
Viticci, Federico "Growl 1.3 to Be Released on Mac App Store, Introduce Lion Support and Drop GrowlMail Support", Retrieved from: <http://www.macstories.net/stories/growl-1-3-to-be-released-on-mac-app-store-introduce-lion-support-and-drop-growlmail-support/> on Jul. 22, 2011,(Jul. 6, 2011),6 pages.
Vonberger, Jan "Bluetile", Retrieved from: <http://www.bluetile.org> on Sep. 29, 2010, 5 pages.
Wilson, Andrew D., "Robust Computer Vision-Based Detection of Pinching for One and Two-Handed Gesture Input", in *Proceedings of UIST 2006*, Available at <http://research.microsoft.com/en-us/um/people/awilson/publications/wilsonuist2006/uist%202006%20taffi.pdf>,(Oct. 2006),4 pages.
Wilson, Tracy V., "How the iPhone Works", Retrieved from: <http://electronics.howstuffworks.com/iphone2.htm> on Apr. 24, 2009, (Jan. 2007),9 pages.
Wobbrock, Jacob O., et al., "User-Defined Gestures for Surface Computing", *CHI 2009*, Apr. 4-9, 2009, Boston, MA, available at <http://faculty.washington.edu/wobbrock/pubs/chi-09.2.pdf>,(Apr. 4, 2009),10 pages.
Wu, Chung et al., "Achieving a Superior Ownership Experience in Manageability and Quality for Siebel CRM", available at <http://www.oracle.com/us/products/enterprise-manager/superior-exp-for-siebel-crm-068962.pdf>,(Aug. 2008),25 pages.
Wyatt, Paul "/Flash/the art of parallax scrolling", .net Magazine,(Aug. 1, 2007),pp. 74-76.
Yang, Seungji et al., "Semantic Photo Album Based on MPEG-4 Compatible Application Format", Retrieved from: <http://ieeexplore.ieee.org/stamp/stamp.jsp?arnumber=04146254.>, (2007),2 Pages.
Bjork, Staffan et al., "Redefining the Focus and Context of Focus+Context Visualizations", In *Proceedings of INFOVIS 2000*, Available at <http://www.johan.redstrom.se/papers/redefining.pdf>,(Oct. 2000), 9 pages.
Buring, Thorsten "User Interaction with Scatterplots on Small Screens—A Comparative Evaluation of Geometric-Semantic Zoom and Fisheye Distortion", *IEEE Transactions on Visualization and Computer Graphics*, vol. 12, Issue 5, Available at <http://citeseerx.ist.psu.edu/viewdoc/download?doi=10.1.1.134.4568&rep=rep1&type=pdf >,(Sep. 2006), pp. 829-836.
Dunsmuir, Dustin "Selective Semantic Zoom of a Document Collection", Available at <http://www.cs.ubc.ca/~tmm/courses/533/projects/dustin/proposal.pdf>,(Oct. 30, 2009), pp. 1-9.
Janecek, Paul et al., "An Evaluation of Semantic Fisheye Views for Opportunistic Search in an Annotated Image Collection", Available at <http://citeseerx.ist.psu.edu/viewdoc/download?doi=10.1.1.67.3084&rep=rep1&type=pdf> ,(Feb. 15, 2005), pp. 1-15.
"Non-Final Office Action", U.S. Appl. No. 12/972,967, (Jan. 30, 2013),19 pages.
"Non-Final Office Action", U.S. Appl. No. 12/977,584, (Dec. 7, 2012), 8 pages.
"Non-Final Office Action", U.S. Appl. No. 12/978,184, (Jan. 23, 2013), 7 pages.
"Non-Final Office Action", U.S. Appl. No. 13/196,272, (Feb. 6, 2013),10 pages.
"Non-Final Office Action", U.S. Appl. No. 13/224,258, (Jan. 8, 2013), 35 pages.
"Non-Final Office Action", U.S. Appl. No. 13/492,495, (Dec. 19, 2012), 6 pages.
"Non-Final Office Action", U.S. Appl. No. 13/655,386, (Dec. 26, 2012), 23 pages.
"Non-Final Office Action", U.S. Appl. No. 13/656,354, (Feb. 6, 2013),10 pages.
"Non-Final Office Action", U.S. Appl. No. 13/656,574, (Jan. 31, 2013), 21 pages.
"Non-Final Office Action", U.S. Appl. No. 13/657,621, (Feb. 7, 2013),19 pages.
"Non-Final Office Action", U.S. Appl. No. 13/657,646, (Jan. 3, 2013),13 pages.
"Non-Final Office Action", U.S. Appl. No. 13/657,789, (Jan. 9, 2013), 38 pages.
"PCT Search Report and Written Opinion", Application No. PCT/US2011/067075, (Dec. 12, 2012),10 pages.
Livingston, et al., "Windows 95 Secrets", 1995, *I DG Books Worldwide, 3rd Edition*, (1995), pp. 121-127.
Perry, Greg "Teach Yourself Windows 95 in 24 Hours", 1997, *Sams Publishing*, 2nd Edition (1997), pp. 193-198.
"Final Office Action", U.S. Appl. No. 11/502,264, (Mar. 29, 2013),16 pages.
"My Favorite Gadgets, System Monitor II", Retrieved from <http://www.myfavoritegadgets.info/monitors/SystemMonitorII/system-monitorII.html> on Mar. 12, 2013, (Jun.8, 2010), 5 pages.
"Non-Final Office Action", U.S. Appl. No. 13/118,204, (Feb. 28, 2013),13 pages.
"Non-Final Office Action", U.S. Appl. No. 13/118,257, (Mar. 5, 2013),19 pages.
"Non-Final Office Action", U.S. Appl. No. 13/118,339, (Feb. 11, 2013),15 pages.
"Non-Final Office Action", U.S. Appl. No. 13/118,347, (Feb. 12, 2013),14 pages.
"Non-Final Office Action", U.S. Appl. No. 13/229,693, (Mar. 12, 2013), 21 pages.
"Notice of Allowance", U.S. Appl. No. 13/492,495, (Apr. 26, 2013), 5 pages.
"PCT Search Report and Written Opinion", Application No. PCT/US2012/047091, (Dec. 27, 2012),15 pages.
Bruzzese, J. P., "Using Windows 7, Managing and Monitoring Windows 7—Chapter 11", *Que Publishing*, (May 5, 2010), 33 pages.

(56) References Cited

OTHER PUBLICATIONS

Gralla, Preston "Windows XP Hacks, Chapter 13—Hardware Hacks", *O'Reilly Publishing*, (Feb. 23, 2005), 25 pages.
Horowitz, Michael "Installing and Tweaking Process Explorer part 2", Retrieved <http://web.archive.org/web/20110510093838/http://blogs.computerworld.com/16165/installing_and_tweaking_process_explorer_part_2> on Mar. 12, 2013, (May 23, 2010), 7 pages.
"Non-Final Office Action", U.S. Appl. No. 13/228,888, Feb. 10, 2014, 21 pages.
"Final Office Action", U.S. Appl. No. 13/118,321, Dec. 19, 2013, 30 pages.
"Final Office Action", U.S. Appl. No. 13/655,386, (Jun. 6, 2013), 34 pages.
"Final Office Action", U.S. Appl. No. 13/656,354, (Jun. 17, 2013), 14 pages.
"Final Office Action", U.S. Appl. No. 13/657,646, (May 6, 2013), 12 pages.
"Final Office Action", U.S. Appl. No. 13/657,789, (Jun. 21, 2013), 35 pages.
"Non-Final Office Action", U.S. Appl. No. 13/073,300, (Jul. 25, 2013), 13 pages.
"Non-Final Office Action", U.S. Appl. No. 13/118,321, (Jun. 10, 2013), 32 pages.
"Non-Final Office Action", U.S. Appl. No. 13/118,333, (Jul. 5, 2013), 18 pages.
"Notice of Allowance", U.S. Appl. No. 12/977,584, (Jun. 19, 2013), 5 pages.
"Notice of Allowance", U.S. Appl. No. 13/655,390, (May 24, 2013), 5 pages.
"Supplemental Notice of Allowance", U.S. Appl. No. 13/655,390, (Jul. 25, 2013), 2 pages.
Kurdi, Samer "Acer GridVista: snap your windows to pre-defined sections on your screen(s)", Retrieved from <http://www.freewaregenius.com/acer-gridvista-snap-your-windows-to-pre-defined-sections-of-your-screens/> on Jun. 30, 2013, (Jan. 19, 2010), 6 pages.
Kurdi, Samer "WinSplit Revolution", Retrieved from <http://www.freewaregenius.com/winsplit-revolution/> on Jun. 30, 2013, (Aug. 22, 2007), 4 Pages.
"Final Office Action", U.S. Appl. No. 12/721,422, (Mar. 7, 2013), 10 pages.
"Final Office Action", U.S. Appl. No. 13/118,339, (Aug. 22, 2013), 21 pages.
"Final Office Action", U.S. Appl. No. 13/118,347, (Aug. 15, 2013), 25 pages.
"Final Office Action", U.S. Appl. No. 13/656,574, (Aug. 23, 2013), 20 pages.
"Non-Final Office Action", U.S. Appl. No. 12/721,422, (Oct. 1, 2012), 7 pages.
"Non-Final Office Action", U.S. Appl. No. 13/196,272, (Sep. 3, 2013), 5 pages.
"Notice of Allowance", U.S. Appl. No. 12/721,422, (Jul. 11, 2013), 9 pages.
"Notice of Allowance", U.S. Appl. No. 12/978,184, (Aug. 2, 2013), 5 pages.
"You've Got Mail 1.4 Build", retrieved from <http://www.fileshome.com/Shows_Animation_Plays_Sound_Automatic_N . . . > on Jan. 6, 2010 (Jun. 18, 2007), 2 pages.
Farrugia, Michael et al., "Cell Phone Mini Challenge: Node-Link Animation Award Animating Multivariate Dynamic Social Networks", *IEEE Symposium on Visual Analytics Science and Technology*, Columbus, OH, USA, Oct. 21-23, 2008, (Oct. 21, 2008), 2 pages.
Keranen, Jaakko "OpenGL-based User Interface Toolkit for Symbian Mobile Devices", *Master of Science Thesis*, Tamere University of Technology, Department of Information Technology, (Apr. 6, 2005), 88 pages.
"Foreign Office Action", CN Application No. 201110429183.5, Jan. 6, 2014, 10 Pages.
"Foreign Office Action", CN Application No. 201110437542.1, Jan. 6, 2014, 10 Pages.
"Foreign Office Action", CN Application No. 201110437572.2, Dec. 3, 2013, 7 pages.
"Foreign Office Action", CN Application No. 201110454251.3, Dec. 27, 2013, 12 Pages.
"Restriction Requirement", U.S. Appl. No. 13/118,265, Feb. 27, 2014, 7 pages.
"Restriction Requirement", U.S. Appl. No. 13/118,288, Mar. 4, 2014, 7 pages.
"Supplemental Notice of Allowance", U.S. Appl. No. 12/978,184, Feb. 25, 2014, 2 pages.
"Final Office Action", U.S. Appl. No. 12/972,967, (Oct. 11, 2013), 21 pages.
"Final Office Action", U.S. Appl. No. 12/983,106, (Oct. 7, 2013), 19 pages.
"Final Office Action", U.S. Appl. No. 13/118,204, (Nov. 21, 2013), 24 pages.
"Final Office Action", U.S. Appl. No. 13/224,258, (Sep. 11, 2013), 37 pages.
"Final Office Action", U.S. Appl. No. 13/229,693, (Sep. 4, 2013), 23 pages.
"Final Office Action", U.S. Appl. No. 13/657,621, (Sep. 10, 2013), 18 pages.
"Non-Final Office Action", U.S. Appl. No. 13/228,707, (Oct. 25, 2013), 12 pages.
"Non-Final Office Action", U.S. Appl. No. 13/228,876, (Nov. 22, 2013), 14 pages.
"Non-Final Office Action", U.S. Appl. No. 13/229,155, (Nov. 18, 2013), 14 pages.
"Non-Final Office Action", U.S. Appl. No. 13/655,390, (Dec. 17, 2012), 12 pages.
"Notice of Allowance", U.S. Appl. No. 12/978,184, (Nov. 6, 2013), 5 pages.
"Notice of Allowance", U.S. Appl. No. 13/196,272, (Nov. 8, 2013), 8 pages.
"Supplemental Notice of Allowance", U.S. Appl. No. 12/977,584, (Sep. 16, 2013), 2 pages.
"Supplemental Notice of Allowance", U.S. Appl. No. 12/977,584, (Oct. 11, 2013), 2 pages.
"Supplemental Notice of Allowance", U.S. Appl. No. 13/655,390, (Sep. 19, 2013), 2 pages.
"Final Office Action", U.S. Appl. No. 13/073,300, Apr. 1, 2014, 14 pages.
"Final Office Action", U.S. Appl. No. 13/118,333, Apr. 23, 2014, 22 pages.
"Final Office Action", U.S. Appl. No. 13/224,258, Jul. 18, 2014, 39 pages.
"Final Office Action", U.S. Appl. No. 13/228,707, May 21, 2014, 16 pages.
"Final Office Action", U.S. Appl. No. 13/228,876, Jul. 18, 2014, 15 pages.
"Final Office Action", U.S. Appl. No. 13/229,155, Jun. 12, 2014, 15 pages.
"Final Office Action", U.S. Appl. No. 13/345,383, Jul. 25, 2014, 26 pages.
"First Examination Report", NZ Application No. 618269, May 20, 2014, 2 pages.
"First Examination Report", NZ Application No. 618284, May 20, 2014, 2 pages.
"Foreign Office Action", CN Application No. 201110429183.5, Aug. 21, 2014, 13 Pages.
"Foreign Office Action", CN Application No. 201180071186.4, Jun. 13, 2014, 12 pages.
"Foreign Office Action", CN Application No. 201210317470.1, Jun. 5, 2014, 12 pages.
"Gestures Programming", Retrieved from <http://doc.qt.digia.com/4.6/gestures-overview.html> on May 28, 2014, 2010, 3 pages.
"Image Gestures Example", Retrieved from <http://doc.qt.digia.com/4.6/gestures-imagegestures.html> on May 28, 2014, 2010, 3 pages.
"Non-Final Office Action", U.S. Appl. No. 12/983,106, Sep. 10, 2014, 19 pages.

(56) References Cited

OTHER PUBLICATIONS

"Non-Final Office Action", U.S. Appl. No. 13/118,265, Jun. 10, 2014, 13 pages.
"Non-Final Office Action", U.S. Appl. No. 13/118,288, Jul. 2, 2014, 17 pages.
"Non-Final Office Action", U.S. Appl. No. 13/118,292, Jun. 6, 2014, 25 pages.
"Non-Final Office Action", U.S. Appl. No. 13/228,945, Apr. 14, 2014, 22 pages.
"Non-Final Office Action", U.S. Appl. No. 13/229,556, Mar. 28, 2014, 12 pages.
"Non-Final Office Action", U.S. Appl. No. 13/229,693, Jun. 20, 2014, 25 pages.
"Non-Final Office Action", U.S. Appl. No. 13/229,702, Jul. 3, 2014, 28 pages.
"Non-Final Office Action", U.S. Appl. No. 13/229,709, Apr. 7, 2014, 12 pages.
"Non-Final Office Action", U.S. Appl. No. 13/657,621, Jul. 18, 2014, 22 pages.
"Non-Final Office Action", U.S. Appl. No. 13/657,646, Aug. 12, 2014, 14 pages.
"Notice of Allowance", U.S. Appl. No. 13/118,204, Jul. 8, 2014, 8 pages.
"Notice of Allowance", U.S. Appl. No. 13/229,556, Sep. 2, 2014, 12 pages.
"Notice of Allowance", U.S. Appl. No. 13/229,709, Sep. 2, 2014, 4 pages.
"Notice of Allowance", U.S. Appl. No. 13/655,386, Apr. 25, 2014, 6 pages.
"Notice of Allowance", U.S. Appl. No. 13/656,574, Sep. 23, 2014, 7 pages.
"Notice of Allowance", U.S. Appl. No. 13/657,789, Aug. 4, 2014, 16 pages.
"QPinchGesture Class Reference", Retrieved from <http://doc.qt.digia.com/4.6/qpinchgesture.html> on May 28, 2014, 2010, 6 pages.
"Supplemental Notice of Allowance", U.S. Appl. No. 13/118,204, Sep. 10, 2014, 2 pages.
Anson, "Pining for Windows Phone 7 controls? We got ya covered! [Announcing the first release of the Silverlight for Windows Phone Toolkit!]", Retrieved from <http://blogs.msdn.com/b/delay/archive/2010/09/16/pining-for-windows-phone-7-controls-we-got-ya-covered-announcing-the-first-release-of-the-silverlight-for-windows-phone-toolkit.aspx> on May 30, 2014, Sep. 16, 2010, 17 pages.
"Foreign Office Action", CN Application No. 201210331686.3, Jun. 13, 2014, 13 pages.
"Supplemental Notice of Allowance", U.S. Appl. No. 13/118,204, Oct. 2, 2014, 2 pages.
"Extended European Search Report", EP Application No. 11866579.3, Oct. 9, 2014, 7 pages.
"Final Office Action", U.S. Appl. No. 13/118,265, Nov. 6, 2014, 19 pages.
"Final Office Action", U.S. Appl. No. 13/118,288, Nov. 7, 2014, 14 pages.
"Final Office Action", U.S. Appl. No. 13/118,292, Dec. 5, 2014, 30 pages.
"Final Office Action", U.S. Appl. No. 13/228,888, Oct. 24, 2014, 29 pages.
"Final Office Action", U.S. Appl. No. 13/228,945, Oct. 23, 2014, 24 pages.
"Foreign Notice of Acceptance", NZ Application No. 618269, Oct. 31, 2014, 1 Page.
"Foreign Office Action", CN Application No. 201110454251.3, Oct. 21, 2014, 13 Pages.
"Foreign Office Action", CN Application No. 201180071196.8, Sep. 11, 2014, 13 pages.
"Non-Final Office Action", U.S. Appl. No. 12/972,967, Nov. 6, 2014, 17 pages.
"Non-Final Office Action", U.S. Appl. No. 13/118,321, Nov. 12, 2014, 33 pages.
"Non-Final Office Action", U.S. Appl. No. 13/118,347, Dec. 3, 2014, 28 pages.
"Non-Final Office Action", U.S. Appl. No. 13/228,707, Nov. 13, 2014, 20 pages.
"Non-Final Office Action", U.S. Appl. No. 14/089,149, Nov. 3, 2014, 8 pages.
"Non-Final Office Action", U.S. Appl. No. 14/109,779, Nov. 21, 2014, 9 pages.
"Notice of Allowance", U.S. Appl. No. 14/089,149, Dec. 5, 2014, 4 pages.
"Supplemental Notice of Allowance", U.S. Appl. No. 13/118,204, Oct. 23, 2014, 3 pages.
Webmonkey "HTML Cheatsheet", Retrieved From: <http://www.webmonkey.com/2010/02/html_cheatsheet> on Nov. 7, 2014, Feb. 15, 2010, 5 pages.
"Authoritative Dictionary of IEEE Standards Terms, 7th ed.", Definitions—processor, memory, and storage, 2000, 3 pages.
"Extended European Search Report", EP Application No. 11872137.2, Apr. 9, 2015, 12 pages.
"Final Office Action", U.S. Appl. No. 13/118,321, Apr. 2, 2015, 30 pages.
"Foreign Notice of Allowance", CN Application No. 201110429183.5, Mar. 9, 2015, 4 Pages.
"Foreign Office Action", CN Application No. 201210317470.1, Feb. 11, 2015, 9 pages.
"Foreign Office Action", CN Application No. 201210331670.2, Mar. 25, 2015, 14 pages.
"Foreign Office Action", CN Application No. 201210331686.3, Mar. 3, 2015, 14 pages.
"Non-Final Office Action", U.S. Appl. No. 13/073,300, Apr. 30, 2015, 15 pages.
"Non-Final Office Action", U.S. Appl. No. 13/229,693, Apr. 23, 2015, 28 pages.
"Non-Final Office Action", U.S. Appl. No. 13/550,432, Apr. 27, 2015, 15 pages.
"Notice of Allowance", U.S. Appl. No. 13/118,333, May 4, 2015, 16 pages.
"Notice of Allowance", U.S. Appl. No. 13/118,339, Mar. 31, 2015, 7 pages.
"Notice of Allowance", U.S. Appl. No. 13/118,347, Apr. 1, 2015, 7 pages.
"Notice of Allowance", U.S. Appl. No. 13/229,702, Apr. 29, 2015, 7 pages.
"Rename a file", Retrieved from <http://windows.microsoft.com/en-us/windows7/rename-a-file> on Apr. 27, 2015, Aug. 24, 2009, 1 page.
"Corrected Notice of Allowance", U.S. Appl. No. 13/118,333, Jun. 1, 2015, 4 pages.
"Extended European Search Report", EP Application No. 11871863.4, May 11, 2015, 8 pages.
"Extended European Search Report", EP Application No. 11871917.8, May 11, 2015, 9 pages.
"Final Office Action", U.S. Appl. No. 13/228,707, Jun. 1, 2015, 20 pages.
"Final Office Action", U.S. Appl. No. 13/228,876, Jun. 19, 2015, 20 pages.
"Final Office Action", U.S. Appl. No. 13/229,155, Jun. 4, 2015, 16 pages.
"Foreign Office Action", CL Application No. 3368-2013, May 7, 2015, 7 pages.
"Foreign Office Action", CL Application No. 3370-2013, May 7, 2015, 6 pages.
"Foreign Office Action", CN Application No. 201180071186.4, Jun. 2, 2015, 7 pages.
"Foreign Office Action", CN Application No. 201210331158.8, May 11, 2015, 7 pages.
"Foreign Office Action", CO Application No. 13300256, Apr. 11, 2015, 8 Pages.
"Foreign Office Action", CO Application No. 13300265, Apr. 21, 2015, 11 Pages.
"Foreign Office Action", PH Application No. PH/1/2013/502367, Apr. 24, 2015, 3 pages.

(56) References Cited

OTHER PUBLICATIONS

"Notice of Allowance", U.S. Appl. No. 13/345,383, May 18, 2015, 5 pages.
"Notice of Allowance", U.S. Appl. No. 14/109,779, Jun. 17, 2015, 4 pages.
Bederson,"Implementing a Zooming User Interface: Experience Building Pad++", Software Practice & Experience, Wiley & Sons, Aug. 1998, 34 pages.
Bederson,"Jazz: An Extensible Zoomable User Interface Graphics Toolkit in Java", Proceedings of the 2000 ACM SIGCPR Conference, Apr. 2000, 11 pages.
Jetter,"Materializing the Query with Facet-Streams—A Hybrid Surface for Collaborative Search on Tabletops", May 7, 2011, 10 pages.
"Corrected Notice of Allowance", U.S. Appl. No. 13/118,333, Aug. 4, 2015, 4 pages.
"Corrected Notice of Allowance", U.S. Appl. No. 14/109,779, Jul. 21, 2015, 2 pages.
"Extended European Search Report", EP Application No. 11872072.1, Jul. 28, 2015, 7 pages.
"Final Office Action", U.S. Appl. No. 12/983,106, Jul. 16, 2015, 23 pages.
"Final Office Action", U.S. Appl. No. 13/073,300, Sep. 4, 2015, 17 pages.
"Final Office Action", U.S. Appl. No. 13/224,258, Aug. 13, 2015, 39 pages.
"Foreign Notice of Allowance", CN Application No. 201110437542.1, Aug. 3, 2015, 4 Pages.
"Further Examination Report", NZ Application No. 618284, Jul. 13, 2015, 2 pages.
"Non-Final Office Action", U.S. Appl. No. 13/118,265, Aug. 20, 2015, 18 pages.
"Non-Final Office Action", U.S. Appl. No. 13/118,288, Aug. 24, 2015, 19 pages.
"Non-Final Office Action", U.S. Appl. No. 13/118,321, Sep. 8, 2015, 34 pages.
"Non-Final Office Action", U.S. Appl. No. 14/059,163, Aug. 10, 2015, 5 pages.
"Non-Final Office Action", U.S. Appl. No. 14/659,442, Jul. 7, 2015, 7 pages.
"Notice of Allowance", U.S. Appl. No. 14/659,442, Aug. 19, 2015, 4 pages.
Gladisch,"MultiStates: Monitoring Databases With Acoustic and Intuitive Perspective Wall Interaction", In Proceedings of 2nd International Workshop on Design & Evaluation of e-Government Applications and Services, Aug. 24, 2009, 7 pages.
Johnson, Retrieved from <http://designshack.net/articles/javascript/create-an-awesome-zooming-web-page-with-jquery/> on Aug. 20, 2015, May 25, 2011, 11 pages.
"Corrected Notice of Allowance", U.S. Appl. No. 13/118,333, Sep. 14, 2015, 4 pages.
"Corrected Notice of Allowance", U.S. Appl. No. 14/109,779, Oct. 19, 2015, 2 pages.
"Final Office Action", U.S. Appl. No. 13/550,432, Sep. 14, 2015, 18 pages.
"Foreign Notice of Allowance", CN Application No. 201210331158.8, Sep. 8, 2015, 3 Pages.
"Foreign Office Action", CN Application No. 201110454251.3, Sep. 30, 2015, 10 Pages.
"Foreign Office Action", CN Application No. 201210317470.1, Aug. 24, 2015, 9 pages.
"Foreign Office Action", CN Application No. 201210331564.4, Sep. 2, 2015, 14 pages.
"Foreign Office Action", CN Application No. 201210331584.1, Aug. 19, 2015, 7 pages.
"Foreign Office Action", CN Application No. 201210331686.3, Sep. 1, 2015, 11 pages.
"Foreign Office Action", EP Application No. 11866579.3, Sep. 3, 2015, 4 pages.
"Foreign Office Action", JP Application No. 2014-512819, Sep. 29, 2015, 4 pages.
"Foreign Office Action", JP Application No. 2014-529672, Oct. 6, 2015, 7 pages.
"Notice of Allowance", U.S. Appl. No. 13/229,693, Sep. 14, 2015, 13 pages.
"Search Report", TW Application No. 100136568, Sep. 14, 2015, 2 pages.
"Corrected Notice of Allowance", U.S. Appl. No. 14/659,442, Nov. 10, 2015, 2 pages.
"Corrected Notice of Allowance", U.S. Appl. No. 14/659,442, Nov. 27, 2015, 2 pages.
"Extended European Search Report", U.S. Appl. No. 11871739.6, Oct. 5, 2015, 13 pages.
"Extended European Search Report", EP Application No. 11872164.6, Sep. 18, 2015, 8 pages.
"Final Office Action", U.S. Appl. No. 14/059,163, Dec. 3, 2015, 6 pages.
"Foreign Office Action", CL Application No. 3370-2013, Oct. 29, 2015, 6 pages.
"Foreign Office Action", JP Application No. 2014-512824, Nov. 6, 2015, 5 pages.
"Foreign Office Action", JP Application No. 2014-528371, Sep. 29, 2015, 16 pages.
"Foreign Office Action", JP Application No. 2014-529671, Sep. 29, 2015, 16 pages.
"Foreign Office Action", JP Application No. 2014-529684, Nov. 4, 2015, 10 pages.
"Foreign Office Action", JP Application No. 2014-529685, Nov. 4, 2015, 5 pages.
"Foreign Office Action", JP Application No. 2014-529687, Oct. 20, 2015, 8 pages.
"Foreign Office Action", RU Application No. 2013152630, Oct. 26, 2015, 5 pages.
"Foreign Office Action", RU Application No. 2013152635, Oct. 28, 2015, 7 pages.
"Foreign Office Action", RU Application No. 2014107906, Oct. 6, 2015, 6 pages.
"Foreign Office Action", RU Application No. 2014108844, Oct. 27, 2015, 6 pages.
"Foreign Office Action", RU Application No. 2014108874, Oct. 6, 2015, 6 pages.
"Foreign Office Action", RU Application No. 2014108997, Oct. 14, 2015, 6 pages.
"Introduction to Windows 7", https://www.google.com/url?q=http://www.wright.edu/sites/default/files/page/attachements/windows7.pdf, Jul. 1, 2010, 13 pages.
"Non-Final Office Action", U.S. Appl. No. 13/118,292, Dec. 7, 2015, 32 pages.
"Samsung Galaxy 2 TouchWiz 4.0 Tour (Homescreen, Settings, etc)", https://www.youtube.com/watch?v=oXBbiy0Adiw, May 9, 2011, 3 pages.
D,"Android Apps in Depth—02—Go Launcher EX", https://www.youtube.com/watch?v=u5LISE8BU_E, Mar. 6, 2011, 3 pages.
D,"Android HTC EVO 4G Tutorials 01—Getting Started, Home Screens", https://www.youtube.com/watch?v=fwvt-rsCMA8, Feb. 3, 2011, 3 pages.
Demers,"In Depth: GO Launcher Ex—Droid Life", http://www.droid-life.com/2011/01/26/in-depth-go-launcher-ex/, Jan. 26, 2011, 8 pages.
Sakumi,"Browse/Creation Tool for Hierarchy Contents with Concept Pad System: Zoomable User Interface", In Lecture Note/Software Science 23 Interactive System and Software VIII, Dec. 20, 1999, 8 pages.
Stein,"Growing Beautiful Code in BioPerl", In Beautiful Code—Leading Programmers Explain How They Think, Oreilly, 2007, 32 pages.
Takahiro,"Let's Manage the Installed Applications", In Easy to Use Mini, Exhaustion Utilization of iPhone,vol. 1, p. 25 Memo, Mar. 10, 2011, 6 pages.
Toshiyuki,"User Interaction Technique for Mobile Terminal (First Part)—Display Interaction Technique—Information Processing", In Information Processing Society of Japan, vol. 48, No. 6, Jun. 15, 2007, 12 pages.

(56) References Cited

OTHER PUBLICATIONS

"Final Office Action", U.S. Appl. No. 13/657,621, Jan. 21, 2016, 21 pages.
"Foreign Office Action", CN Application No. 201180071183.0, Jan. 28, 2016, 18 pages.
"Foreign Office Action", EP Application No. 11866772.4, Feb. 2, 2016, 5 pages.
"Foreign Office Action", EP Application No. 1866699.9, Feb. 3, 2016, 4 pages.
"International Search Report and Written Opinion", Application No. PCT/US2015/048751, Nov. 27, 2015, 12 pages.
"Notice of Allowance", U.S. Appl. No. 13/073,300, Feb. 12, 2016, 9 pages.
"Corrected Notice of Allowance", U.S. Appl. No. 13/656,574, Jan. 13, 2015, 4 pages.
"Corrected Notice of Allowance", U.S. Appl. No. 14/089,149, Feb. 20, 2015, 2 pages.
"Extended European Search Report", EP Application No. 11866699.9, Jan. 15, 2015, 6 pages.
"Extended European Search Report", EP Application No. 11866772.4, Jan. 15, 2015, 6 pages.
"Final Office Action", U.S. Appl. No. 13/229,693, Jan. 6, 2015, 24 pages.
"Final Office Action", U.S. Appl. No. 13/229,702, Jan. 15, 2015, 24 pages.
"Final Office Action", U.S. Appl. No. 13/657,621, Jan. 15, 2015, 22 pages.
"Foreign Notice of Allowance", CN Application No. 201110437572.2, Mar. 3, 2015, 3 Pages.
"Foreign Office Action", CN Application No. 201110437542.1, Jan. 28, 2015, 7 pages.
"Foreign Office Action", CN Application No. 201110437542.1, Aug. 20, 2014, 8 pages.
"Foreign Office Action", CN Application No. 201110454251.3, Feb. 28, 2015, 9 Pages.
"Foreign Office Action", CN Application No. 201180071186.4, Jan. 20, 2015, 8 pages.
"Foreign Office Action", CN Application No. 201210331158.8, Sep. 3, 2014, 16 Pages.
"Foreign Office Action", CN Application No. 201210331188.9, Oct. 10, 2014, 12 pages.
"Foreign Office Action", CN Application No. 201210331564.4, Dec. 3, 2014, 12 pages.
"Foreign Office Action", CN Application No. 201210331584.1, Nov. 3, 2014, 14 pages.
"Non-Final Office Action", U.S. Appl. No. 13/228,876, Jan. 29, 2015, 18 pages.
"Non-Final Office Action", U.S. Appl. No. 13/229,155, Jan. 7, 2015, 14 pages.
"Non-Final Office Action", U.S. Appl. No. 13/345,383, Jan. 29, 2015, 5 pages.
"Notice of Allowance", U.S. Appl. No. 13/657,646, Feb. 6, 2015, 15 pages.
"Supplemental Notice of Allowance", U.S. Appl. No. 13/656,574, Feb. 25, 2015, 4 pages.
"Supplemental Notice of Allowance", U.S. Appl. No. 14/089,149, Mar. 20, 2015, 2 pages.
Camick "Wrap Layout", Java Tips Weblog, retrieved from <https://tips4java.wordpress.com/2008/11/06/wrap-layout/> on Jan. 11, 2015, Nov. 6, 2008, 28 pages.
"Corrected Notice of Allowance", U.S. Appl. No. 13/656,574, Dec. 12, 2014, 4 pages.
"Extended European Search Report", EP Application No. 11866553.8, Dec. 9, 2014, 7 pages.
"Extended European Search Report", EP Application No. 11867033.0, Nov. 27, 2014, 8 pages.
"Foreign Office Action", CO Application No. 13300256, Sep. 24, 2014, 8 Pages.
"Foreign Office Action", CO Application No. 13300265, Sep. 24, 2014, 10 Pages.
"Non-Final Office Action", U.S. Appl. No. 13/118,339, Dec. 10, 2014, 16 pages.
"Final Office Action", U.S. Appl. No. 13/228,707, Aug. 23, 2016, 33 pages.
"Foreign Notice of Allowance", TW Application No. 100136568, May 31, 2016, 4 pages.
"Foreign Office Action", RU Application No. 2014108844, Jun. 23, 2016, 6 pages.
"Non-Final Office Action", U.S. Appl. No. 13/228,945, Jul. 21, 2016, 20 pages.
"Non-Final Office Action", U.S. Appl. No. 14/522,420, Aug. 15, 2016, 20 pages.
"Notice of Allowance", U.S. Appl. No. 13/657,621, Aug. 26, 2016, 9 pages.
"Foreign Notice of Allowance", CN Application No. 201210317470.1, Feb. 23, 2016, 4 pages.
"Foreign Notice of Allowance", CN Application No. 201210331584.1, Feb. 14, 2016, 4 pages.
"Foreign Notice of Allowance", CN Application No. 201210331670.2, Apr. 26, 2016, 4 pages.
"Foreign Notice of Allowance", JP Application No. 2014-512819, Jan. 26, 2016, 4 pages.
"Foreign Notice of Allowance", JP Application No. 2014-529687, May 31, 2016, 4 pages.
"Foreign Notice of Allowance", RU Application No. 2014107906, Apr. 25, 2016, 18 pages.
"Foreign Notice of Allowance", RU Application No. 2014108997, May 26, 2016, 17 pages.
"Foreign Office Action", CN Application No. 201110454251.3, May 27, 2016, 6 Pages.
"Foreign Office Action", CN Application No. 201210085754.2, Apr. 5, 2016, 16 pages.
"Foreign Office Action", CN Application No. 201210331670.2, Dec. 1, 2015, 14 pages.
"Foreign Office Action", EP Application No. 11866579.3, Apr. 5, 2016, 4 pages.
"Foreign Office Action", EP Application No. 11866699.9, Feb. 3, 2016, 4 pages.
"Foreign Office Action", JP Application No. 2014-512824, Jun. 7, 2016, 6 pages.
"Foreign Office Action", JP Application No. 2014-528371, Jun. 7, 2016, 5 pages.
"Foreign Office Action", JP Application No. 2014-529685, Apr. 5, 2016, 6 pages.
"Foreign Office Action", PH Application No. 1-2013-502367, Jun. 15, 2016, 2 pages.
"iOS Human Interface Guidelines", Apple Inc, Retrieved at<<https://itunes.apple.com/in/book/ios-human-interface-guidelines/id877942287?mt=11>>, Mar. 23, 2011, 2 pages.
"Non-Final Office Action", U.S. Appl. No. 13/228,707, Apr. 19, 2016, 26 pages.
"Non-Final Office Action", U.S. Appl. No. 13/228,876, May 12, 2016, 20 pages.
"Non-Final Office Action", U.S. Appl. No. 13/550,432, Jun. 16, 2016, 18 pages.
"Non-Final Office Action", U.S. Appl. No. 14/522,420, Apr. 22, 2016, 21 pages.
"Non-Final Office Action", U.S. Appl. No. 14/850,347, Jun. 16, 2016, 26 pages.
"Notice of Allowance", U.S. Appl. No. 12/983,106, Jun. 6, 2016, 17 pages.
"Notice of Allowance", U.S. Appl. No. 14/059,163, Apr. 25, 2016, 7 pages.
Budiu,"Usability of iPad Apps and Websites", Retrieved at<<https://tdougher.expressions.syr.edu/wrt307fall12/files/2012/08/ipad-usability_report_1st-edition-1.pdf>>, Dec. 31, 2010, 98 pages.
"Examiner's Answer to Appeal Brief", U.S. Appl. No. 13/224,258, filed Sep. 23, 2016, 12 pages.
"Final Office Action", U.S. Appl. No. 13/118,292, filed Aug. 26, 2016, 38 pages.
"Final Office Action", U.S. Appl. No. 13/228,876, filed Sep. 13, 2016, 21 pages.

(56) References Cited

OTHER PUBLICATIONS

"Foreign Office Action", EP Application No. 11866699.9, Sep. 20, 2016, 4 pages.
"Non-Final Office Action", U.S. Appl. No. 14/919,607, filed Sep. 23, 2016, 11 pages.
"Second Written Opinion", Application No. PCT/US2015/048751, Jul. 12, 2016, 5 pages.
"Corrected Notice of Allowance", U.S. Appl. No. 13/657,621, filed Oct. 31, 2016, 2 pages.
"Foreign Office Action", Application No. MX/a/2014/002507, Aug. 9, 2016, 7 pages.
"Foreign Office Action", AU Application No. 2011369365, Oct. 7, 2016, 3 pages.
"Foreign Office Action", AU Application No. 2011375741, Sep. 14, 2016, 4 pages.
"Foreign Office Action", AU Application No. 2011376310, Sep. 10, 2016, 3 pages.
"Foreign Office Action", AU Application No. 2011376311, Sep. 10, 2016, 3 pages.
"Non-Final Office Action", U.S. Appl. No. 14/918,358, filed Oct. 13, 2016, 9 pages.
"Corrected Notice of Allowance", U.S. Appl. No. 13/657,621, filed Dec. 1, 2016, 3 pages.
"Foreign Notice of Allowance", JP Application No. 2014-512824, Oct. 18, 2016, 4 pages.
"Foreign Notice of Allowance", JP Application No. 2014-528371, Oct. 4, 2016, 4 pages.
"Foreign Notice of Allowance", JP Application No. 2014-529685, Oct. 19, 2016, 4 pages.
"Foreign Office Action", Application No. MX/a/2013/013923, Sep. 13, 2016, 10 pages.
"Foreign Office Action", EP Application No. 11866772.4, Nov. 21, 2016, 6 pages.
"Non-Final Office Action", U.S. Appl. No. 14/918,359, filed Nov. 22, 2016, 9 pages.

\* cited by examiner

SEMANTIC ZOOM LINGUISTIC HELPERS

BACKGROUND

Users have access to an ever increasing variety of content. Additionally, the amount of content that is available to a user is ever increasing. For example, a user may access a variety of different documents at work, a multitude of songs at home, story a variety of photos on a mobile phone, and so on.

However, traditional techniques that were employed by computing devices to navigate through this content may become overburdened when confronted with the sheer amount of content that even a casual user may access in a typical day. Therefore, it may be difficult for the user to locate content of interest, which may lead to user frustration and hinder the user's perception and use of the computing device.

SUMMARY

Semantic zoom techniques are described. In one or more implementations, techniques are described that may be utilized by a user to navigate to content of interest. These techniques may also include a variety of different features, such as to support semantic swaps and zooming "in" and "out." These techniques may also include a variety of different input features, such as to support gestures, cursor-control device, and keyboard inputs. A variety of other features are also supported as further described in the detailed description and figures.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

The amount of content that even casual users access in a typical day is ever increasing. Consequently, traditional techniques that were utilized to navigate through this content could become overwhelmed and result in user frustration.

Semantic zoom techniques are described in the following discussion. In one or more implementations, the techniques may be used to navigate within a view. With semantic zoom, users can navigate through content by "jumping" to places within the view as desired. Additionally, these techniques may allow users to adjust how much content is represented at a given time in a user interface as well as the amount of information provided to describe the content. Therefore, it may provide users with the confidence to invoke semantic zoom to jump, and then return to their content. Further, semantic zoom may be used to provide an overview of the content, which may help increase a user's confidence when navigating through the content. Additional discussion of semantic zoom techniques may be found in relation to the following sections.

In the following discussion, an example environment is first described that is operable to employ the semantic zoom techniques described herein. Example illustrations of gestures and procedures involving the gestures and other inputs are then described, which may be employed in the example environment as well as in other environments. Accordingly, the example environment is not limited to performing the example techniques. Likewise, the example procedures are not limited to implementation in the example environment.

Example Environment

Figure 1:
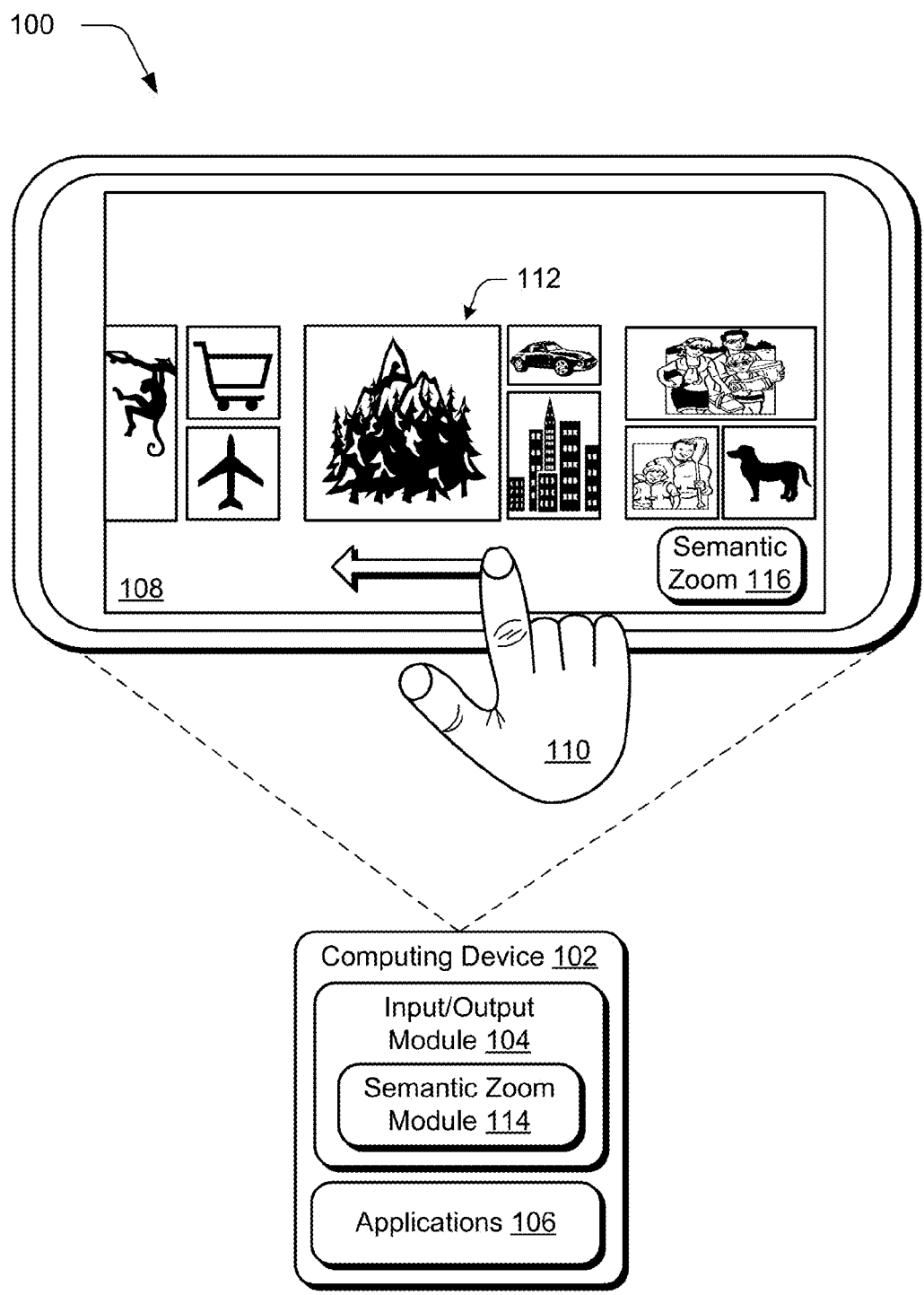
FIG. 1 is an illustration of an environment in an example implementation that is operable to employ semantic zoom techniques.

FIG. 1 is an illustration of an environment 100 in an example implementation that is operable to employ semantic zoom techniques described herein. The illustrated environment 100 includes an example of a computing device 102 that may be configured in a variety of ways. For example, the computing device 102 may be configured to include a processing system and memory. Thus, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, and so forth as further described in relation to FIGS. 19 and 20.

Accordingly, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is also illustrated as including an input/output module 104. The input/output module 104 is representative of functionality relating to inputs detected by the computing device 102. For example, the input/output module 104 may be configured as part of an operating system to abstract functionality of the computing device 102 to applications 106 that are executed on the computing device 102.

The input/output module 104, for instance, may be configured to recognize a gesture detected through interaction with a display device 108 (e.g., using touchscreen functionality) by a user's hand 110. Thus, the input/output module 104 may be representative of functionality to identify gestures and cause operations to be performed that correspond to the gestures. The gestures may be identified by the input/output module 104 in a variety of different ways. For example, the input/output module 104 may be configured to recognize a touch input, such as a finger of a user's hand 110 as proximal to a display device 108 of the computing device 102 using touchscreen functionality.

The touch input may also be recognized as including attributes (e.g., movement, selection point, and so on) that are usable to differentiate the touch input from other touch inputs recognized by the input/output module 104. This differentiation may then serve as a basis to identify a gesture from the touch inputs and consequently an operation that is to be performed based on identification of the gesture.

For example, a finger of the user's hand 110 is illustrated as being placed proximal to the display device 108 and moved to the left, which is represented by an arrow. Accordingly, detection of the finger of the user's hand 110 and subsequent movement may be recognized by the input/output module 104 as a "pan" gesture to navigate through representations of content in the direction of the movement. In the illustrated instance, the representations are configured as tiles that are representative of items of content in a file system of the computing device 102. The items may be stored locally in memory of the computing device 102, remotely accessible via a network, represent devices that are communicatively coupled to the computing device 102, and so on. Thus, a variety of different types of gestures may be recognized by the input/output module 104, such a gestures that are recognized from a single type of input (e.g., touch gestures such as the previously described drag-and-drop gesture) as well as gestures involving multiple types of inputs, e.g., compound gestures.

A variety of other inputs may also be detected and processed by the input/output module 104, such as from a keyboard, cursor control device (e.g., mouse), stylus, track pad, and so on. In this way, the applications 106 may function without "being aware" of how operations are implemented by the computing device 102. Although the following discussion may describe specific examples of gesture, keyboard, and cursor control device inputs, it should be readily apparent that these are but a few of a variety of different examples that are contemplated for use with the semantic zoom techniques described herein.

The input/output module 104 is further illustrated as including a semantic zoom module 114. The semantic zoom module 114 is representative of functionality of the computing device 102 to employ semantic zoom techniques described herein. Traditional techniques that were utilized to navigate through data could be difficult to implement using touch inputs. For example, it could be difficult for users to locate a particular piece of content using a traditional scrollbar.

Semantic zoom techniques may be used to navigate within a view. With semantic zoom, users can navigate through content by "jumping" to places within the view as desired. Additionally, semantic zoom may be utilized without changing the underlying structure of the content. Therefore, it may provide users with the confidence to invoke semantic zoom to jump, and then return to their content. Further, semantic zoom may be used to provide an overview of the content, which may help increase a user's confidence when navigating through the content. The semantic zoom module 114 may be configured to support a plurality of semantic views. Further, the semantic zoom module 114 may generate the semantic view "beforehand" such that it is ready to be displayed once a semantic swap is triggered as described above.

The display device 108 is illustrated as displaying a plurality of representations of content in a semantic view, which may also be referenced as a "zoomed out view" in the following discussion. The representations are configured as tiles in the illustrated instance. The tiles in the semantic view may be configured to be different from tiles in other views, such as a start screen which may include tiles used to launch applications. For example, the size of these tiles may be set at 27.5 percent of their "normal size."

In one or more implementations, this view may be configured as a semantic view of a start screen. The tiles in this view may be made up of color blocks that are the same as the color blocks in the normal view but do not contain space for display of notifications (e.g., a current temperature for a tile involving weather), although other examples are also contemplated. Thus, the tile notification updates may be delayed and batched for later output when the user exits the semantic zoom, i.e., the "zoomed-in view."

If a new application is installed or removed, the semantic zoom module 114 may add or remove the corresponding tile from the grid regardless of a level of "zoom" as further described below. Additionally, the semantic zoom module 114 may then re-layout the tiles accordingly.

In one or more implementations, the shape and layout of groups within the grid will remain unchanged in the semantic view as in a "normal" view, e.g., one hundred percent view. For instance, the number of rows in the grid may remain the same. However, since more tiles will be viewable more tile information may be loaded by the sematic zoom module 114 than in the normal view. Further discussion of these and other techniques may be found beginning in relation to FIG. 2.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the semantic zoom techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 2:
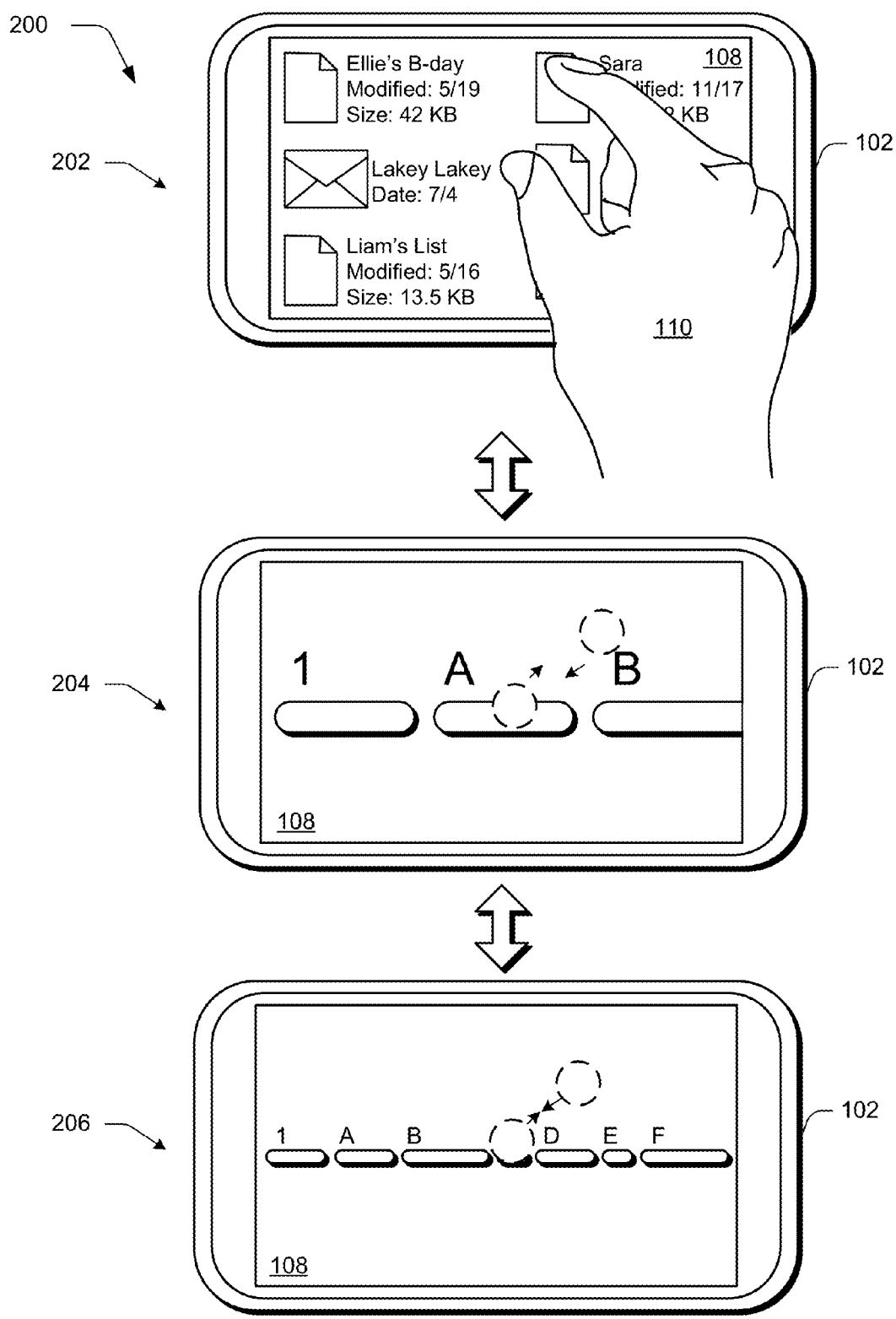
FIG. 2 is an illustration of an example implementation of semantic zoom in which a gesture is utilized to navigate between views of underlying content.

FIG. 2 depicts an example implementation 200 of semantic zoom in which a gesture is utilized to navigate between views of underlying content. The views are illustrated in this example implementation using first, second, and third stages 202, 204, 206. At the first stage 202, the computing device 102 is illustrated as displaying a user interface on the display device 108. The user interface includes representations of items accessible via a file system of the computing device 102, illustrated examples of which include documents and emails as well as corresponding metadata. It should be readily apparent, however, that a wide variety of other content including devices may be represented in the user interface as previously described, which may then be detected using touchscreen functionality.

A user's hand 110 is illustrated at the first stage 202 as initiating a "pinch" gesture to "zoom out" a view of the representations. The pinch gesture is initiated in this instance by placing two fingers of the user's hand 110 proximal to the display device 108 and moving them toward each other, which may then be detected using touchscreen functionality of the computing device 102.

At the second stage 204, contact points of the user's fingers are illustrated using phantom circles with arrows to indicate a direction of movement. As illustrated, the view of the first stage 202 that includes icons and metadata as individual representations of items is transitioned to a view of groups of items using single representations in the second stage 204. In other words, each group of items has a single representation. The group representations include a header that indicates a criterion for forming the group (e.g., the common trait) and have sizes that are indicative of a relative population size.

At the third stage 206, the contact points have moved even closer together in comparison to the second stage 204 such that a greater number of representations of groups of items may be displayed concurrently on the display device 108. Upon releasing the gesture, a user may navigate through the representations using a variety of techniques, such as a pan gesture, click-and-drag operation of a cursor control device, one or more keys of a keyboard, and so on. In this way, a user may readily navigate to a desired level of granularity in the representations, navigate through the representations at that level, and so on to locate content of interest. It should be readily apparent that these steps may be reversed to "zoom in" the view of the representations, e.g., the contact points may be moved away from each other as a "reverse pinch gesture" to control a level of detail to display in the semantic zoom.

Thus, the semantic zoom techniques described above involved a semantic swap, which refers to a semantic transition between views of content when zooming "in" and "out". The semantic zoom techniques may further increase the experience by leading into the transition by zooming in/out of each view. Although a pinch gesture was described this technique may be controlled using a variety of different inputs. For example, a "tap" gesture may also be utilized. In the tap gesture, a tap may cause a view to transition between views, e.g., zoomed "out" and "in" through tapping one or more representations. This transition may use the same transition animation that the pinch gesture leveraged as described above.

A reversible pinch gesture may also be supported by the semantic zoom module 114. In this example, a user may initiate a pinch gesture and then decide to cancel the gesture by moving their fingers in the opposite direction. In response, the semantic zoom module 114 may support a cancel scenario and transition to a previous view.

In another example, the semantic zoom may also be controlled using a scroll wheel and "ctrl" key combination to zoom in and out. In another example, a "ctrl" and "+" or "−" key combination on a keyboard may be used to zoom in or out, respectively. A variety of other examples are also contemplated.

Thresholds

The semantic zoom module 114 may employ a variety of different thresholds to manage interaction with the semantic zoom techniques described herein. For example, the semantic zoom module 114 may utilize a semantic threshold to specify a zoom level at which a swap in views will occur, e.g., between the first and second stages 202, 204. In one or more implementations this is distance based, e.g., dependent on an amount of movement in the contact points in the pinch gesture.

The semantic zoom module 114 may also employ a direct manipulation threshold to determine at which zoom level to "snap" a view when the input is finished. For instance, a user may provide a pinch gesture as previously described to navigate to a desired zoom level. A user may then release the gesture to navigate through representations of content in that view. The direct manipulation threshold may thus be used to determine at which level the view is to remain to support that navigation and a degree of zoom performed between semantic "swaps," examples of which were shown in the second and third stages 204, 206.

Thus, once the view reaches a semantic threshold, the semantic zoom module 114 may cause a swap in semantic visuals. Additionally, the semantic thresholds may change depending on a direction of an input that defines the zoom. This may act to reduce flickering that can occur otherwise when the direction of the zoom is reversed.

Figure 3:
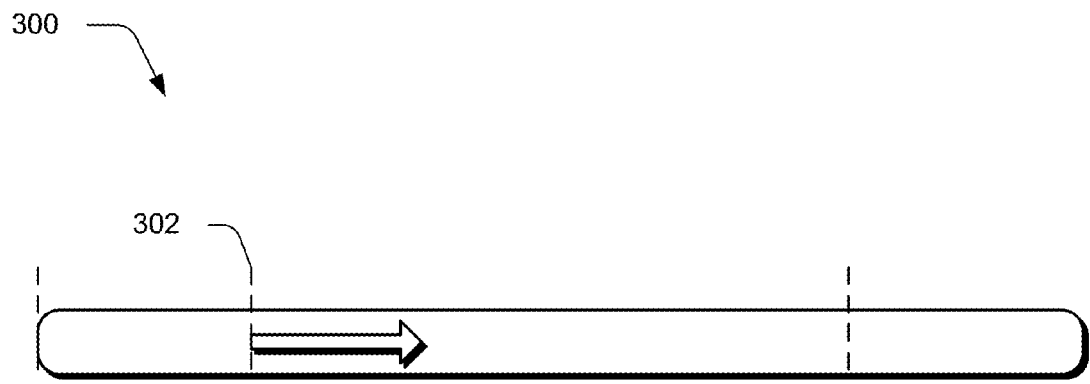
FIG. 3 is an illustration of an example implementation of a first high-end semantic threshold.

In a first example illustrated in the example implementation 300 of FIG. 3, a first high-end semantic threshold 302 may be set, e.g., at approximately eighty percent of movement that may be recognized for a gesture by the semantic zoom module 114. For instance, if a user is originally in a one hundred percent view and started zooming out, a semantic swap may be triggered when the input reaches eighty percent as defined by the first high-end semantic threshold 302.

Figure 4:
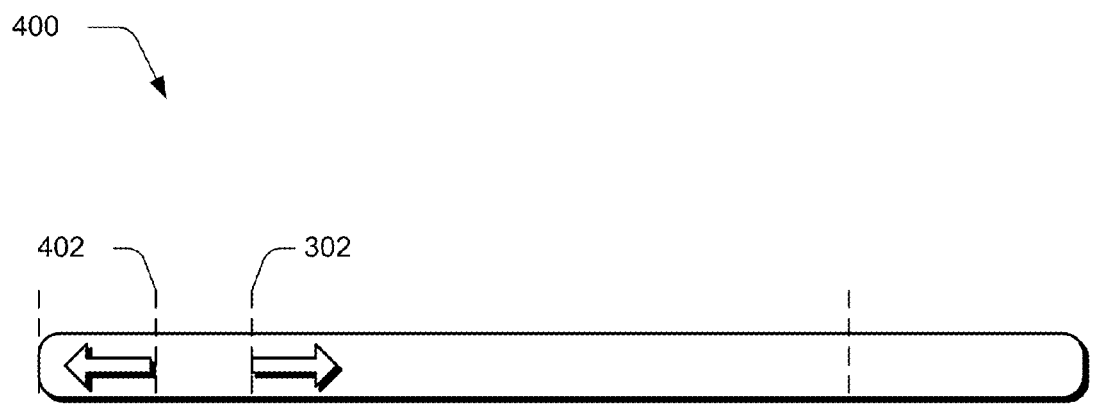
FIG. 4 is an illustration of an example implementation of a second high-end semantic threshold.

In a second example illustrated in the example implementation 400 of FIG. 4, a second high-end semantic threshold 402 may also be defined and leveraged by the semantic zoom module 114, which may be set higher than the first high-end semantic threshold 302, such as at approximately eighty-five percent. For instance, a user may start at a one hundred percent view and trigger the semantic swap at the first high-end semantic threshold 302 but not "let go" (e.g., is still providing inputs that define the gesture) and decide to reverse the zoom direction. In this instance, the input would trigger a swap back to the regular view upon reaching the second high-end semantic threshold 402.

Figure 5:
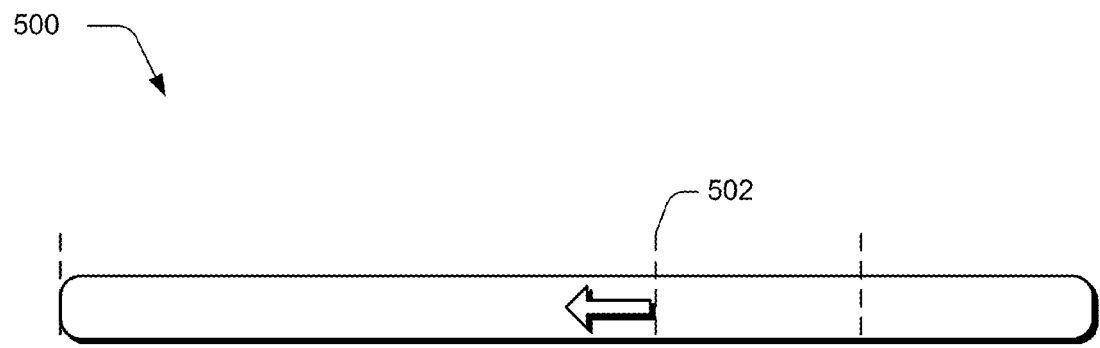
FIG. 5 is an illustration of an example implementation of a first low end semantic threshold.

Low end thresholds may also be utilized by the semantic zoom module 114. In a third example illustrated in the example implementation 500 of FIG. 5, a first low end semantic threshold 502 may be set, such as at approximately forty-five percent. If a user is originally in a semantic view at 27.5% and provides an input to start "zooming in," a semantic swap may be triggered when the input reaches the first low end semantic threshold 502.

Figure 6:
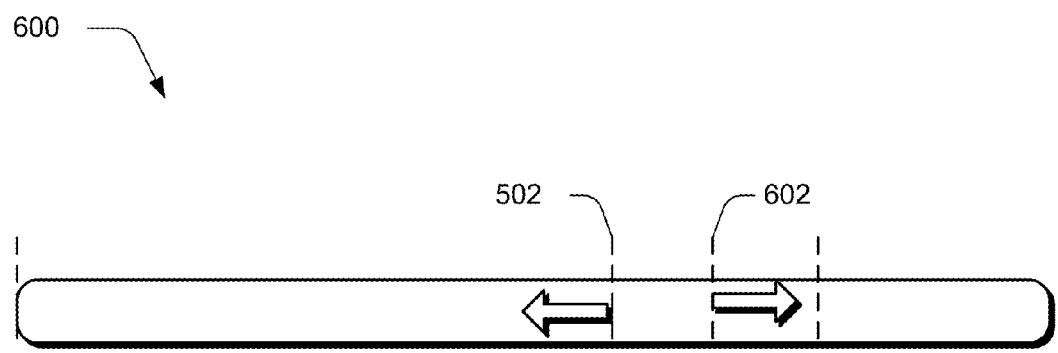
FIG. 6 is an illustration of an example implementation of a second low end semantic threshold.

In a fourth example illustrated in the example implementation 600 of FIG. 6, a second low end semantic threshold 602 may also be defined, such as at approximately thirty-five percent. Like the previous example, a user may begin at a 27.5% semantic view (e.g., a start screen) and trigger the semantic swap, e.g., zoom percentage is greater than forty-five percent. Also, the user may continue to provide the input (e.g., button a mouse remains "clicked", still "gesturing," and so on) and then decide to reverse the zoom direction. The swap back to the 27.5% view may be triggered by the semantic zoom module 114 upon reaching the second low end semantic threshold.

Thus, in the examples shown and discussed in relation to FIGS. 2-6, semantic thresholds may be used to define when a semantic swap occurs during a semantic zoom. In between these thresholds, the view may continue to optically zoom in and zoom out in response to direct manipulation.

Snap Points

When a user provides an input to zoom in or out (e.g., moves their fingers in a pinch gesture), a displayed surface may be optically scaled accordingly by the semantic zoom module 114. However, when the input stops (e.g., a user lets go of the gesture), the semantic zoom module 114 may generate an animation to a certain zoom level, which may be referred to as a "snap point." In one or more implementations, this is based on a current zoom percentage at which the input stopped, e.g., when a user "let go."

A variety of different snap points may be defined. For example, the semantic zoom module 114 may define a one hundred percent snap point at which content is displayed in a "regular mode" that is not zoomed, e.g., has full fidelity. In another example, the semantic zoom module 114 may define a snap point that corresponds to a "zoom mode" at 27.5% that includes semantic visuals.

In one or more implementations, if there is less content than substantially consumes an available display area of the display device 108, the snap point may be set automatically and without user intervention by the semantic zoom module 114 to whatever value will cause the content to substantially "fill" the display device 108. Thus, in this example the content would not zoom less that the "zoom mode" of 27.5% but could be larger. Naturally, other examples are also contemplated, such as to have the semantic zoom module 114 choose one of a plurality of predefined zoom levels that corresponds to a current zoom level.

Thus, the semantic zoom module 114 may leverage thresholds in combination with snap points to determine where the view is going to land when an input stops, e.g., a user "let's go" of a gesture, releases a button of a mouse, stops providing a keyboard input after a specified amount of time, and so on. For example, if the user is zooming out and the zoom out percentage is greater than a high end threshold percentage and ceases the input, the semantic zoom module 114 may cause the view to snap back to a 100% snap point.

In another example, a user may provide inputs to zoom out and the zoom out percentage is less than a high end threshold percentage, after which the user may cease the inputs. In response, the semantic zoom module 114 may animate the view to the 27.5% snap point.

In a further example, if the user begins in the zoom view (e.g., at 27.5%) and starts zooming in at a percentage that is less than a low end semantic threshold percentage and stops, the semantic zoom module 114 may cause the view to snap back to the semantic view, e.g., 27.5%.

In yet another example, if the user begins in the semantic view (at 27.5%) and starts zooming in at a percentage that is greater than a low end threshold percentage and stops, the semantic zoom module 114 may cause the view to snap up to the 100% view.

Snap points may also act as a zoom boundary. If a user provides an input that indicates that the user is trying to "go past" these boundaries, for instance, the semantic zoom module 114 may output an animation to display an "over zoom bounce". This may serve to provide feedback to let the user know that zoom is working as well as stop the user from scaling past the boundary.

Additionally, in one or more implementations the semantic zoom module 114 may be configured to respond to the computing device 102 going "idle." For example, the semantic zoom module 114 may be in a zoom mode (e.g., 27.5% view), during which a session goes idle, such as due to a screensaver, lock screen, and so on. In response, the semantic zoom module 114 may exit the zoom mode and return to a one hundred percent view level. A variety of other examples are also contemplated, such as use of velocity detected through movements to recognize one or more gestures.

Gesture-Based Manipulation

Gestures used to interact with semantic zoom may be configured in a variety of ways. In a first example, a behavior is supported that upon detection of an input that causes a view to be manipulated "right away." For example, referring back to FIG. 2 the views may begin to shrink as soon as an input is detected that the user has moved their fingers in a pinch gesture. Further, the zooming may be configured to "following the inputs as they happen" to zoom in and out. This is an example of a manipulation-based gesture that provides real-time feedback. Naturally, a reverse pinch gesture may also be manipulation based to follow the inputs.

As previously described, thresholds may also be utilized to determine "when" to switch views during the manipulation and real-time output. Thus, in this example a view may be zoomed through a first gesture that follows movement of a user as it happens as described in an input. A second gesture (e.g., a semantic swap gesture) may also be defined that involves the thresholds to trigger a swap between views as described above, e.g., a crossfade to another view.

In another example, a gesture may be employed with an animation to perform zooms and even swaps of views. For example, the semantic zoom module 114 may detect movement of fingers of a user's hand 110 as before as used in a pinch gesture. Once a defined movement has been satisfied for a definition of the gesture, the semantic zoom module 114 may output an animation to cause a zoom to be displayed. Thus, in this example the zoom does not follow the movement in real time, but may do so in near real time such that it may be difficult for a user to discern a difference between the two techniques. It should be readily apparent that this technique may be continued to cause a crossfade and swap of views. This other example may be beneficial in low resource scenarios to conserve resources of the computing device 102.

In one or more implementations, the semantic zoom module 114 may "wait" until an input completed (e.g., the fingers of the user's hand 110 are removed from the display device 108) and then use one or more of the snap points described above to determine a final view to be output. Thus, the animations may be used to zoom both in and out (e.g., switch movements) and the semantic zoom module 114 may cause output of corresponding animations.

Semantic View Interactions

Returning again to FIG. 1, the semantic zoom module 114 may be configured to support a variety of different interactions while in the semantic view. Further, these interactions may be set to be different from a "regular" one hundred percent view, although other examples are also contemplated in which the interactions are the same.

For example, tiles may not be launched from the semantic view. However, selecting (e.g., tapping) a tile may cause the view to zoom back to the normal view at a location centered on the tap location. In another example, if a user were to tap on a tile of the airplane in the semantic view of FIG. 1, once it zoomed in to a normal view, the airplane tile would still be close to a finger of the user's hand 110 that provided the tap. Additionally, a "zoom back in" may be centered horizontally at the tap location while vertical alignment may be based on the center of the grid.

As previously described, a semantic swap may also be triggered by a cursor control device, such as by pressing a modifier key on a keyboard and using a scroll wheel on a mouse simultaneously (e.g., a "CTRL +" and movement of a scroll wheel notch), "CTRL +" and track pad scroll edge input, selection of a semantic zoom 116 button, and so on. The key combination shortcut, for instance, may be used to toggle between the semantic views. To prevent users from entering an "in-between" state, rotation in the opposite direction may cause the semantic zoom module 114 to animate a view to a new snap point. However, a rotation in the same direction will not cause a change in the view or zoom level. The zoom may center on the position of the mouse. Additionally, a "zoom over bounce" animation may be used to give users feedback if users try to navigate past the zoom boundaries as previously described. The animation for the semantic transition may be a time based and involve an optical zoom followed by the cross-fade for the actual swap and then a continued optical zoom to the final snap point zoom level.

Semantic Zoom Centering and Alignment

When a semantic "zoom out" occurs, the zoom may center on a location of the input, such as a pinch, tap, cursor or focus position, and so on. A calculation may be made by the semantic zoom module 114 as to which group is closest to the input location. This group may then left align with the corresponding semantic group item that comes into view, e.g., after the semantic swap. For grouped grid views, the semantic group item may align with the header.

When a semantic "zoom in" occurs, the zoom may also be centered on the input location, e.g., the pinch, tap, cursor or focus position, and so on. Again, the semantic zoom module 114 may calculate which semantic group item is closest to the input location. This semantic group item may then left align with the corresponding group from the zoomed in view when it comes into view, e.g., after the semantic swap. For grouped grid views the header may align with the semantic group item.

As previously described, the semantic zoom module 114 may also support panning to navigate between items displayed at a desired level of zoom. An example of this is illustrated through the arrow to indicate movement of a finger of the user's hand 110. In one or more implementations, the semantic zoom module 114 may pre-fetch and render representation of content for display in the view, which may be based on a variety of criteria including heuristics, based on relative pan axes of the controls, and so on. This pre-fetching may also be leveraged for different zoom levels, such that the representations are "ready" for an input to change a zoom level, a semantic swap, and so on.

Additionally, in one or more additional implementations the semantic zoom module 114 may "hide" chrome (e.g., display of controls, headers, and so on), which may or may not relate to the semantic zoom functionality itself. For example, this semantic zoom 116 button may be hidden during a zoom. A variety of other examples are also contemplated.

Correction Animation

Figure 7:
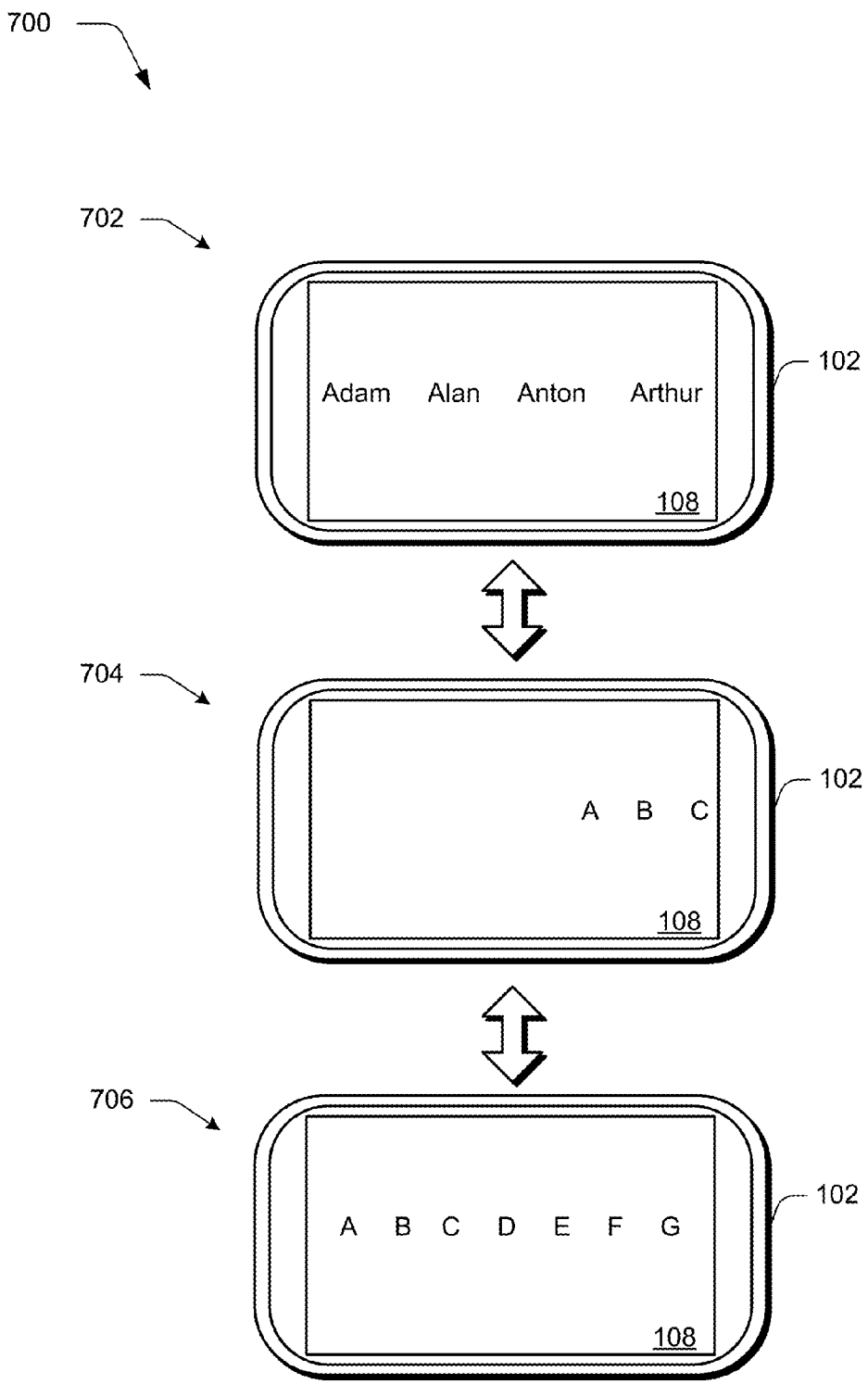
FIG. 7 depicts an example embodiment of a correction animation that may be leveraged for semantic zoom.

FIG. 7 depicts an example embodiment 700 of a correction animation that may be leveraged for semantic zoom. The example embodiment is illustrated through use of first, second, and third stages 702, 704, 706. At the first stage 702, a list of scrollable items is shown which include the names "Adam," "Alan," "Anton," and "Arthur." The name "Adam" is displayed against a left edge of the display device 108 and the name "Arthur" is displayed against a right edge of the display device 108.

A pinch input may then be received to zoom out from the name "Arthur." In other words, fingers of a user's hand may be positioned over the display of the name "Arthur" and moved together. In this case, this may cause a crossfade and scale animation to be performed to implement a semantic swap, as shown in the second stage 704. At the second stage, the letters "A," "B," and "C" are displayed as proximal to a point at which the input is detected, e.g., as a portion of the display device 108 that was used to display "Arthur." Thus, in this way the semantic zoom module 114 may ensure that the "A" is left-aligned with the name "Arthur." At this stage, the input continues, e.g., the user has not "let go."

A correction animation may then be utilized to "fill the display device 108" once the input ceases, e.g., the fingers of the users hand are removed from the display device 108. For example, an animation may be displayed in which the list "slides to the left" in this example as shown in the third stage 706. However, if a user had not "let go" and instead input a reverse-pinch gesture, the semantic swap animation (e.g., crossfade and scale) may be output to return to the first stage 702.

In an instance in which a user "let's go" before the cross-fade and scale animation has completed, the correction animation may be output. For example, both controls may be translated so before "Arthur" has faded out completely, the name would be displayed as shrinking and translating leftwards, so that the name remains aligned with the "A" the entire time as it was translated to the left.

For non-touch input cases (e.g., use of a cursor control device or keyboard) the semantic zoom module 114 may behave as if the user has "let go", so the translation starts at the same time as the scaling and cross-fade animations.

Thus, the correction animation may be used for alignment of items between views. For example, items in the different views may have corresponding bounding rectangles that describe a size and position of the item. The semantic zoom module 114 may then utilize functionality to align items between the views so that corresponding items between views fit these bounding rectangles, e.g., whether left, center, or right aligned.

Returning again to FIG. 7, a list of scrollable items is displayed in the first stage 702. Without a correction animation, a zoom out from an entry on the right side of the display device (e.g., Arthur) would not line up a corresponding representation from a second view, e.g., the "A," as it would align at a left edge of the display device 108 in this example.

Accordingly, the semantic zoom module 114 may expose a programming interface that is configured to return a vector that describes how far to translate the control (e.g., the list of scrollable items) to align the items between the views. Thus, the semantic zoom module 114 may be used to translate the control to "keep the alignment" as shown in the second stage 704 and upon release the semantic zoom module 114 may "fill the display" as shown in the third stage 706. Further discussion of the correction animation may be found in relation to the example procedures.

Cross-Fade Animation

Figure 8:
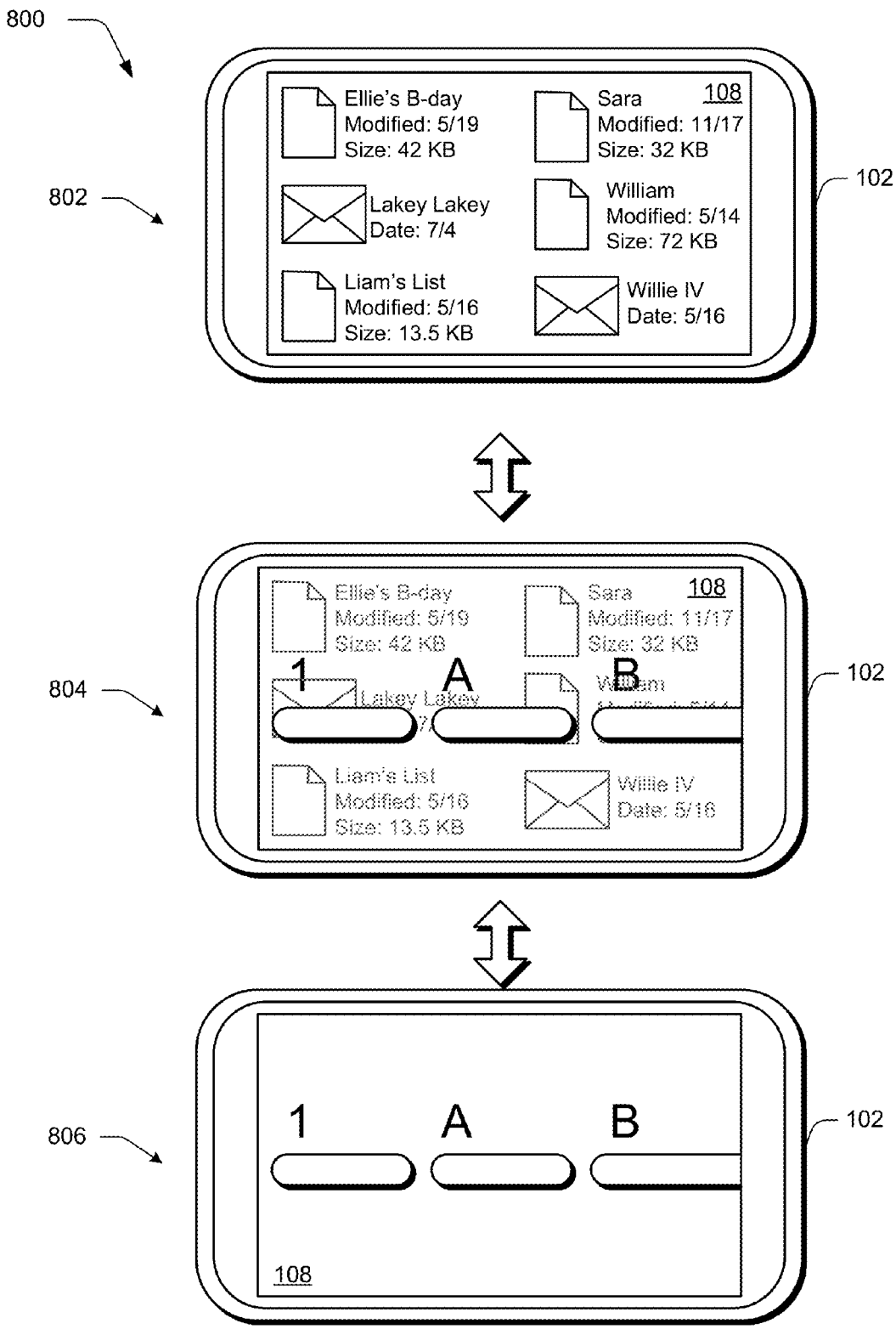
FIG. 8 depicts an example implementation in which a crossfade animation is shown that may be used as part of a semantic swap.

FIG. 8 depicts an example implementation 800 in which a crossfade animation is shown that may be used as part of a semantic swap. This example implementation 800 is illustrated through the use of first, second, and third stages 802, 804, 806. A described previously, the crossfade animation may be implemented as part of a semantic swap to transition between views. The first, second, and third stages 802-806 of the illustrated implementation, for instance, may be used to transition between the views shown in the first and second stages 202, 204 of FIG. 2 in responsive to a pinch or other input (e.g., keyboard or cursor control device) to initiate a semantic swap.

At the first stage 802, representations of items in a file system are shown. An input is received that causes a crossfade animation 804 as shown at the second stage in which portioning of different views may be shown together, such as through use of opacity, transparency settings, and so on. This may be used to transition to the final view as shown in the third stage 806.

The cross fade animation may be implemented in a variety of ways. For example, a threshold may be used that is used to trigger output of the animation. In another example, the gesture may be movement based such that the opacity follows the inputs in real time. For example, different levels of opacity for the different view may be applied based on an amount of movement described by the input. Thus, as the movement is input opacity of the initial view may be decreased and the opacity of a final view may be increased. In one or more implementations, snap techniques may also be used to snap a view to either of the views based on the amount of movement when an input ceases, e.g., fingers of a user's hand are removed from the display device.

Focus

When a zoom in occurs, the semantic zoom module 114 may apply focus to the first item in the group that is being "zoomed in." This may also be configured to fade after a certain time out or once the user starts interacting with the view. If focus has not been changed, then when a user zooms back in to the one hundred percent view the same item that had focus before the semantic swap will continue to have focus.

During a pinch gesture in the semantic view, focus may be applied around the group that is being "pinched over." If a user were to move their finger over a different group before the transition, the focus indicator may be updated to the new group.

Semantic Headers

Figure 9:
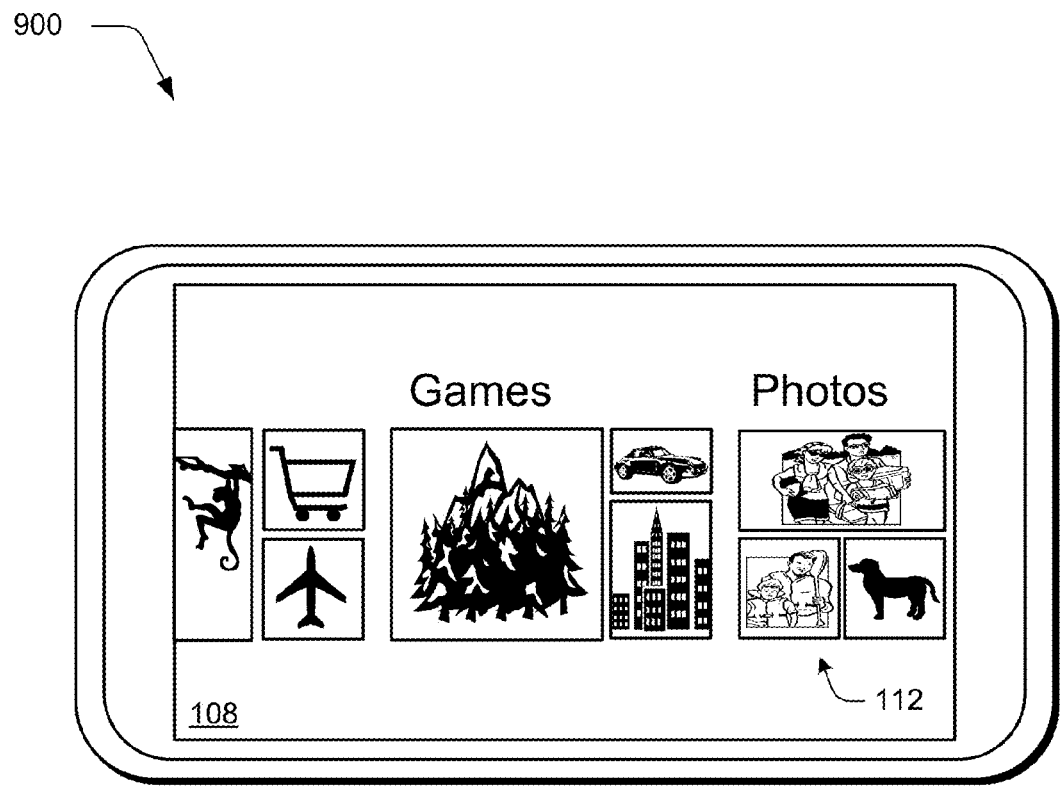
FIG. 9 is an illustration of an example implementation of a semantic view that includes semantic headers.

FIG. 9 depicts an example implementation 900 of a semantic view that includes semantic headers. The content for each semantic header can be provided in a variety of ways, such as to list a common criterion for a group defined by the header, by an end developer (e.g., using HTML), and so on.

In one or more implementations, a cross-fade animation used to transition between the views may not involve group headers, e.g., during a "zoom out." However, once inputs have ceased (e.g., a user has "let go") and the view has snapped the headers may be animated "back in" for display. If a grouped grid view is being swapped for the semantic view, for instance, the semantic headers may contain the item headers that were defined by the end developer for the grouped grid view. Images and other content may also be part of the semantic header.

Selection of a header (e.g., a tap, mouse-click or keyboard activation) may cause the view to zoom back to the 100% view with the zoom being centered on the tap, pinch or click location. Therefore, when a user taps on a group header in the semantic view that group appears near the tap location in the zoomed in view. An "X" position of the left edge of the semantic header, for instance, may line up with an "X" position of the left edge of the group in the zoomed in view. Users may also move from group to group using the arrow keys, e.g., using the arrow keys to move focus visuals between groups.

Templates

Figure 10:
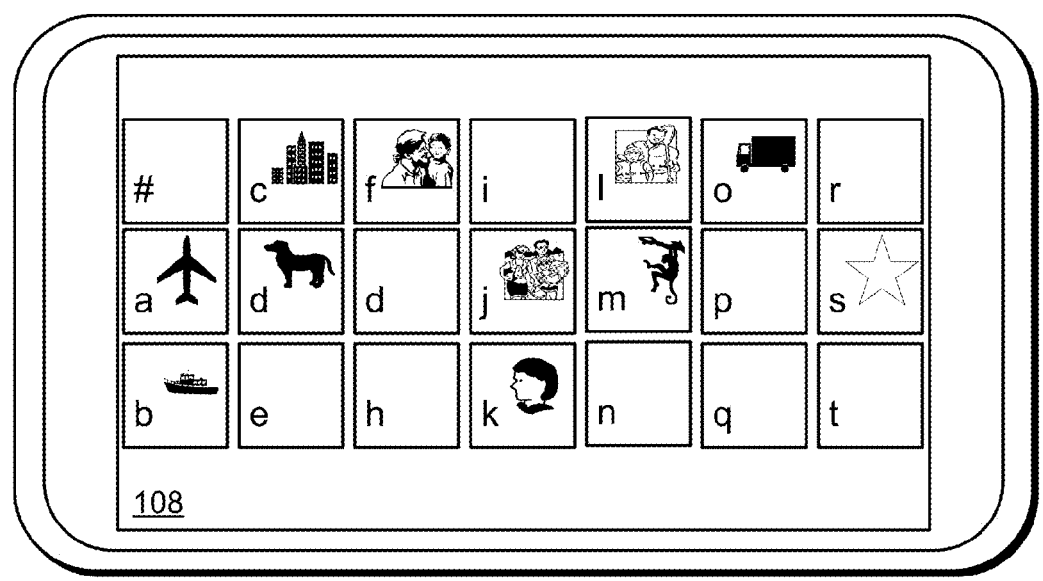
FIG. 10 is an illustration of an example implementation of a template.

The semantic zoom module 114 may also support a variety of different templates for different layouts that may be leveraged by application developers. For example, an example of a user interface that employs such a template is illustrated in the example implementation 1000 of FIG. 10. In this example, the template includes tiles arranged in a grid with identifiers for the group, which in this case are letters and numbers. Tiles also include an item that is representative of the group if populated, e.g., an airplane for the "a" group but the "e" group does not include an item. Thus, a user may readily determine if a group is populated and navigate between the groups in this zoom level of the semantic zoom. In one or more implementations, the header (e.g., the representative items) may be specified by a developer of an application that leverages the semantic zoom functionality. Thus, this example may provide an abstracted view of a content structure and an opportunity for group management tasks, e.g., selecting content from multiple groups, rearranging groups, and so on.

Figure 11:
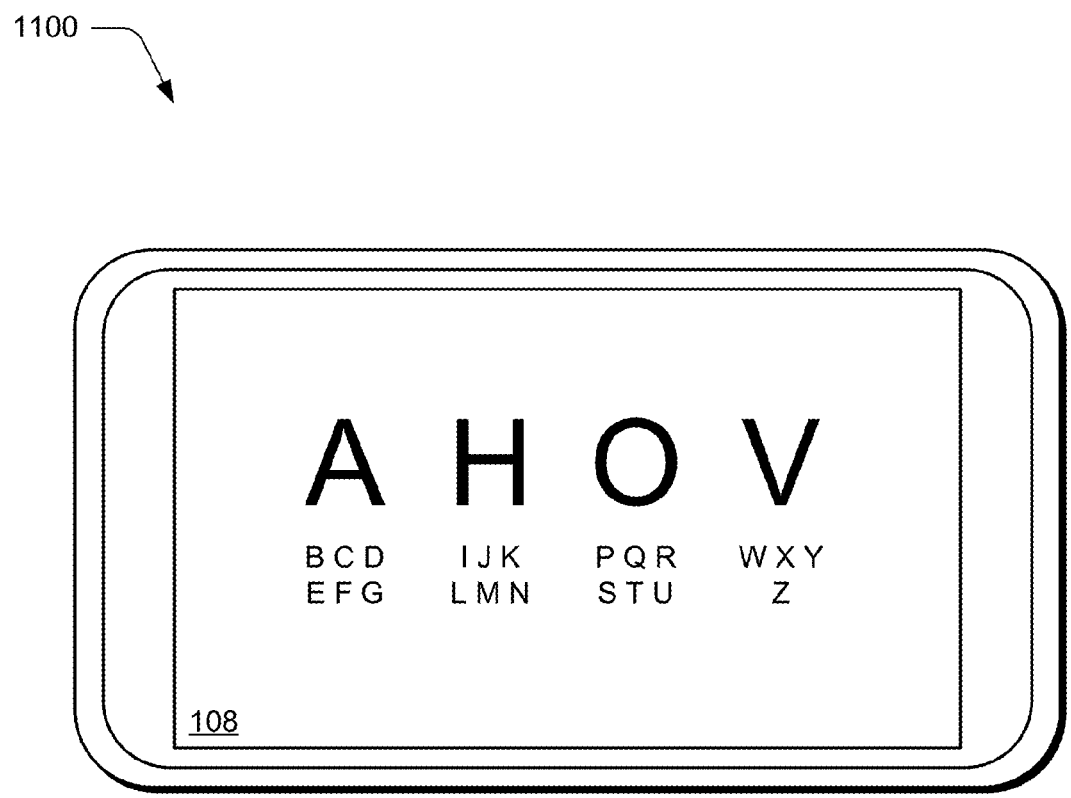
FIG. 11 is an illustration of an example implementation of another template.

Another example template is shown in the example embodiment 1100 of FIG. 11. In this example, letters are also shown that can be used to navigate between groups of the content and may thus provide a level in the semantic zoom. The letters in this example are formed into groups with larger letters acting as markers (e.g., signposts) such that a user may quickly locate a letter of interest and thus a group of interest. Thus, a semantic visual is illustrated that is made up of the group headers, which may be a "scaled up" version found in the 100% view.

Semantic Zoom Linguistic Helpers

As described above, semantic zoom may be implemented as a touch-first feature that allows users to obtain a global view of their content with a pinch gesture. Semantic zooms may be implemented by the semantic zoom module 114 to create an abstracted view of underlying content so that many items can fit in a smaller area while still being easily accessible at different levels of granularity. In one or more implementations, semantic zoom may utilize abstraction to group items into categories, e.g., by date, by first letter, and so on.

In the case of first-letter semantic zoom, each item may fall under a category determined by the first letter of its display name, e.g., "Green Bay" goes under a group header "G". To perform this grouping, the semantic zoom module 114 may determine the two following data points: (1) the groups that will be used to represent the content in the zoomed view (e.g. the entire alphabet); and (2) a first letter of each item in the view.

In the case of English, generating a simple first-letter semantic zoom view may be implemented as follows:

There are 28 groups
    26 Latin alphabet letters
    1 group for digits
    1 group for symbols However, other languages use different alphabets, and sometimes collate letters together, which may make it harder to identify the first letter of a given word. Therefore, the semantic zoom module 114 may employ a variety of techniques to address these different alphabets.

East Asian languages such as Chinese, Japanese, and Korean may be problematic for first letter grouping. First, each of these languages makes use of Chinese ideographic (Han) characters, which include thousands of individual characters. A literate speaker of Japanese, for instance, is familiar at least two thousand individual characters and the number may be much higher for a speaker of Chinese. This means that given a list of items, there is a high probability that every word may start with a different character, such that an implementation of taking the first character may create a new group for virtually each entry in the list. Furthermore, if Unicode surrogate pairs are not taken into account and the first WCHAR is used solely, there may be cases where the grouping letter would resolve to a meaningless square box.

In another example, Korean, while occasionally using Han characters, primarily uses a native Hangul script. Although it is a phonetic alphabet, each of the eleven thousand plus Hangul Unicode characters may represent an entire syllable of two to five letters, which is referred to as "jamo." East Asian sorting methods (except Japanese XJIS) may employ techniques for grouping Han/Hangul characters into 19-214 groups (based on phonetics, radical, or stroke count) that make intuitive sense to user of the East Asian alphabet.

In addition, East Asian languages often make sure of "full width" Latin characters that are square instead of rectangular to line up with square Chinese/Japanese/Korean characters, e.g.:

Half width
Full width

Therefore, unless width normalization is performed a half-width "A" group may be immediately followed by a full-width "A" group. However, users typically consider them to be the same letter, so it will look like an error to these users. The same applies to the two Japanese Kana alphabets (Hiragana and Katakana), which sort together and are to be normalized to avoid showing bad groups.

Additionally, use of a basic "pick the first letter" implementation may give inaccurate results for many European languages. For example, the Hungarian alphabet includes of the following 44 letters:

A Á B C Cs D Dz Dzs E É F G Gy H I Í J K L Ly M N Ny O Ó Ö Ő P (Q) R S Sz T Ty U Ú Ü Ű V (W) (X) (Y) Z Zs

Linguistically, each of these letters is a unique sorting element. Therefore, combining the letters "D", "Dz", and "Dzs" into the same group may look incorrect and be unintuitive to a typical Hungarian user. In some more extreme cases, there are some Tibetan "single letters" that include of more than 8 WCHARs. Some other languages with "multiple character" letters include: Khmer, Corsican, Breton, Mapudungun, Sorbian, Maori, Uyghur, Albanian, Croatian, Serbian, Bosnian, Czech, Danish, Greenlandic, Hungarian, Slovak, Spanish (Traditional), Welsh, Maltese, Vietnamese, and so on.

In another example, the Swedish alphabet includes the following letters:

A B C D E F G H I J K L M N O P Q R S T U V X Y Z Å Ä Ö

Note that "A" is a distinctly different letter from "Å" and "Ä" and that the latter two come after "Z" in the alphabet. While for English, the diacritics to treat "Ä" as "A" are removed since two groups are generally not desired for English. However, if the same logic is applied to Swedish, either duplicate "A" groups are positioned after "Z" or the language is incorrectly sorted. Similar situations may be encountered in quite a few other languages that treat certain accented characters as distinct letters, including Polish, Hungarian, Danish, Norwegian, and so forth.

The semantic zoom module 114 may expose a variety of APIs for use in sorting. For example, alphabet and first letter APIs may be exposed such that a developer may decide how the semantic zoom module 114 addresses items.

The semantic zoom module 114 may be implemented to generate alphabet tables, e.g., from a unisort.txt file in an operating system, such that these tables can be leveraged to provide alphabets as well as grouping services. This feature, for instance, may be used to parse the unisort.txt file and generate linguistically consistent tables. This may involve validating the default output against reference data (e.g., an outside source) and creating ad hoc exceptions when the standard ordering is not what users expect.

The semantic zoom module 114 may include an alphabet API which may be used to return what is considered to be the alphabet based on the locale/sort, e.g., the headings a person at that locale would typically see in a dictionary, phone book, and so on. If there is more than one representation for a given letter, the one recognized as most common may be used by the semantic zoom module 114. The following are a few examples for representative languages:

Example (fr, en): A B C D E F G H I J K L M N O P Q R S T U V W X Y Z

Example (sp): A B C D E F G H I J K L M N O P Q R S T U V W X Y Z

Example (hn): A Á B C Cs D Dz Dzs E É F G Gy H I Í J K L Ly M N Ny O Ó Ö Ő P (Q) R S Sz T Ty U Ú Ü Ű V (W) (X) (Y) Z Zs Example (he): אבגדהוזחטיכלמנסעפצקרשת

Example (ar): ﺝﺡﺥﺩﺫ ﺭﺯﺱﺵﺹ ﺽﻁﻅﻉﻍﻑ ﻕﻙﻝﻡﻥﻩﻭ ﻭﻱﺏﺕﺙ

For East Asian languages, the semantic zoom module 114 may return a list of the groups described above (e.g., the same table may drive both functions), although Japanese includes kana groups as well as following:

Example (jp): A B C D E F G H I J K L M N O P Q R S T U V W X Y Z

あいうえお かきくけこ さしすせそ たち

つてと なにぬね の はひふへ ほまみむめ

もやゆよ らりるれろ わ をん 漢字

In one or more implementations, the semantic zoom module 114 may include the Latin alphabet in each alphabet, including non-Latin ones, so as to provide a solution for file names, which often use Latin scripts.

Some languages consider two letters to be strongly different, but sort them together. In this case, the semantic zoom module 114 may communicate to users that the two letters are together using a composed display letter, e.g., for Russian "E, Ë." For archaic and uncommon letters that sort between letters in modern usage, the semantic zoom module may group these letters with a previous letter.

For Latin letter-like symbols, the semantic zoom module 114 may treat these symbols according to the letters. The semantic zoom module 114, for instance, may employ "group with previous" semantics, e.g., to group ™ under "T."

The semantic zoom module 114 may employ a mapping function to generate the view of the items. For example, the semantic zoom module 114 may normalize characters to an upper case, accents (e.g., if the language does not treat the particular accented letter as a distinct letter), width (e.g., convert full to half width Latin), and kana type (e.g., convert Japanese katakana to hiragana).

For languages that treat groups of letters as a single letter (e.g. Hungarian "dzs"), the semantic zoom module 114 may return these as the "first letter group" by the API. These may be processed via per-locale override tables, e.g., to check if the string would sort within the letter's "range."

For Chinese/Japanese, the semantic zoom module 114 may return logical groupings of Chinese characters based on the sort. For example, a stroke count sort returns a group for each number of strokes, radical sort returns groups for Chinese character semantic components, phonetic sorts return by first letter of phonetic reading, and so on. Again, per-locale override tables may also be used. In other sorts (e.g., non-EA+Japanese XJIS, which do not have meaningful orderings of Chinese characters), a single '漢' (Han) group may be used for each of the Chinese characters. For Korean, the semantic zoom module 114 may return groups for the initial Jamo letter in the Hangul syllable. Thus, the semantic zoom module 114 may generate letters that are closely aligned with an "alphabet function" for strings in the locale's native language.

First Letter Grouping

Applications may be configured to support use of the semantic zoom module 114. For example, an application 106 may be installed as part of a package that includes a manifest that includes capabilities specified by a developer of the application 106. One such functionality that may specified includes a phonetic name property. The phonetic name property may be used to specify a phonetic language to be used to generate groups and identifications of groups for a list of items. Thus, if the phonetic name property exists for an application, then its first letter will be used for sorting and grouping. If not, then the semantic zoom module 114 may fall back on the first letter of the display name, e.g., for 3rd-party legacy apps.

For uncurated data like filenames and 3rd-party legacy applications, the general solution for extracting the first letter of a localized string can be applied to most non-East Asian languages. The solution involves normalizing the first visible glyph and stripping diacritics (ancillary glyphs added to letters) which is described as follows.

For English and most other languages the first visible glyph may be normalized as follows:
  Upper case;
  Diacritic (if sortkey considers it a diacritic in the locale vs. a unique letter);
  Width (Half-width); and
  Kana type (Hiragana).

A variety of different techniques may be employed to strip diacritics. For example, a first such solution may involve the following:
  Generate the sort key;
  Look to see if the diacritic should be treated as a diacritic (e.g. 'Å' in English) or a letter (e.g. 'Å' in Swedish—which sorts after 'Z'); and
  Convert to FormC to combine codepoints,
    FormD to split them apart.
  A second such solution may involve the following:
  Skip whitespace and non-glyphs;
  Use SHCharNextW on the glyph to the next character boundary (see Appendix);
  Generate sort key on the first glyph;
  Look at LCMapString to tell if it is a diacritic (observe sort weights);
  Normalize to FormD (NormalizeString);
  Perform second pass using GetStringType to remove all diacritics: C3_NonSpace|C3_Diacritic; and
  Use LCMapString to remove case, width and Kana type.

Additional solutions may also be utilized by the semantic zoom module 114, e.g., for first letter grouping of uncurated data in Chinese and Korean. For example, a grouping letter "override" table may be applied for certain locales and/or sort key ranges. These locales may include Chinese (e.g., simplified and traditional) as well as Korean. It may also include languages like Hungarian that have special double letter sorting, however these languages may use these exceptions in the override table for the language.

For example, override tables may be used to provide groupings for:
  First pinyin (Simplified Chinese);
  First Bopomofo letter (Traditional Chinese—Taiwan);
  Radical names/stroke counts (Traditional Chinese—Hong Kong);
  First Hangul jamo (Korean); and Languages like Hungarian that have double letter groupings (e.g., treat 'ch' as a single letter).

For Chinese, the semantic zoom module 114 may group by first pinyin letter for simplified Chinese, such as to convert to pinyin and use a sort-key table-based lookup to identify first pinyin character. Pinyin is a system for phonetically rendering Chinese ideographs in a Latin alphabet. For traditional Chinese (e.g., Taiwan), the semantic zoom module 114 may group by first Bopomofo letter for group by radical/stroke count by converting to Bopomofo and use a stoke-key table based lookup to identify the first Bopomofo character. Bopomofo provides a common name (e.g., like ABC) for the traditional Chinese phonetic syllabary. A radical is a classification for Chinese characters, e.g., which may be used for section headers in a Chinese dictionary. For traditional Chinese (e.g., Hong Kong), a sort-key table-based lookup may be used to identify a stroke character.

For Korean, the semantic zoom module 114 may sort Korean file names phonetically in Hangul since a single character is represented using two to five letters. For example, the semantic zoom module 114 may reduce to a first jamo letter (e.g., 19 initial consonants equals nineteen groups) through use of a sort-key table-based lookup to identify jamo groups. Jamo refers to a set of consonants and vowels used in Korean Hangul, which is the phonetic alphabet used to write the Korean language In the case of Japanese, file name sorting may be a broken experience in conventional techniques. Like Chinese and Korean, Japanese files are intended to be sorted by pronunciation. However, the occurrence of kanji characters in Japanese file names may make sorting difficult without knowing the proper pronunciation. Additionally, kanji may have more than one pronunciation. In order to solve this problem, the semantic zoom module 114 may use a technique to reverse convert each file name via an IME to acquire a phonetic name, which may be then used to sort and group the files.

For Japanese, files may be placed into three groups and sorted by the semantic zoom module:
    Latin—grouped together in correct order;
    Kana—grouped together in correct order; and
    Kanji—grouped together in XJIS order (effectively random from a user perspective).

Thus, the semantic zoom module 114 may employ these techniques to provide intuitive identifiers and groups to items of content.

Directional Hints

To provide directional hints to users, the semantic zoom module may employ a variety of different animations. For example, when a user is already in the zoomed out view and tries to zoom "further out" an under-bounce animation may be output by the semantic zoom module 114 in which the bounce is a scale down of the view. In another example, when the user is already in the zoomed in view and tries to zoom in further another over-bounce animation may be output where the bounce is a scale up of the view.

Further, the semantic zoom module 114 may employ one or more animations to indicate an "end" of the content is reached, such as a bounce animation. In one or more implementations, this animation is not limited to the "end" of the content but rather may be specified at different navigation points through the display of content. In this way, the semantic zoom module 114 may expose a generic design to applications 106 to make this functionality available with the applications 106 "knowing" how the functionality is implemented.

Programming Interface for Semantically Zoomable Controls

Semantic Zoom may allow efficient navigation of long lists. However, by its very nature, semantic zooming involves a non-geometric mapping between a "zoomed in" view and its "zoomed out" (a.k.a. "semantic") counterpart. Accordingly, a "generic" implementation may not be well suited for each instance, since domain knowledge may be involved to determine how items in one view map to those of the other, and how to align the visual representations of two corresponding items to convey their relationship to a user during the zoom.

Accordingly, in this section an interface is described that includes a plurality of different methods that are definable by a control to enable use as a child view of a semantic zoom control by the semantic zoom module 114. These methods enable the semantic zoom module 114 to determine an axis or axes along which the control is permitted to pan, notify the control when a zoom is in progress, and allow the views to align themselves appropriately when switching from one zoom level to another.

This interface may be configured to leverage bounding rectangles of items as a common protocol for describing item positions, e.g., the semantic zoom module 114 may transform these rectangles between coordinate systems. Similarly, the notion of an item may be abstract and interpreted by the controls. The application may also transform the representations of the items as passed from one control to the other, allowing a wider range of controls to be used together as "zoomed in" and "zoomed out" views.

In one or more implementations, controls implement a "ZoomableView" interface to be semantically zoomable. These controls may be implemented in a dynamically-typed language (e.g., dynamically-typed language) in a form of a single public property named "zoomableView" without a formal concept of an interface. The property may be evaluated to an object that has several methods attached to it. It is these methods that one would normally think of as "the interface methods", and in a statically-typed language such as C++ or C#, these methods would be direct members of an "IZoomableView" interface that would not implement a public "zoomableView" property.

In the following discussion, the "source" control is the one that is currently visible when a zoom is initiated, and the "target" control is the other control (the zoom may ultimately end up with the source control visible, if the user cancels the zoom). The methods are as follows using a C#-like pseudocode notation.

Axis getPanAxis( )

This method may be called on both controls when a semantic zoom is initialized and may be called whenever a control's axis changes. This method returns either "horizontal", "vertical", "both" or "none," which may be configured as strings in dynamically-typed language, members of an enumerated type in another language, and so on.

The semantic zoom module 114 may use this information for a variety of purposes. For example, if both controls cannot pan along a given axis, the semantic zoom module 114 may "lock" that axis by constraining the center of the scaling transformation to be centered along that axis. If the two controls are limited to horizontal panning, for instance, the scale center's Y coordinate may be set halfway between the top and bottom of a viewport. In another example, the semantic zoom module 114 may allow limited panning during a zoom manipulation, but limit it to axes that are supported by both controls. This may be utilized to limit the amount of content to be pre-rendered by each child control. Hence, this method may be called "configureForZoom" and is further described below.

void configureForZoom(bool isZoomedOut, bool isCurrentView, function triggerZoom( ), Number prefetchedPages)

As before, this method may be called on both controls when a semantic zoom is initialized and may be called whenever a control's axis changes. This provides the child control with information that may be used when implementing a zooming behavior. The following are some of the features of this method:

- isZoomedOut may be used to inform a child control which of the two views it is;
- isCurrentView may be used to inform a child control whether it is initially the visible view;
- triggerZoom is a callback function the child control may call to switch to the other view—when it is not the currently visible view, calling this function has no effect; and
- prefetchedPages tells the control how much off-screen content it will need to present during a zoom.

Regarding the last parameter, the "zoomed in" control may visibly shrink during a "zoom out" transition, revealing more of its content than is visible during normal interaction. Even the "zoomed out" view may reveal more content than normal when the user causes a "bounce" animation by attempting to zoom even further out from the "zoomed out" view. The semantic zoom module 114 may calculate the different amounts of content that are to be prepared by each control, to promote efficient use of resources of the computing device 102.

void setCurrentItem(Number x, Number y)

This method may be called on the source control at the start of a zoom. Users can cause the semantic zoom module 114 to transition between views using various input devices, including keyboard, mouse and touch as previously described. In the case of the latter two, the on-screen coordinates of the mouse cursor or touch points determine which item is to be zoomed "from," e.g., the location on the display device 108. Since keyboard operation may rely on a pre-existing "current item", input mechanisms may be unified by making position-dependent ones a first set a current item, and then requesting information about "the current item", whether it was pre-existing or was just set an instant earlier.

void beginZoom( )

This method may be called on both controls when a visual zoom transition is about to begin. This notifies the control that a zoom transition is about to begin. The control as implemented by the semantic zoom module 114 may be configured to hide portions of its UI during scaling (e.g. scrollbars) and ensure that enough content is rendered to fill the viewport even when the control is scaled. As previously described, the prefetchedPages parameter of configureForZoom may be used to inform the control how much is desired.

Promise<{item: AnyType, position: Rectangle}> getCurrentItem( )

This method may be called on the source control immediately after beginZoom. In response, two pieces of information may be returned about the current item. These include an abstract description of it (e.g., in a dynamically-typed language, this may be a variable of any type), and its bounding rectangle, in viewport coordinates. In statically-typed language such as C++ or C#, a struct or class may be returned. In a dynamically-typed language, an object is returned with properties named "item" and "position". Note that it is actually a "Promise" for these two pieces of information that is returned. This is a dynamically-typed language convention, though there are analogous conventions in other languages.

Promise<{x: Number, y: Number}> positionItem(AnyType item, Rectangle position)

This method may be called on the target control once the call to getCurrentItem on the source control has completed and once the returned Promise has completed. The item and position parameters are those that are returned from the call to getCurrentItem, although the position rectangle is transformed into the coordinate space of the target controls. The controls are rendered at different scales. The item might have been transformed by a mapping function provided by the application, but by default it is the same item returned from getCurrentItem.

It is up to the target control to change its view to align the "target item" corresponding with the given item parameter with the given position rectangle. The control may align in a variety of ways, e.g., left-align the two items, center-align them, and so on. The control may also change its scroll offset to align the items. In some cases, the control may not be able to align the items exactly, e.g., in an instance in which a scroll to an end of the view may not be enough to position the target item appropriately.

The x, y coordinates returned may be configured as a vector specifying how far short of the alignment goal the control fell, e.g., a result of 0, 0 may be sent if the alignment was successful. If this vector is non-zero, the semantic zoom module 114 may translate the entire target control by this amount to ensure the alignment, and then animate it back into place at an appropriate time as described in relation to the Correction Animation section above. The target control may also set its "current item" to the target item, e.g., the one it would return from a call to getCurrentItem.

void endZoom(bool isCurrentView, bool setFocus)

This method may be called on both controls at the end of a zoom transition. The semantic zoom module 114 may perform an operation that is the opposite of what was performed in beginZoom, e.g., display the normal UI again, and may discard rendered content that is now off-screen to conserve memory resources. The method "isCurrentView" may be used to tell the control whether it is now the visible view, since either outcome is possible after a zoom transition. The method "setFocus" tells the control whether focus on its current item is to be set.

void handlePointer(Number pointerID)

This method handlePointer may be called by the semantic zoom module 114 when done listening to pointer events and to leave a pointer to the underlying control to handle. The parameter passed to the control is the pointerID of the pointer that is still down. One ID is passed through handlePointer.

In one or more implementations, the control determines "what to do" with that pointer. In a list view case, the semantic zoom module 114 may keep track of where a pointer made contact on "touch down." When "touch down" was on an item, the semantic zoom module 114 does not perform an action since "MsSetPointerCapture" was already called on the touched item in response to the MSPointerDown event. If no item was pressed, the semantic zoom module 114 may call MSSetPointerCapture on the viewport region of the list view to start up independent manipulation.

Guidelines that may be followed by the semantic zoom module for implementing this method may include the following:

Call msSetPointerCapture on a viewport region to enable independent manipulation; and Call msSetPointerCapture on an element that does not have overflow equal scroll set to it to perform processing on touch events without initiating independent manipulation.

Example Procedures

The following discussion describes semantic zoom techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the implementations 200-900 of FIGS. 2-9, respectively.

Figure 12:
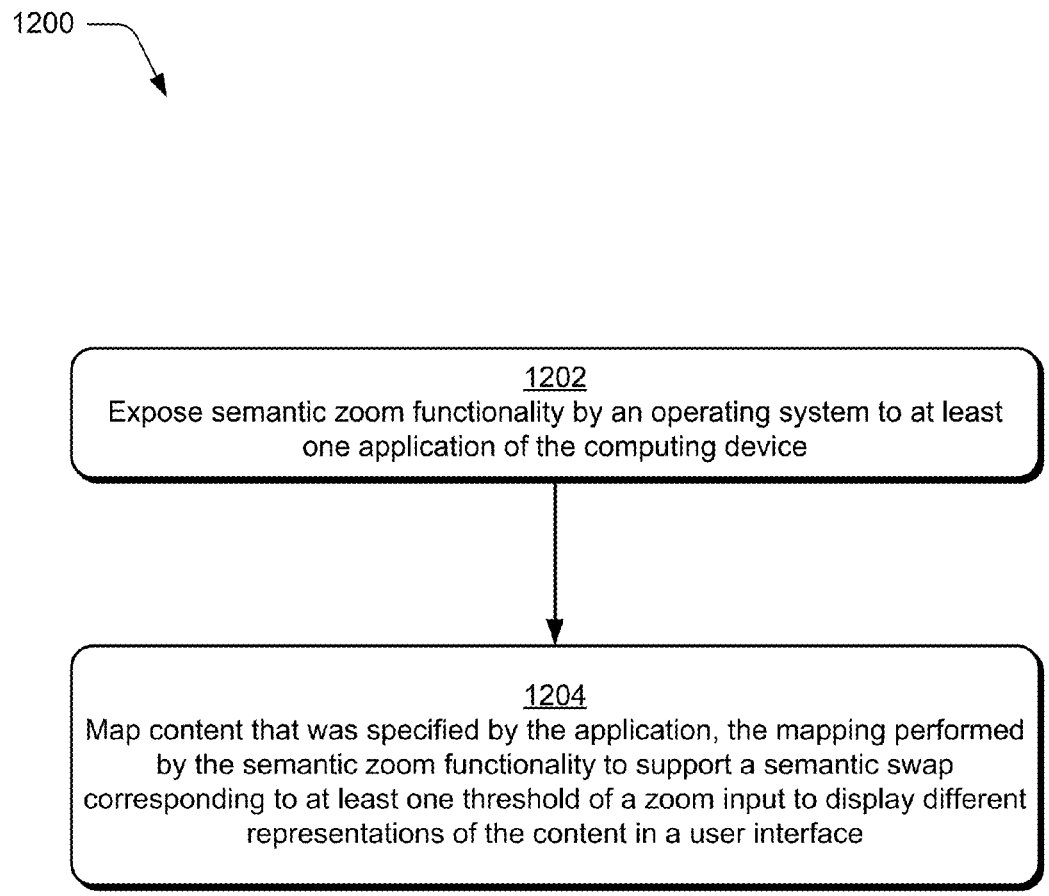
FIG. 12 is a flow diagram depicting a procedure in an example implementation in which an operating system exposes semantic zoom functionality to an application.

FIG. 12 depicts a procedure 1200 in an example implementation in which an operating system exposes semantic zoom functionality to an application. Semantic zoom functionality is exposed by an operating system to at least one application of the computing device (block 1202). For example, the semantic zoom module 114 of FIG. 1 may be implemented as part of an operating system of the computing device 102 to expose this functionality to the applications 106.

Content that was specified by the application is mapped by the semantic zoom functionality to support a semantic swap corresponding to at least one threshold of a zoom input to display different representations of the content in a user interface (block 1204). As previously described, the semantic swap may be initiated in a variety of ways, such as gestures, use of a mouse, keyboard shortcut, and so on. The semantic swap may be used to change how representations of content in the user interface describe content. This change and description may be performed in a variety of ways as described previously.

Figure 13:
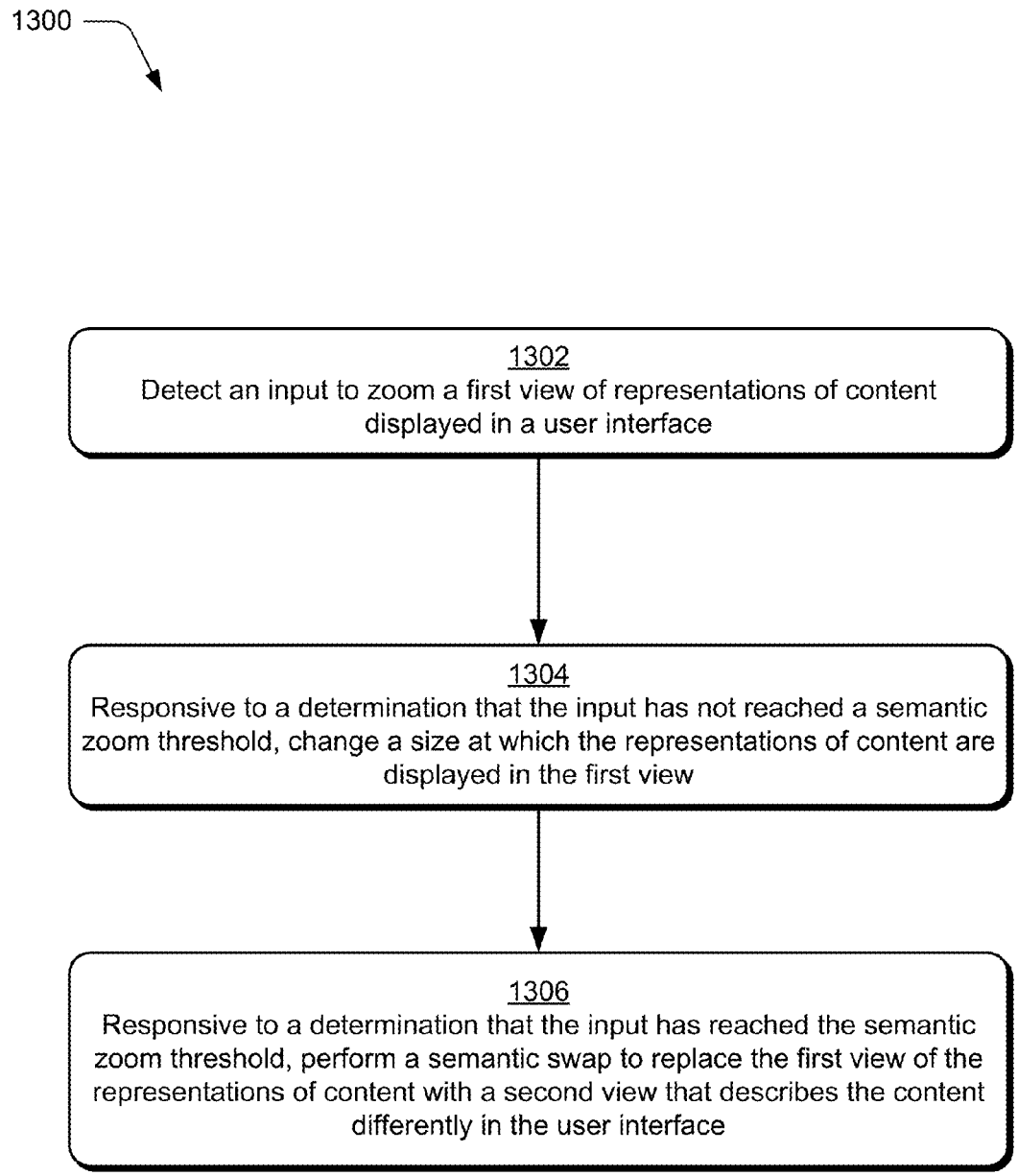
FIG. 13 is a flow diagram depicting a procedure in an example implementation in which a threshold is utilized to trigger a semantic swap.

FIG. 13 depicts a procedure 1300 in an example implementation in which a threshold is utilized to trigger a semantic swap. An input is detected to zoom a first view of representations of content displayed in a user interface (block 1302). As previously described, the input may take a variety of forms, such as a gesture (e.g., a push or pinch gesture), a mouse input (e.g., selection of a key and movement of a scroll wheel), a keyboard input, and so on.

Responsive to a determination that the input has not reached a semantic zoom threshold, a size is changed at which the representations of content are displayed in the first view (block 1304). The input, for instance, may be used to change a zoom level as shown between the second and third stages 204, 206 of FIG. 2.

Responsive to a determination that the input has reached the semantic zoom threshold, a semantic swap is performed to replace the first view of the representations of content with a second view that describes the content differently in the user interface (block 1306). Continuing with the previous example, the input may continue to cause the semantic swap which may be used to represent content in a variety of ways. In this way, a single input may be utilized to both zoom and swap a view of content, a variety of examples of which were previously described.

Figure 14:
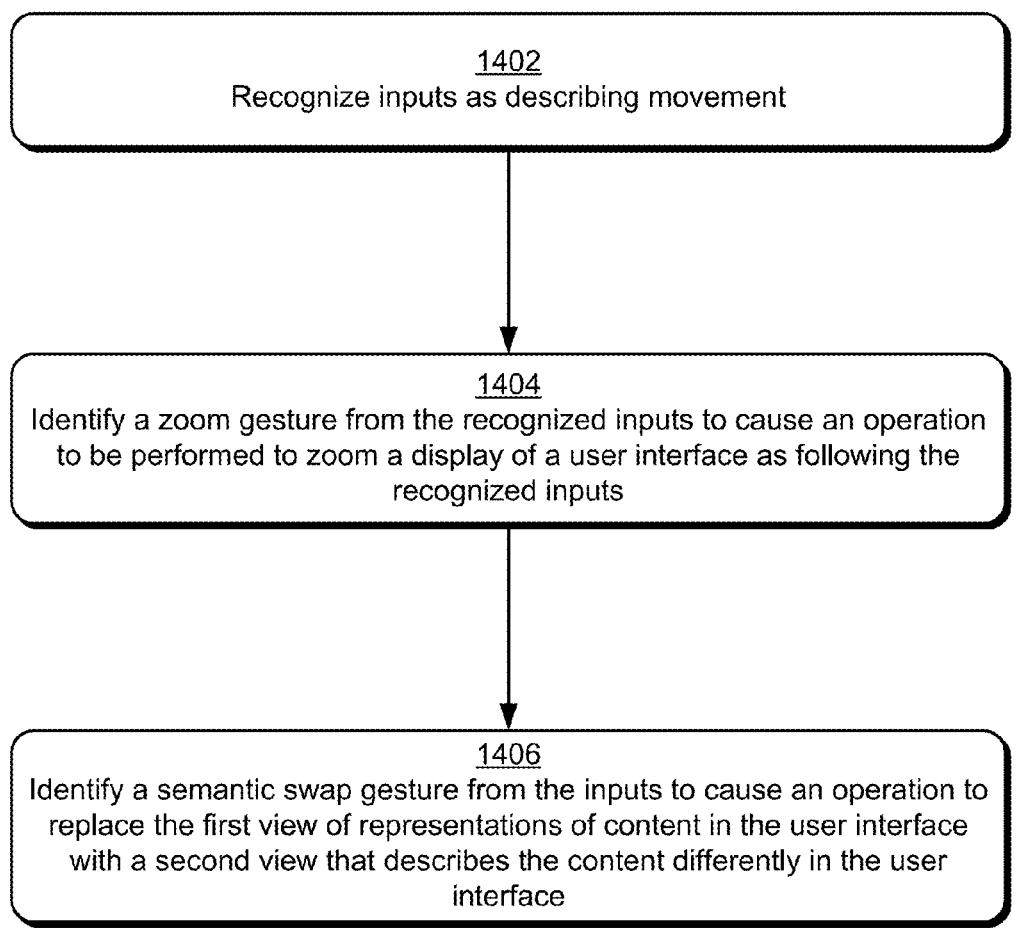
FIG. 14 is a flow diagram depicting a procedure in an example implementation in which manipulation-based gestures are used to support semantic zoom.

FIG. 14 depicts a procedure 1400 in an example implementation in which manipulation-based gestures are used to support semantic zoom. Inputs are recognized as describing movement (block 1402). A display device 108 of the computing device 102, for instance, may include touchscreen functionality to detect proximity of fingers of one or more hands 110 of a user, such as include a capacitive touchscreen, use imaging techniques (IR sensors, depth-sending cameras), and so on. This functionality may be used to detect movement of the fingers or other items, such as movement toward or away from each other.

A zoom gesture is identified from the recognized inputs to cause an operation to be performed to zoom a display of a user interface as following the recognized inputs (block 1404). As previously described in relation to the "Gesture-based Manipulation" section above, the semantic zoom module 114 may be configured to employ manipulation based techniques involving semantic zoom. In this example, this manipulation is configured to follow the inputs (e.g., the movement of the fingers of the user's hand 110), e.g., in "real time" as the inputs are received. This may be performed to zoom in or zoom out a display of a user interface, e.g., to view representations of content in a file system of the computing device 102.

A semantic swap gesture is identified from the inputs to cause an operation to replace the first view of representations of content in the user interface with a second view that describes the content differently in the user interface (block 1406). As described in relation to FIGS. 2-6, thresholds may be utilized to define the semantic swap gesture in this instance. Continuing with the previous example, the inputs used to zoom a user interface may continue. Once a threshold is crossed, a semantic swap gesture may be identified to cause a view used for the zoom to be replaced with another view. Thus, the gestures in this example are manipulation based. Animation techniques may also be leveraged, further discussion of which may be found in relation to the following figure.

Figure 15:
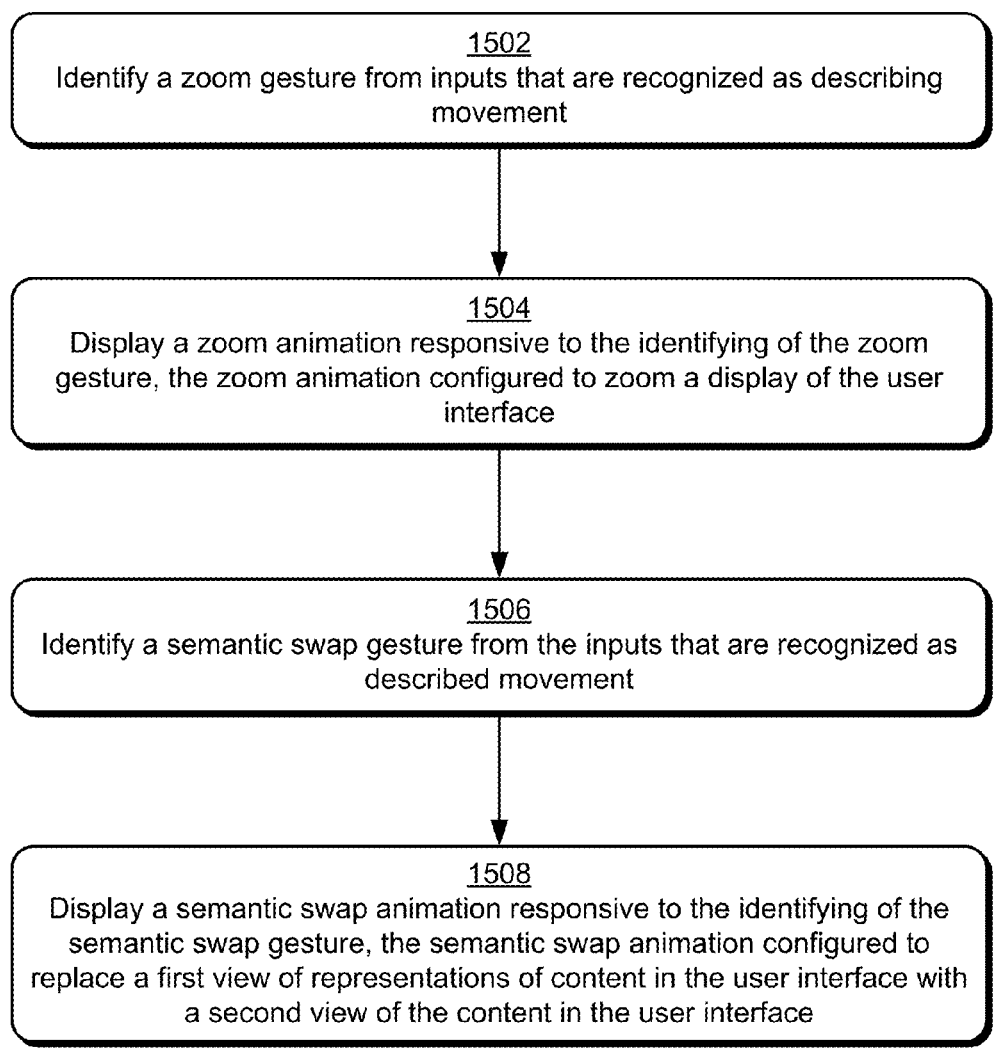
FIG. 15 is a flow diagram depicting a procedure in an example implementation in which gestures and animations are used to support semantic zoom.

FIG. 15 depicts a procedure 1500 in an example implementation in which gestures and animations are used to support semantic zoom. A zoom gesture is identified from inputs that are recognized as describing movement (block 1502). The semantic zoom module 114, for instance, may detect that a definition for the zoom gesture has been complied with, e.g., movement of the user's finger over a defined distance.

A zoom animation is displayed responsive to the identification of the zoom gesture, the zoom animation configured to zoom a display of the user interface (block 1504). Continuing with the previous example, a pinch or reverse-pinch (i.e., push) gesture may be identified. The semantic zoom module 114 may then output an animation that complies with the gesture. For example, the semantic zoom module 114 may define animations for different snap points and output animations as corresponding to those points.

A semantic swap gesture is identified from the inputs that are recognized as describing movement (block 1506). Again continuing with the previous example, the fingers of the user's hand 110 may continue movement such that another gesture is identified, such as a semantic swap gesture for pinch or reverse pinch gestures as before. A semantic swap animation is displayed responsive to the identifying of the semantic swap gesture, the semantic swap animation configured to replace a first view of representations of content in the user interface with a second view of the content in the user interface (block 1308). This semantic swap may be performed in a variety of ways as described earlier. Further, the semantic zoom module 114 may incorporate the snap functionality to address when a gesture is ceased, e.g., fingers of a user's hand 110 are removed from the display device 108. A variety of other examples are also contemplated without departing from the spirit and scope thereof.

Figure 16:
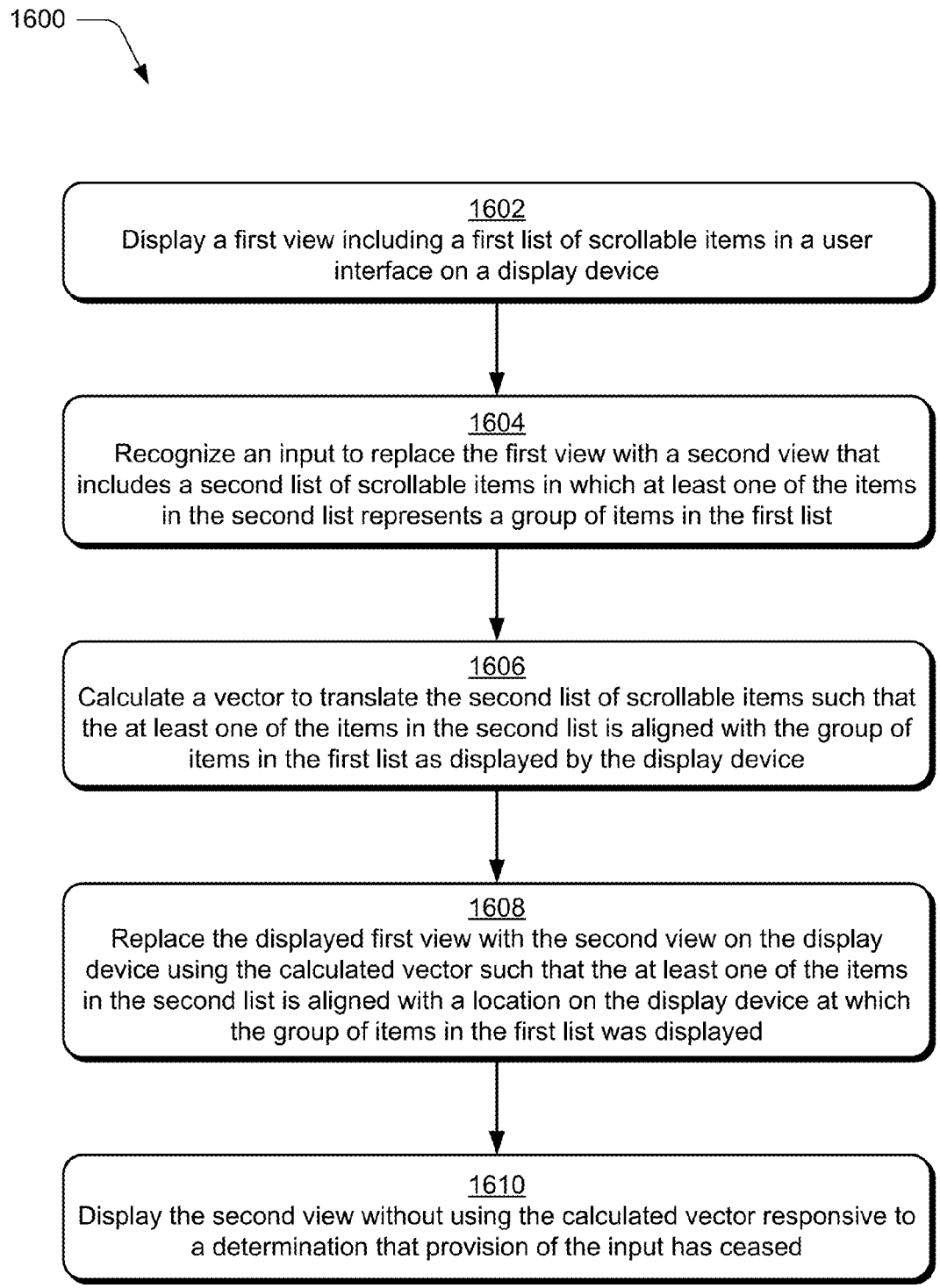
FIG. 16 is a flow diagram depicting a procedure in an example implementation in which a vector is calculated to translate a list of scrollable items and a correction animation is used to remove the translation of the list.

FIG. 16 depicts a procedure 1600 in an example implementation in which a vector is calculated to translate a list of scrollable items and a correction animation is used to remove the translation of the list. A first view including a first list of scrollable items is displayed in a user interface on a display device (block 1602). The first view, for instance, may include a list of representation of content, including names of users, files in a file system of the computing device 102, and so on.

An input is recognized to replace the first view with a second view that includes a second list of scrollable items in which at least one of the items in the second list represents a group of items in the first list (block 1604). The input, for instance, may be a gesture (e.g., pinch or reverse pinch), keyboard input, input provided by a cursor control device, and so on.

A vector is calculated to translate the second list of scrollable items such that the at least one of the items in the second list is aligned with the group of items in the first list as displayed by the display device (block 1606). The displayed first view is replaced by the second view on the display device using the calculated vector such that the at least one of the items in the second list is aligned with a location on the display device at which the group of items in the first list was displayed (block 1608). As described in relation to FIG. 7, for instance, the list shown in the second stage 704, if not translated, would cause an identifier of a corresponding group (e.g., "A" for the names beginning with "A") to be displayed at a left edge of the display device 108 and thus would not "line up." The vector, however, may be calculated such that the items in the first and second views align, e.g., an input received at a position on the display device 108 in relation to the name "Arthur" and a position at which a representation of a group of the items relating to "A" is displayed in the second stage 704.

The second view is then displayed without using the calculated vector responsive to a determination that provision of the input has ceased (block 1610). A correction animation, for instance, may be configured to remove the effects of the vector and translate the list as would otherwise be displayed, an example of which is shown at the third stage 706 of FIG. 7. A variety of other examples are also contemplated without departing from the spirit and scope thereof.

Figure 17:
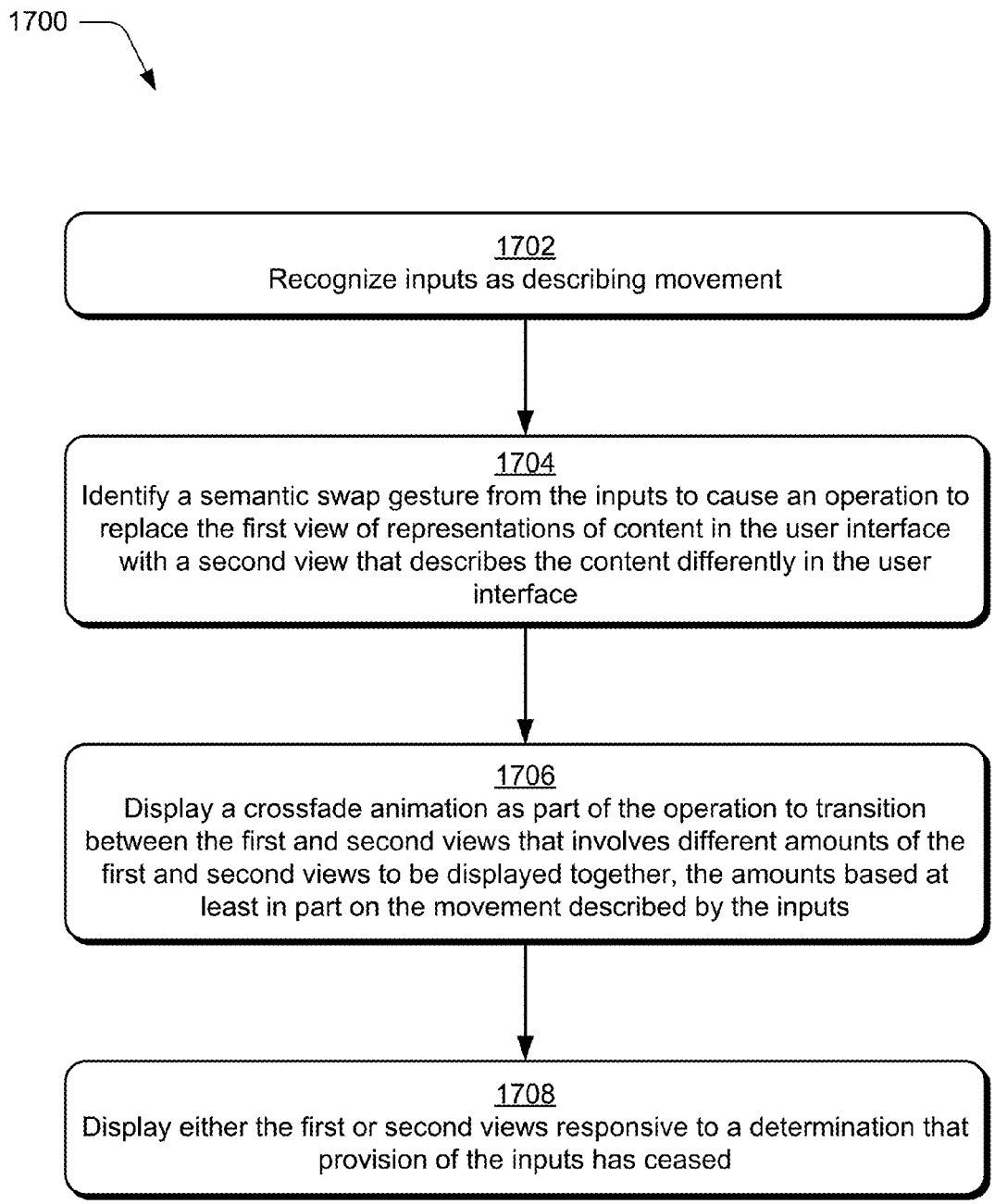
FIG. 17 is a flow diagram depicting a procedure in an example implementation in which a crossfade animation is leveraged as part of semantic swap.

FIG. 17 depicts a procedure 1700 in an example implementation in which a crossfade animation is leveraged as part of semantic swap. Inputs are recognized as describing movement (block 1702). As before, a variety of inputs may be recognized such as keyboard, cursor control device (e.g., mouse), and gestures input through touchscreen functionality of a display device 108.

A semantic swap gesture is identified from the inputs to cause an operation to replace the first view of representations of content in the user interface with a second view that describes the content differently in the user interface (block 1704). The semantic swap may involve a change between a variety of different views, such as involving different arrangement, metadata, representations of groupings, and so forth.

A crossfade animation is displayed as part of the operation to transition between the first and second views that involves different amounts of the first and second views to be displayed together, the amounts based at least in part on the movement described by the inputs (block 1706). For example, this technique may leverage opacity such that the both views may be displayed concurrently "through" each other. In another example, the crossfade may involve displacing one view with another, e.g., moving one in for another.

Additionally, the amounts may be based on the movement. For example, the opacity of the second view may be increased as the amount of movement increases where the opacity of the first view may be decreased as the amount of movement increases. Naturally, this example may also be reversed such that a user may control navigation between the views. Additionally, this display may respond in real time.

Responsive to a determination that provision of the inputs has ceased, either the first or second views is displayed (block 1708). A user, for instance, may remove contact from the display device 108. The semantic zoom module 114 may then choose which of the views to displayed based on the amount of movement, such as by employing a threshold. A variety of other examples are also contemplated, such as for keyboard and cursor control device inputs.

Figure 18:
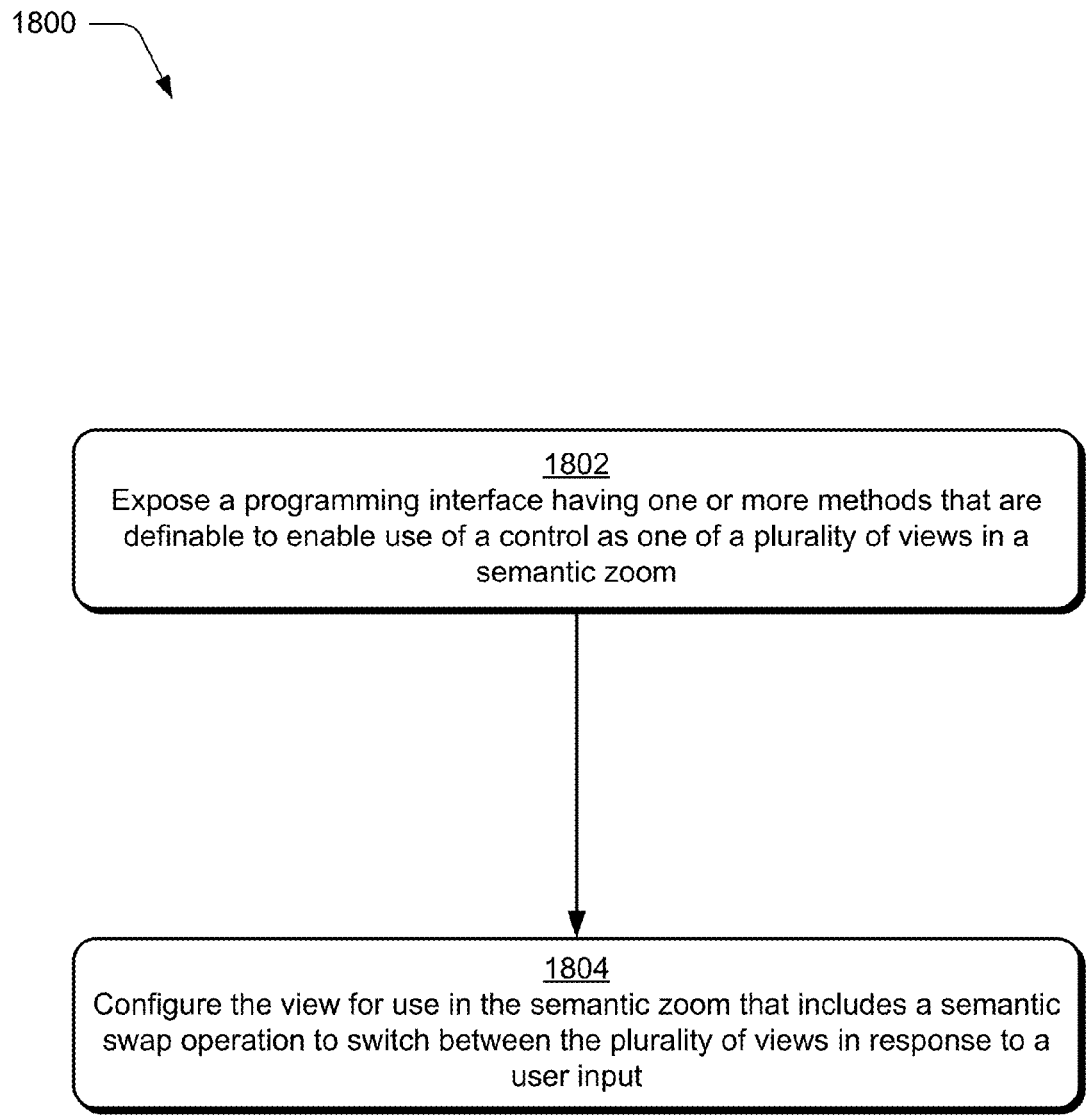
FIG. 18 is a flow diagram depicting a procedure in an example implementation of a programming interface for semantic zoom.

FIG. 18 depicts a procedure 1800 in an example implementation involving a programming interface for semantic zoom. A programming interface is exposed as having one or more methods that are definable to enable use of a control as one of a plurality of views in a semantic zoom (block 1802). The view is configured for use in the semantic zoom that includes a semantic swap operation to switch between the plurality of views in response to a user input (block 1804).

As previously described, the interface may include a variety of different methods. For a dynamically-typed language, the interface may be implemented as a single property that evaluates to an object that has the methods on it. Other implementations are also contemplated as previously described.

A variety of different methods may be implemented as described above. A first such example involves panning access. For example, the semantic zoom module 114 may "take over handling" of scrolling for a child control. Thus, the semantic zoom module 114 may determine what degrees of freedom child control is to use of perform such scrolling, which the child control may return as answers such as horizontal, vertical, none or both. This may be used by the semantic zoom module 114 to determine whether both controls (and their corresponding views) permit panning in the same direction. If so, then panning may be supported by the semantic zoom module 114. If not, panning is not supported and the semantic zoom module 114 does not pre-fetch content that is "off screen."

Another such method is "configure for zoom" which may be used to complete initialization after it is determined whether the two controls are panning in the same direction. This method may be used to inform each of the controls whether it is the "zoomed in" or "zoomed out" view. If it is the current view, this is a piece of state that may be maintained over time.

A further such method is "pre-fetch." This method may be used in an instance in which two controls are configured to pan in the same direction so that the semantic zoom module 114 may perform the panning for them. The amounts to pre-fetch may be configured such that content is available (rendered) for use as a user pans or zooms to avoid viewing cropped controls and other incomplete items.

The next examples involve methods that may be considered "setup" methods, which include pan access, configure for zoom, and set current item. As described above, pan access may be called whenever a control's axis changes and may return "horizontal", "vertical", "both" or "none." Configure for zoom may be used to supply a child control with information that may be used when implementing a zooming behavior. Set current item, as the name implies, may be used to specify which of the items is "current" as described above.

Another method that may be exposed in the programming interface is get current item. This method may be configured to return an opaque representation of an item and a bounding rectangle of that item.

Yet another method that may be supported by the interface is begin zoom. In response to a call to this method, a control may hide part of its UI that "doesn't look good" during a zoom operation, e.g., a scroll bar. Another response may involve expansion of rendering, e.g., to ensure that larger rectangle that is to be displayed when scaling down continues to fill a semantic zoom viewport.

End zoom may also be supported, which involves the opposite of what occurred in begin zoom, such as to perform a crop and return UI elements such as scroll bars that were removed at begin zoom. This may also support a Boolean called "Is Current View" which may be used to inform the control whether that view is currently visible.

Position item is a method that may involve two parameters. One is an opaque representation of an item and another is a bounding rectangle. These are both related to an opaque representation of item and bounding rectangle that were returned from the other method called "get current item." However, these may be configured to include transformations that happen to both.

For example, suppose a view of a zoomed in control is displayed and the current item is a first item in a list of scrollable items in a list. To execute a zoom out transition, a representation is request of a first item from a control corresponding to the zoomed in view, a response for which is a bounding rectangle for that item. The rectangle may then be projected into the other control's coordinate system. To do this, a determination may be made as to which bounding rectangle in the other view is to be aligned with this bounding rectangle. The control may then decide how to align the rectangles, e.g., left, center, right, and so on. A variety of other methods may also be supported as previously described above.

Example System and Device

Figure 19:
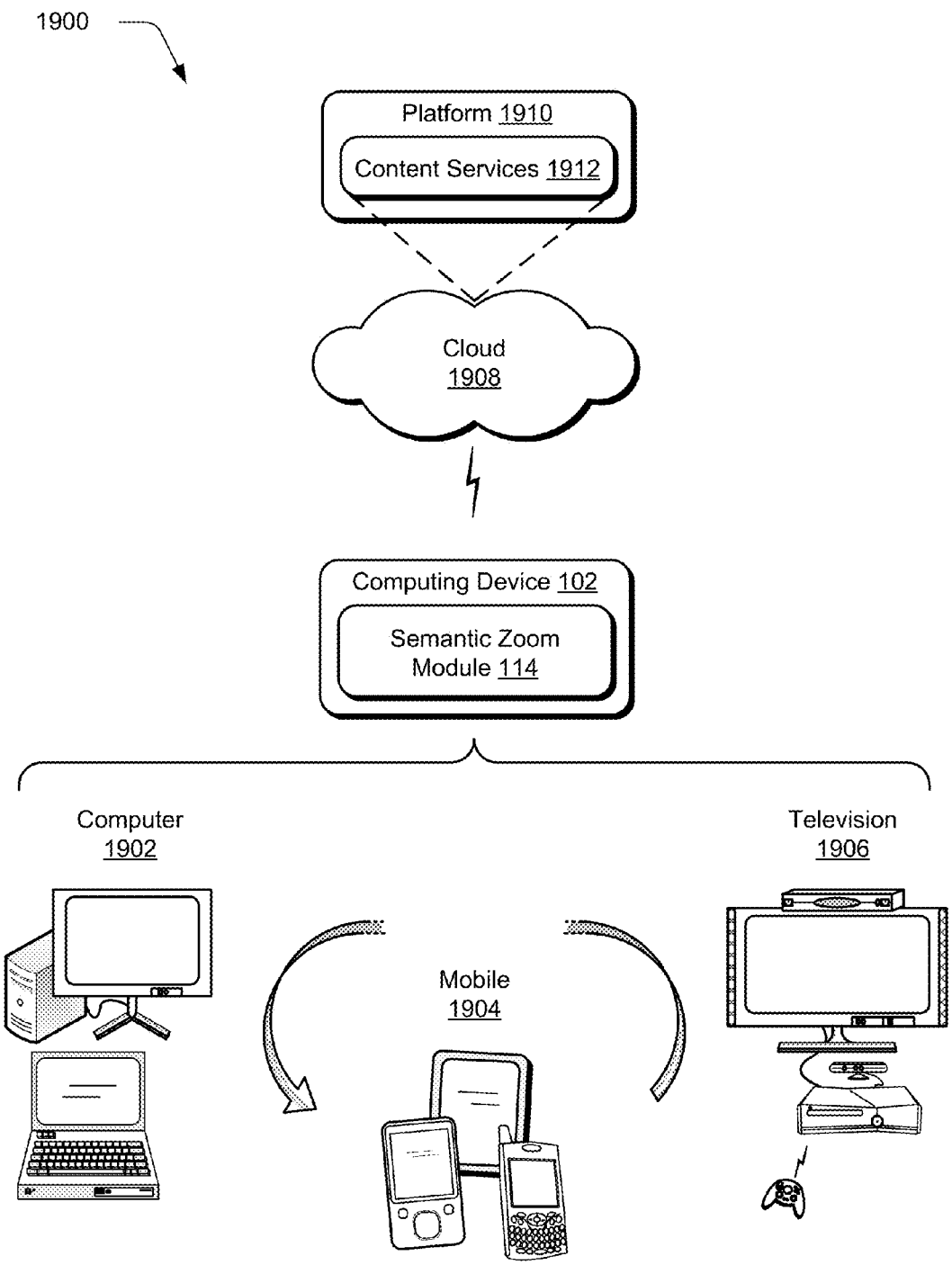
FIG. 19 illustrates various configurations for a computing device that may be configured to implement the semantic zoom techniques described herein.

FIG. 19 illustrates an example system 1900 that includes the computing device 102 as described with reference to FIG. 1. The example system 1900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 1902, mobile 1904, and television 1906 uses. Each of these configurations includes devices that may have generally different constructs and capabilities, and thus the computing device 102 may be configured according to one or more of the different device classes. For instance, the computing device 102 may be implemented as the computer 1902 class of a device that includes a personal computer, desktop computer, a multi-screen computer, laptop computer, netbook, and so on.

The computing device 102 may also be implemented as the mobile 1904 class of device that includes mobile devices, such as a mobile phone, portable music player, portable gaming device, a tablet computer, a multi-screen computer, and so on. The computing device 102 may also be implemented as the television 1906 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein. This is illustrated through inclusion of the semantic zoom module 114 on the computing device 102, implementation of which may also be accomplished in whole or in part (e.g., distributed) "over the cloud" as described below.

The cloud 1908 includes and/or is representative of a platform 1910 for content services 1912. The platform 1910 abstracts underlying functionality of hardware (e.g., servers) and software resources of the cloud 1908. The content services 1912 may include applications and/or data that can be utilized while computer processing is executed on servers that are remote from the computing device 102. Content services 1912 can be provided as a service over the Internet and/or through a subscriber network, such as a cellular or Wi-Fi network.

The platform 1910 may abstract resources and functions to connect the computing device 102 with other computing devices. The platform 1910 may also serve to abstract scaling of resources to provide a corresponding level of scale to encountered demand for the content services 1912 that are implemented via the platform 1910. Accordingly, in an interconnected device embodiment, implementation of functionality of the functionality described herein may be distributed throughout the system 1900. For example, the functionality may be implemented in part on the computing device 102 as well as via the platform 1910 that abstracts the functionality of the cloud 1908.

Figure 20:
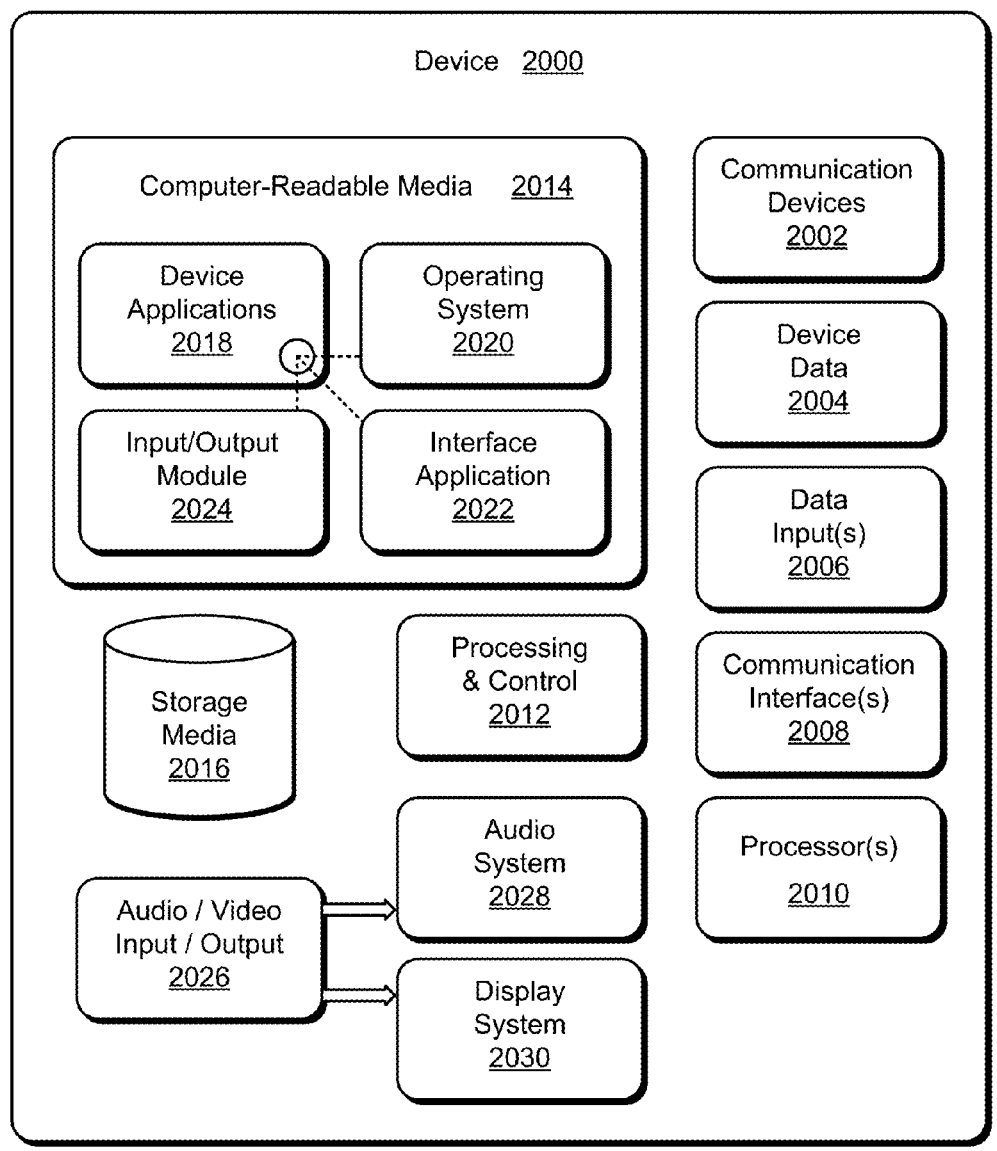
FIG. 20 illustrates various components of an example device that can be implemented as any type of portable and/or computer device as described with reference to FIGS. 1-11 and 19 to implement embodiments of the semantic zoom techniques described herein.

FIG. 20 illustrates various components of an example device 2000 that can be implemented as any type of computing device as described with reference to FIGS. 1-11 and 19 to implement embodiments of the techniques described herein. Device 2000 includes communication devices 2002 that enable wired and/or wireless communication of device data 2004 (e.g., received data, data that is being received, data scheduled for broadcast, data packets of the data, etc.). The device data 2004 or other device content can include configuration settings of the device, media content stored on the device, and/or information associated with a user of the device. Media content stored on device 2000 can include any type of audio, video, and/or image data. Device 2000 includes one or more data inputs 2006 via which any type of data, media content, and/or inputs can be received, such as user-selectable inputs, messages, music, television media content, recorded video content, and any other type of audio, video, and/or image data received from any content and/or data source.

Device 2000 also includes communication interfaces 2008 that can be implemented as any one or more of a serial and/or parallel interface, a wireless interface, any type of network interface, a modem, and as any other type of communication interface. The communication interfaces 2008 provide a connection and/or communication links between device 2000 and a communication network by which other electronic, computing, and communication devices communicate data with device 2000.

Device 2000 includes one or more processors 2010 (e.g., any of microprocessors, controllers, and the like) which process various computer-executable instructions to control the operation of device 2000 and to implement embodiments of the techniques described herein. Alternatively or in addition, device 2000 can be implemented with any one or combination of hardware, firmware, or fixed logic circuitry that is implemented in connection with processing and control circuits which are generally identified at 2012. Although not shown, device 2000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 2000 also includes computer-readable media 2014, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 2000 can also include a mass storage media device 2016.

Computer-readable media 2014 provides data storage mechanisms to store the device data 2004, as well as various device applications 2018 and any other types of information and/or data related to operational aspects of device 2000. For example, an operating system 2020 can be maintained as a computer application with the computer-readable media 2014 and executed on processors 2010. The device applications 2018 can include a device manager (e.g., a control application, software application, signal processing and control module, code that is native to a particular device, a hardware abstraction layer for a particular device, etc.). The device applications 2018 also include any system components or modules to implement embodiments of the techniques described herein. In this example, the device applications 2018 include an interface application 2022 and an input/output module 2024 that are shown as software modules and/or computer applications. The input/output module 2024 is representative of software that is used to provide an interface with a device configured to capture inputs, such as a touchscreen, track pad, camera, microphone, and so on. Alternatively or in addition, the interface application 2022 and the input/output module 2024 can be implemented as hardware, software, firmware, or any combination thereof. Additionally, the input/output module 2024 may be configured to support multiple input devices, such as separate devices to capture visual and audio inputs, respectively.

Device 2000 also includes an audio and/or video input-output system 2026 that provides audio data to an audio system 2028 and/or provides video data to a display system 2030. The audio system 2028 and/or the display system 2030 can include any devices that process, display, and/or otherwise render audio, video, and image data. Video signals and audio signals can be communicated from device 2000 to an audio device and/or to a display device via an RF (radio frequency) link, S-video link, composite video link, component video link, DVI (digital video interface), analog audio connection, or other similar communication link. In an embodiment, the audio system 2028 and/or the display system 2030 are implemented as external components to device 2000. Alternatively, the audio system 2028 and/or the display system 2030 are implemented as integrated components of example device 2000.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
  abstracting, by an operating system of the computing device, a plurality of items to be displayed as specified by an application through an application programming interface (API) made available to the application by the operating system, the abstraction not integrated within the application, the abstracting comprising:
    receiving the plurality of items to be displayed from the application through the API;
    creating, by the operating system without further input from the application, groups to be used to represent content in a zoomed view of a semantic swap;
    determining a first letter of each of the items to be represented in the zoomed view;
    organizing each of the items into the created groups based on the determined first letter of each of the items;
  sending, by the operating system through the API, a view of the items to be displayed within an interface corresponding to the application; and
  responsive to receipt of an input to initiate a semantic swap, sending, by the operating system and through the API, a view of the created groups to the application to replace the view of the items.

2. A method as described in claim 1, wherein the created groups represent an alphabet that is used to describe the items.

3. A method as described in claim 1, wherein the abstracting includes generation of alphabet tables to create the groups.

4. A method as described in claim 1, wherein the abstracting includes use of a Latin alphabet with non-Latin alphabets to create the groups.

5. A method as described in claim 1, wherein the abstracting is performed to group archaic or uncommon letters with a previous letter.

6. A method as described in claim 1, wherein the abstracting is performed to treat Latin letter-like symbols according to the letters included in the symbol to group the symbols.

7. A method as described in claim 1, wherein the abstracting includes width normalization.

8. A method as described in claim 1, wherein the abstracting includes use of a locale override table.

9. A method as described in claim 1, wherein the abstracting includes use of a stroke count sort to return a group for each number of strokes, a radical sort to return groups for Chinese character semantic components, or a phonetic sort to return by first letter of a phonetic reading.

10. A method as described in claim 1, wherein the abstracting returns groups for an initial Jamo letter in a Hangul syllable for items in Korean.

11. A method as described in claim 1, wherein the input to initiate the semantic swap is a zoom operation.

12. A method implemented by a computing device, the method comprising:
abstracting, by an operating system of the computing device, a plurality of items to be displayed in a scrollable list as specified by an application, the abstraction not integrated within the application, the abstracting comprising:
examining, by the operating system of the computing device, a manifest associated with the application to determine a phonetic name property for each of the plurality of items to be represented in the scrollable list;
generating, by the operating system, groups of the plurality of items and identifications for the groups of the plurality of items based on the phonetic name property;
organizing, by the operating system, the plurality of items into the generated groups based on the determined phonetic name property;
sending, by the operating system, a view of the plurality of items in a zoomed view to the application for display,
displaying, in an interface corresponding to the application, the view of the plurality of items in the zoomed view; and
initiating, by the operating system, a semantic swap, the semantic swap sending another view with the generated identifications for the generated groups of the plurality of items from the operating system to the application for display, the semantic swap replacing the view of the plurality of items with the other view comprising the generated identifications for the generated groups of the plurality of items in the interface.

13. A method as described in claim 12, wherein the semantic swap is configured to be initiated by a keyboard command, cursor control device, or gesture.

14. A method as described in claim 13, wherein the gesture is a pinch gesture.

15. A method as described in claim 12, wherein the generated groups represent an alphabet that is used to describe the items.

16. A method implemented by a computing device, the method comprising:
abstracting, by an operating system of the computing device, a plurality of items to be displayed as specified by an application through an application programming interface (API) made available to the application by the operating system, the abstraction not integrated within the application, the abstracting comprising:
receiving the plurality of items to be displayed from the application through the API;
normalizing a first visible glyph of each of the items;
stripping diacritics from the first visible glyph of each of the items;
creating, by the operating system without further input from the application, groups of the items based on the normalized and stripped first visible glyphs;
organizing each of the items into the created groups based on the normalized and stripped first visible glyphs of each of the items;
sending, by the operating system through the API, a view of the items to be displayed within an interface corresponding to the application; and
responsive to receipt of an input to initiate a semantic swap, sending, by the operating system and through the API, a second view of the items with the created groups to the application to be displayed in a zoomed view effective to replace the view of the items in the interface.

17. A method as described in claim 16, wherein the normalizing includes normalizing for an upper case, diacritic, width, or Kana type.

18. A method as described in claim 16, wherein the stripping includes generating a sort key, looking if a diacritic is to be treated as a diacritic or a letter, and combining codepoints responsive to a determination that the diacritic is to be treated as a diacritic.

19. A method as described in claim 16, wherein the semantic swap is configured to be initiated by a keyboard command, cursor control device, or gesture.

20. A method as described in claim 19, wherein the gesture is a pinch gesture.

* * * * *